United States Patent
Yagishita et al.

(10) Patent No.: US 7,221,483 B2
(45) Date of Patent: May 22, 2007

(54) IMAGE ENCODING METHOD AND APPARATUS, IMAGE DECODING METHOD AND APPARATUS, IMAGE PROCESSING APPARATUS, IMAGE FORMATION APPARATUS, AND COMPUTER-EXECUTABLE PROGRAMS

(75) Inventors: Takahiro Yagishita, Kanagawa (JP); Hiroaki Suzuki, Chiba (JP)

(73) Assignee: Ricoh Company, Ltd. (JP)

( * ) Notice: Subject to any disclaimer, the term of this patent is extended or adjusted under 35 U.S.C. 154(b) by 896 days.

(21) Appl. No.: 09/945,840

(22) Filed: Sep. 5, 2001

(65) Prior Publication Data

US 2002/0031276 A1  Mar. 14, 2002

(30) Foreign Application Priority Data

| Sep. 5, 2000 | (JP) | 2000-268618 |
| Sep. 5, 2000 | (JP) | 2000-268619 |
| Jan. 15, 2001 | (JP) | 2001-006475 |
| Jan. 16, 2001 | (JP) | 2001-007148 |
| Jan. 16, 2001 | (JP) | 2001-007392 |

(51) Int. Cl.
*G06K 15/00* (2006.01)
*H04N 1/405* (2006.01)

(52) U.S. Cl. ............ 358/3.13; 358/3.06; 382/232; 382/239

(58) Field of Classification Search .......... 382/232, 382/233, 237, 239, 251, 252; 358/3.03, 3.06, 358/3.13, 3.16
See application file for complete search history.

(56) References Cited

U.S. PATENT DOCUMENTS 5,539,468 A * 7/1996 Suzuki et al. ............ 375/240.2
6,404,932 B1 * 6/2002 Hata et al. .................. 382/239
6,487,315 B2 * 11/2002 Kadono ...................... 382/238
6,608,939 B2 * 8/2003 Matsumoto ................. 382/238
6,801,664 B1 * 10/2004 Kobayashi et al. ......... 382/237

FOREIGN PATENT DOCUMENTS

| JP | 55-34576 | 3/1980 |
| JP | 55-53969 | 4/1980 |
| JP | 57-021168 | 2/1982 |
| JP | 60-5670 | 1/1985 |
| JP | 61-179675 | 8/1986 |
| JP | 61-194968 | 8/1986 |
| JP | 63-275274 | 11/1988 |
| JP | 63-275275 | 11/1988 |
| JP | 7-99581 | 4/1995 |
| JP | 7-231390 | 8/1995 |
| JP | 9-135352 | 5/1997 |
| JP | 9-135357 | 5/1997 |

* cited by examiner

*Primary Examiner*—Thomas D. Lee
(74) *Attorney, Agent, or Firm*—Dickstein Shapiro LLP

(57) ABSTRACT

Image data is encoded using a block consisting of a plurality of pixels as a unit of processing. A statistics section extracts statistical information for each pixel value, from a plurality of encoded blocks adjacent to an encoding target block, at each corresponding position within the respective blocks. An encoding processing section performs encoding on the encoding target block using the statistical information extracted by the statistics section. The encoding processing section comprises a prediction section that predicts a value of an encoding target pixel from the selected reference pixel based on the statistical information, a comparison section that detects an error between the predicted value and the value of the encoding target pixel, and an encoding section that performs entropy encoding on the prediction error.

22 Claims, 55 Drawing Sheets

| 2 | 10 | 18 | 26 | 34 | 42 | 50 | 58 | 66 | 74 | 82 | 90 | 98 | 106 | 114 | 122 |
|---|---|---|---|---|---|---|---|---|---|---|---|---|---|---|---|
| 10 | 18 | 26 | 34 | 42 | 50 | 58 | 66 | 74 | 82 | 90 | 98 | 106 | 114 | 122 | 130 |
| 18 | 26 | 34 | 42 | 50 | 58 | 66 | 74 | 82 | 90 | 98 | 106 | 114 | 122 | 130 | 138 |
| 26 | 34 | 42 | 50 | 58 | 66 | 74 | 82 | 90 | 98 | 106 | 114 | 122 | 130 | 138 | 146 |
| 2 | 10 | 18 | 26 | 34 | 42 | 50 | 58 | 66 | 74 | 82 | 90 | 98 | 106 | 114 | 122 |
| 10 | 18 | 26 | 34 | 42 | 50 | 58 | 66 | 74 | 82 | 90 | 98 | 106 | 114 | 122 | 130 |
| 18 | 26 | 34 | 42 | 50 | 58 | 66 | 74 | 82 | 90 | 98 | 106 | 114 | 122 | 130 | 138 |
| 26 | 34 | 42 | 50 | 58 | 66 | 74 | 82 | 90 | 98 | 106 | 114 | 122 | 130 | 138 | 146 |

MULTI-GRADATION DATA BEFORE BEING SUBJECTED TO HALFTONING

FIG.6A

DITHER MATRIX

| 50 | 100 | 30 | 80 |
|---|---|---|---|
| 10 | 150 | 120 | 60 |
| 130 | 40 | 90 | 160 |
| 70 | 140 | 110 | 20 |

FIG.6B

AFTER BEING DITHERED

FIG.6C

STATISTICAL INFORMATION

| 3 | 1 | 5 | 3 |
|---|---|---|---|
| 7 | 0 | 1 | 5 |
| 0 | 5 | 3 | 0 |
| 3 | 0 | 1 | 7 |

$\Sigma a_k * X_{ij}$ $a_k = [1,1,1,1,1,1,1]$

ERROR DIFFUSION MATRIX

BEFORE BEING PROCESSED

AFTER BEING PROCESSED

ERROR-DIFFUSED IMAGE

STATISTICAL INFORMATION $\Sigma a_k * X_{ij}$ $a_k = [1,1,1,1,1,1,1]$

TABLE FOR CREATION OF STATISTICAL INFORMATION

| ADDRESS | STATISTICAL VALUE |
|---------|-------------------|
| 0000000 | 0 |
| 0000001 | 7 |
| ⋮ | ⋮ |
| 0010000 | 3 |
| ⋮ | ⋮ |
| 1111111 | 28 |

STATE TRANSITION DIAGRAM FOR CREATION OF STATISTICAL INFORMATION

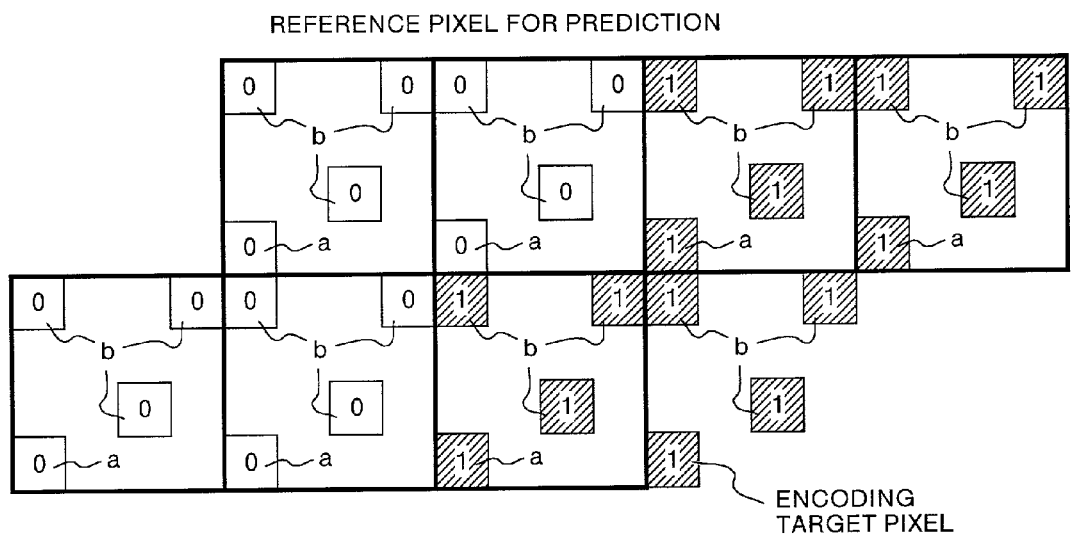

FIG.13

OVERALL FLOW

FIG.25A
MULTI-GRADATION DATA BEFORE BEING DITHERED

| 2 | 10 | 18 | 26 | 34 | 42 | 50 | 58 | 66 | 74 | 82 | 90 | 98 | 106 | 114 | 122 |
|---|---|---|---|---|---|---|---|---|---|---|---|---|---|---|---|
| 10 | 18 | 26 | 34 | 42 | 50 | 58 | 66 | 74 | 82 | 90 | 98 | 106 | 114 | 122 | 130 |
| 18 | 26 | 34 | 42 | 50 | 58 | 66 | 74 | 82 | 90 | 98 | 106 | 114 | 122 | 130 | 138 |
| 26 | 34 | 42 | 50 | 58 | 66 | 74 | 82 | 90 | 98 | 106 | 114 | 122 | 130 | 138 | 146 |
| 34 | 42 | 50 | 58 | 66 | 74 | 82 | 90 | 98 | 106 | 114 | 122 | 130 | 138 | 146 | 154 |
| 42 | 50 | 58 | 66 | 74 | 82 | 90 | 98 | 106 | 114 | 122 | 130 | 138 | 146 | 154 | 162 |
| 50 | 58 | 66 | 74 | 82 | 90 | 98 | 106 | 114 | 122 | 130 | 138 | 146 | 154 | 162 | 170 |
| 58 | 66 | 74 | 82 | 90 | 98 | 106 | 114 | 122 | 130 | 138 | 146 | 154 | 162 | 170 | 178 |

FIG.25B
DITHER MATRIX

| 50 | 100 | 30 | 80 |
|---|---|---|---|
| 10 | 150 | 120 | 60 |
| 130 | 40 | 90 | 160 |
| 70 | 140 | 110 | 20 |

FIG.25D
STATISTICAL QUANTITY

| 2 | 1 | 3 | 2 |
|---|---|---|---|
| 4 | 0 | 1 | 3 |
| 0 | 3 | 2 | 0 |
| 2 | 0 | 1 | 4 |
| 3 | 2 | 4 | 3 |
| 4 | 0 | 2 | 4 |
| 1 | 4 | 3 | 1 |
| 3 | 1 | 2 | 4 |

FIG.25C
AFTER BEING DITHERED

| 0 | 0 | 0 | 0 | 0 | 0 | 1 | 0 | 1 | 0 | 1 | 1 | 1 | 1 | 1 | 1 |
|---|---|---|---|---|---|---|---|---|---|---|---|---|---|---|---|
| 1 | 0 | 0 | 0 | 1 | 0 | 0 | 1 | 1 | 0 | 0 | 1 | 1 | 0 | 1 | 1 |
| 0 | 0 | 0 | 0 | 0 | 1 | 0 | 0 | 0 | 1 | 1 | 0 | 0 | 1 | 1 | 0 |
| 0 | 0 | 0 | 1 | 0 | 0 | 0 | 1 | 1 | 1 | 0 | 1 | 1 | 0 | 1 | 1 |
| 0 | 0 | 1 | 0 | 1 | 0 | 1 | 1 | 1 | 1 | 1 | 1 | 1 | 1 | 1 | 1 |
| 1 | 0 | 0 | 0 | 1 | 0 | 0 | 1 | 0 | 1 | 1 | 1 | 0 | 1 | 1 | 1 |
| 0 | 1 | 0 | 0 | 1 | 1 | 0 | 0 | 1 | 0 | 1 | 1 | 1 | 1 | 1 | 1 |
| 0 | 0 | 0 | 1 | 1 | 0 | 0 | 1 | 0 | 1 | 1 | 1 | 1 | 1 | 1 | 1 |

FIG.27

| ADDRESS | STATISTICAL VALUE |
|---|---|
| 0000000 | 0 |
| 0000001 | 7 |
| ⋮ | ⋮ |
| 0010000 | 3 |
| ⋮ | ⋮ |
| 1111111 | 28 |

FIG.46

| 3 | 1 | 5 | 3 |
|---|---|---|---|
| 6 | 0 | 1 | 5 |
| 0 | 5 | 3 | 0 |
| 3 | 0 | 1 | 6 |

| 13 | 4 | 20 | 13 |
|---|---|---|---|
| 21 | 0 | 4 | 20 |
| 0 | 20 | 13 | 0 |
| 13 | 0 | 4 | 21 |

$a_0=6$ $a_1=5$ $a_2=4$ $a_3=3$ $a_4=2$ $a_5=1$

| ADDRESS | DATA |
|---|---|
| 000000 | 0 |
| 000001 | 6 |
| ⋮ | ⋮ |
| 001101 | 13 |
| ⋮ | ⋮ |
| 111111 | 21 |

A THRESHOLD VALUE

FIG.60 ENCODED BLOCKS FROM WHICH STATISTICAL INFORMATION IS COLLECTED

FIG.61

A ORIGINAL IMAGE DATA

| 3 | 1 | 5 | 3 |
|---|---|---|---|
| 6 | 0 | 1 | 5 |
| 0 | 5 | 3 | 0 |
| 3 | 0 | 1 | 6 |

$\Sigma a_k * X_{ij}$ $a_k = (1,1,1,1,1,1,1)$

⬇ ONE-DIMENSIONAL

B | 3 | 1 | 5 | 3 | 6 | 0 | 1 | 5 | 0 | 5 | 3 | 0 | 3 | 0 | 1 | 6 |

C | 6 | 6 | 5 | 5 | 5 | 3 | 3 | 3 | 3 | 1 | 1 | 1 | 0 | 0 | 0 | 0 |

FIG.62
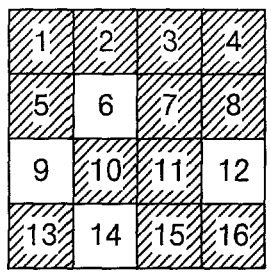
A ORIGINAL IMAGE DATA
⇩ ONE-DIMENSIONAL
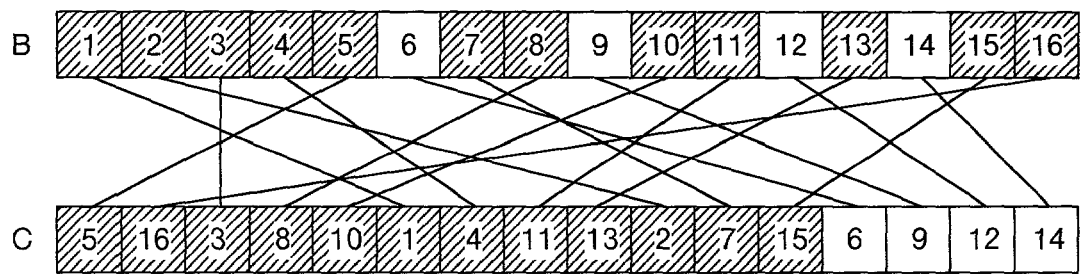
FIG.63
| ADDRESS | DATA |
|---------|------|
| 000000  | 0    |
| 000001  | 3    |
| ⋮       | ⋮    |
| 001101  | 8    |
| ⋮       | ⋮    |
| 111111  | 12   |

FIG.67

| n | Wyle code | 16 Golomb-Rice code |
|---|---|---|
| 0 | 000 | 00001 |
| 1 | 001 | 00011 |
| 2 | 010 | 00101 |
| 3 | 011 | 00111 |
| 4 | 1000 | 01001 |
| 5 | 1001 | 01011 |
| 6 | 1010 | 01101 |
| 7 | 1011 | 01111 |
| 8 | 110000 | 10001 |
| 9 | 110001 | 10011 |
| 10 | 110010 | 10101 |
| 11 | 110011 | 10111 |
| 12 | 110100 | 11001 |
| 13 | 110101 | 11011 |
| 14 | 110110 | 11101 |
| 15 | 110111 | 11111 |
| 16 | 11100000 | 000001 |
| 17 | 11100001 | 000101 |
| 18 | 11100010 | 001001 |
| 19 | 11100011 | 001101 |
| 20 | 11100100 | 010001 |
| 21 | 11100101 | 010101 |
| 22 | 11100110 | 011001 |
| 23 | 11100111 | 011101 |
| 24 | 11101000 | 100001 |

FIG.71
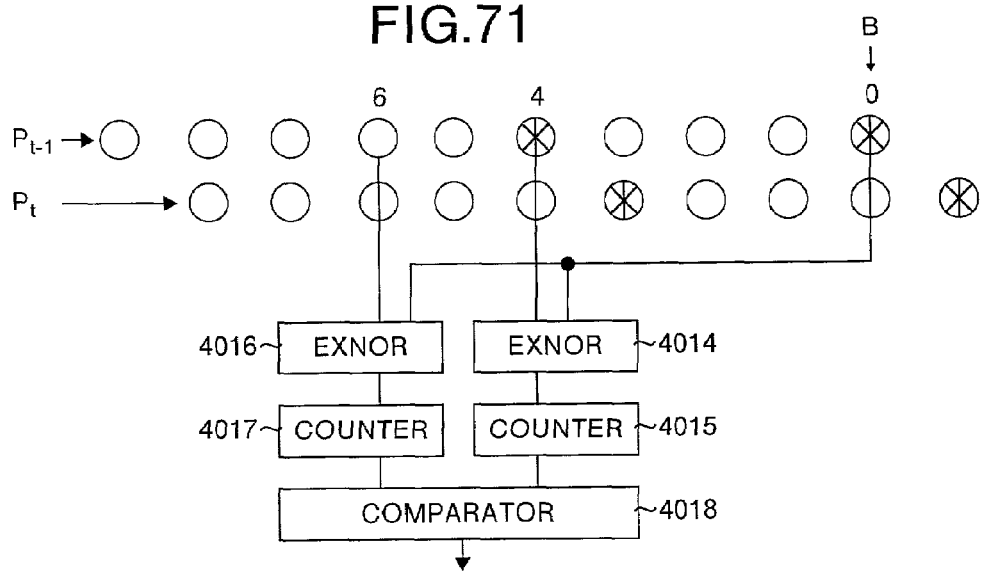
FIG.72
| 1 | 1 | 1 | 1 | 1 |   |   |
|---|---|---|---|---|---|---|
| 1 | 0 | 0 | 0 | 0 | 0 | 0 |
| 1 | 0 | 0 | 0 | 0 | 0 | 0 |
| 1 | 0 | 0 | 0 | 0 | 0 | 0 |
FIG.73
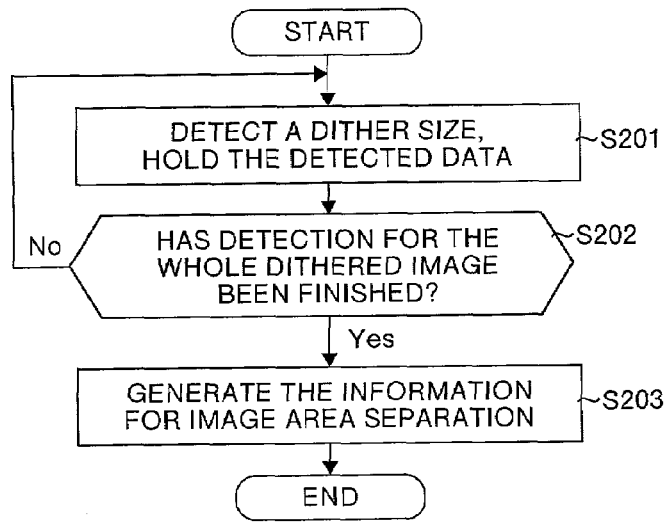

FIG.76A

| 34 | 42 | 50 | 58 | 66 | 74 | 82 | 90 |
|---|---|---|---|---|---|---|---|
| 42 | 50 | 58 | 66 | 74 | 82 | 90 | 98 |
| 50 | 58 | 66 | 74 | 82 | 90 | 98 | 106 |
| 58 | 66 | 74 | 82 | 90 | 98 | 106 | 114 |

FIG.76B

| 70 | 80 | 90 | 100 |
|---|---|---|---|
| 60 | 10 | 20 | 110 |
| 50 | 30 | 40 | 120 |
| 160 | 150 | 140 | 130 |

FIG.76C

| 0 | 0 | 0 | 0 | 0 | 0 | 0 | 0 |
|---|---|---|---|---|---|---|---|
| 0 | 1 | 1 | 0 | 1 | 1 | 1 | 0 |
| 0 | 1 | 1 | 0 | 1 | 1 | 1 | 0 |
| 0 | 0 | 0 | 0 | 0 | 0 | 0 | 0 |

FIG.76D

| 0 | 1 | 2 | 3 |
|---|---|---|---|
| 4 | 5 | 6 | 7 |
| 8 | 9 | 10 | 11 |
| 12 | 13 | 14 | 15 |

FIG.76E

| 0 | 0 | 0 | 0 |
|---|---|---|---|
| 1 | 2 | 2 | 0 |
| 1 | 2 | 2 | 0 |
| 0 | 0 | 0 | 0 |

FIG.86A

| 2 | 10 | 18 | 26 | 34 | 42 | 50 | 58 | 66 | 74 | 82 | 90 | 98 | 106 | 114 | 122 | | | | | | | | | | | | | | | | |
|---|---|---|---|---|---|---|---|---|---|---|---|---|---|---|---|---|---|---|---|---|---|---|---|---|---|---|---|---|---|---|---|
| 10 | 18 | 26 | 34 | 42 | 50 | 58 | 66 | 74 | 82 | 90 | 98 | 106 | 114 | 122 | 130 | | | | | | | | | | | | | | | | |
| 18 | 26 | 34 | 42 | 50 | 58 | 66 | 74 | 82 | 90 | 98 | 106 | 114 | 122 | 130 | 138 | | | | | | | | | | | | | | | | |
| 26 | 34 | 42 | 50 | 58 | 66 | 74 | 82 | 90 | 98 | 106 | 114 | 122 | 130 | 138 | 146 | | | | | | | | | | | | | | | | |

MULTI-GRADATION DATA BEFORE BEING DITHERED

FIG.86B

| 50 | 100 | 30 | 80 |
|---|---|---|---|
| 10 | 150 | 120 | 60 |
| 130 | 40 | 90 | 160 |
| 70 | 140 | 110 | 20 |

DITHER MATRIX

FIG.86C

AFTER BEING DITHERED

FIG.87A
MULTI-GRADATION DATA BEFORE BEING DITHERED

| 2  | 10 | 18 | 26 | 34 | 42 | 50  | 58  | 66  | 74  | 82  | 90  | 98  | 106 | 114 | 122 |
|----|----|----|----|----|----|-----|-----|-----|-----|-----|-----|-----|-----|-----|-----|
| 10 | 18 | 26 | 34 | 42 | 50 | 58  | 66  | 74  | 82  | 90  | 98  | 106 | 114 | 122 | 130 |
| 18 | 26 | 34 | 42 | 50 | 58 | 66  | 74  | 82  | 90  | 98  | 106 | 114 | 122 | 130 | 138 |
| 26 | 34 | 42 | 50 | 58 | 66 | 74  | 82  | 90  | 98  | 106 | 114 | 122 | 130 | 138 | 146 |
| 34 | 42 | 50 | 58 | 66 | 74 | 82  | 90  | 98  | 106 | 114 | 122 | 130 | 138 | 146 | 154 |
| 42 | 50 | 58 | 66 | 74 | 82 | 90  | 98  | 106 | 114 | 122 | 130 | 138 | 146 | 154 | 162 |
| 50 | 58 | 66 | 74 | 82 | 90 | 98  | 106 | 114 | 122 | 130 | 138 | 146 | 154 | 162 | 170 |
| 58 | 66 | 74 | 82 | 90 | 98 | 106 | 114 | 122 | 130 | 138 | 146 | 154 | 162 | 170 | 178 |

FIG.87B
DITHER MATRIX

| 50  | 100 | 30  | 80  |
|-----|-----|-----|-----|
| 10  | 150 | 120 | 60  |
| 130 | 40  | 90  | 160 |
| 70  | 140 | 110 | 20  |

FIG.87C
AFTER BEING DITHERED

| 0 | 0 | 0 | 0 | 0 | 0 | 1 | 0 | 1 | 0 | 1 | 1 | 1 | 1 | 1 | 1 |
|---|---|---|---|---|---|---|---|---|---|---|---|---|---|---|---|
| 1 | 0 | 0 | 0 | 1 | 0 | 0 | 1 | 1 | 0 | 0 | 1 | 1 | 0 | 1 | 1 |
| 0 | 0 | 0 | 0 | 0 | 1 | 0 | 0 | 0 | 1 | 1 | 0 | 0 | 1 | 1 | 0 |
| 0 | 0 | 0 | 1 | 0 | 0 | 0 | 1 | 1 | 1 | 0 | 1 | 1 | 0 | 1 | 1 |
| 0 | 0 | 1 | 0 | 1 | 0 | 1 | 1 | 1 | 1 | 1 | 1 | 1 | 1 | 1 | 1 |
| 1 | 0 | 0 | 1 | 1 | 0 | 0 | 1 | 1 | 0 | 1 | 1 | 0 | 1 | 1 | 1 |
| 0 | 1 | 0 | 0 | 0 | 1 | 1 | 0 | 0 | 1 | 1 | 0 | 1 | 1 | 1 | 1 |
| 0 | 0 | 0 | 1 | 1 | 0 | 0 | 1 | 1 | 0 | 1 | 1 | 1 | 1 | 1 | 1 |

FIG.88A

| 2 | 10 | 18 | 26 | 34 | 42 | 50 | 58 | 66 | 74 | 82 | 90 | 98 | 106 | 114 | 122 |
|---|---|---|---|---|---|---|---|---|---|---|---|---|---|---|---|
| 10 | 18 | 26 | 34 | 42 | 50 | 58 | 66 | 74 | 82 | 90 | 98 | 106 | 114 | 122 | 130 |
| 18 | 26 | 34 | 42 | 50 | 58 | 66 | 74 | 82 | 90 | 98 | 106 | 114 | 122 | 130 | 138 |
| 26 | 34 | 42 | 50 | 58 | 66 | 74 | 82 | 90 | 98 | 106 | 114 | 122 | 130 | 138 | 146 |
| 34 | 42 | 50 | 58 | 66 | 74 | 82 | 90 | 98 | 106 | 114 | 122 | 130 | 138 | 146 | 154 |
| 42 | 50 | 58 | 66 | 74 | 82 | 90 | 98 | 106 | 114 | 122 | 130 | 138 | 146 | 154 | 162 |
| 50 | 58 | 66 | 74 | 82 | 90 | 98 | 106 | 114 | 122 | 130 | 138 | 146 | 154 | 162 | 170 |
| 58 | 66 | 74 | 82 | 90 | 98 | 106 | 114 | 122 | 130 | 138 | 146 | 154 | 162 | 170 | 178 |

FIG.88B

| 70 | 80 | 90 | 100 |
|---|---|---|---|
| 80 | 10 | 20 | 110 |
| 50 | 30 | 40 | 120 |
| 160 | 150 | 140 | 130 |

FIG.88C

| 50 | 100 | 30 | 80 |
|---|---|---|---|
| 10 | 150 | 120 | 60 |
| 130 | 40 | 90 | 160 |
| 70 | 140 | 110 | 20 |

FIG.88D

| 0 | 0 | 0 | 0 | 0 | 0 | 0 | 0 | 0 | 0 | 0 | 0 | 1 | 1 | 1 | 1 |
|---|---|---|---|---|---|---|---|---|---|---|---|---|---|---|---|
| 0 | 1 | 1 | 0 | 0 | 1 | 1 | 0 | 1 | 1 | 1 | 0 | 1 | 1 | 1 | 1 |
| 0 | 0 | 0 | 0 | 0 | 1 | 1 | 0 | 1 | 1 | 1 | 0 | 1 | 1 | 1 | 1 |
| 0 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 1 | 1 | 1 | 1 | 1 | 1 | 1 | 1 |
| 0 | 1 | 1 | 0 | 1 | 1 | 1 | 0 | 1 | 1 | 1 | 1 | 1 | 1 | 1 | 1 |
| 0 | 1 | 1 | 0 | 1 | 1 | 1 | 0 | 1 | 1 | 1 | 1 | 1 | 1 | 1 | 1 |
| 0 | 0 | 0 | 0 | 0 | 0 | 0 | 0 | 0 | 0 | 0 | 1 | 0 | 1 | 1 | 1 |

IMAGE ENCODING METHOD AND APPARATUS, IMAGE DECODING METHOD AND APPARATUS, IMAGE PROCESSING APPARATUS, IMAGE FORMATION APPARATUS, AND COMPUTER-EXECUTABLE PROGRAMS

FIELD OF THE INVENTION

The present invention relates to a field of image data encoding and decoding. More particularly, this invention relates to the field of image data encoding and decoding processed through an ordered dither method or an error diffusion method that has been widely used as a pseudo halftoning technique.

BACKGROUND OF THE INVENTION

The ordered dither method and the error diffusion method are widely used to express halftones of photographs or the like in printers, facsimiles and the like that form an image with dots. The ordered dither method is realized by quantizing (binarizing) a pixel of multi-gradation image data based on a corresponding threshold value in a dither matrix. FIG. 86 to FIG. 88 show the ordered dither method.

FIG. 86A is multi-gradation data before being dithered, FIG. 86B is a 4×4 size dither matrix, and FIG. 86C is two gradation data after being dithered.

In the ordered dither method, the multi-gradation data before being dithered (FIG. 86A) is compared with a value (threshold value) of the dither matrix (FIG. 86B). As a result of comparison, when the multi-gradation data before being dithered (FIG. 86A) is larger than a corresponding element value (threshold value) of the dither matrix (FIG. 86B), the dithered data becomes "1". When the multi-gradation data before being dithered (FIG. 86A) is smaller than the corresponding element value (threshold value) of the dither matrix (FIG. 86B), the dithered data becomes "0". The two gradation data (FIG. 86C) after being dithered is obtained in such a manner. Since the dither matrix is repeatedly used, the same periodic feature as that of the dither matrix appears in the image created through this method (the dithered binary image in FIG. 86C). Particularly, this feature remarkably appears in images with a large quantity of low frequency component such as photographs. FIG. 87A to FIG. 87C show another example when the ordered dither method is used.

Compression and encoding of the dithered image is performed in many cases by using such a periodic feature of the dithered image. For example, Japanese Patent No. 1379237 discloses a technology of predicting a value of an encoding target pixel by using an encoded pixel apart from the encoding target pixel by a dither period and its peripheral pixels, and by encoding a prediction error. Japanese Patent No. 1807514, Japanese Patent No. 2113692, and Japanese Patent No. 2113693 disclose a technology of sorting in-block pixels in descending order by dither threshold values in a predetermined pixel block (dither matrix) unit and encoding the pixels. According to such technologies, the result of dithering the image with a large quantity of low frequency component has been largely affected by the dither threshold values. Therefore, black pixels and white pixels gather respectively through the sorting, which allows high degree of compression. Japanese Patent Application Laid-Open No. 7-231390 discloses a technology of arithmetic-coding a distance between reconstructed multi-gradation data and dither threshold values as estimated probability.

Japanese Patent No. 1402929, Japanese Patent No. 2634793, and Japanese Patent No. 2713298 disclose a technology of collecting pixels with highly estimated probability and pixels with low estimated probability in predetermined pixel block units and encoding the respective pixels, although these patents do not refer to the dithered image. According to such technologies, it is possible to obtain an effect that compression efficiency does not decrease even when estimated probability within an image varies because pixels with high estimated probability are collected.

As a technique of performing processing on a dithered image having such periodicity and creating a simplified image through simplification such as low resolution and removal of a detailed structure, a technology of focusing on threshold values of a dither matrix has been known. For example, in Japanese Patent Application Laid-Open No. 9-135352, threshold values at positions to be thinned are previously dispersed for low resolution, and a density jump is minimized to achieve a higher degree of image quality. As explained above, a simplified image obtained by preserving only main information in an original image and removing unnecessary fine information has a smaller amount of codes when being compressed as compared to the original image, thus suppressing the costs at the time of its storage and reducing the time for its transfer.

The dither matrix has plural types such as a concentration type and a dispersion type. FIG. 88A to FIG. 88D show the concentration type and dispersion type dither matrices. FIG. 88A is multi-gradation data before being dithered, FIG. 88B is a 4×4 size concentration type dither matrix, FIG. 88C is a 4×4 size dispersion type dither matrix, and FIG. 88D is two gradation data after being dithered. In the examples of FIG. 88B and FIG. 88C, both of the dither sizes (i.e., the size of the dither matrix) are based on 4×4, but the dither size may be any size of 4×4 to 64×64, or may be any whose main size and auxiliary size may be different. The example of FIG. 88D shows the two gradation data obtained by dithering the multi-gradation data of FIG. 88A based on the dispersion type dither matrix of FIG. 88C.

For example, Japanese Patent Application Laid-Open No. 7-99581 discloses an example of image area separation for a binarized and reduced, a continuous element area is extracted from the reduced image, and this extracted area is integrated with the previously classified data to determine a type of image. In this processing example, since binary processing is executed in an image processor, which type of dither matrices (dither type and size) has been used for dithering is previously known.

The error diffusion method is a method of quantizing (binarizing) a pixel of multi-gradation image data using a predetermined threshold value, multiplying an error occurring at the time of its quantization by respective factors of an error diffusion matrix, and distributing the obtained values to adjacent pixels to be quantized. The image processed through this error diffusion method (error-diffused image) is excellent in resolution as compared to the dithered image, and has no periodicity appearing between dots unlike the dithered image.

As one of the conventional technologies on compression and encoding of an error-diffused image, there is Japanese Patent Application Laid-Open No. 7-79352, which discloses a technology of predicting density of a remarked area, selecting one of predetermined sorting rules based on this prediction, and concentrating pixels randomly dispersed by applying the rule to improve a compression rate.

There is a variety of threshold values for a dither matrix and factors of an error diffusion matrix. In a document with a plurality of objects such as text, graphics, or photograph, dither threshold values or error diffusion factors may sometimes be different from one another for each object within a page.

The conventional technology for the dithered image, however, is based on the fact that the threshold values for a used dither matrix are already known. Therefore, efficient encoding cannot be expected in any dithered image whose dither threshold values are unknown or dither threshold values vary.

SUMMARY OF THE INVENTION

It is an object of this invention to provide an image encoding method and apparatus capable of performing highly efficient encoding on data for a dithered image whose dither threshold values are unknown or vary, and to provide an image decoding method and apparatus for reconstructing dithered image data from the encoded data.

The conventional technology for an error-diffused image is based on previous assumption of a dot pattern produced with respect to original data (density). Therefore, this technology has a problem in encoding of the error-diffused image when error diffusion factors are unknown or error diffusion factors vary within the image. That is, when the error diffusion matrix (diffusion factors) varies, the produced dot pattern changes. Therefore, an effect of improving a compression rate due to dot concentration do not come up to expectations. This means that restriction of the type of selectable sorting rules results in limitation of effective types of error diffusion matrix.

However, in order to make the effective type of error diffusion matrix free from restriction so as to be capable of effectively encoding error-diffused image data in which the error diffusion matrix is unknown or changes in various ways, it is necessary to hold encoded data and the sorting rules, which results in increase in the amount of encoded data and complexity of data management.

Another object of this invention is to provide an image encoding method and apparatus capable of performing highly efficient encoding on error-diffused image data whose error diffusion matrix (error diffusion factors) is unknown or varies, and to provide an image decoding method and apparatus for reconstructing error-diffused image data from the encoded data without incurring increase in encoded data amounts and complexity of data management.

The dither matrix used for ordered dithering has a variety of sizes and threshold values. In a document with a plurality of objects such as text, graphics, or photograph, it is quite common that dither sizes and dither threshold values are different for each object within a page. In the conventional technology based on such assumption that dither threshold values are known, high-efficiency encoding cannot be expected in dithered image data such that the size and threshold values of its dither matrix are unknown or the size and threshold values of its dither matrix vary within a page.

A still another object of this invention is to provide an image encoding method also capable of performing high-efficiency encoding on dithered image data such that the size and threshold values of its dither matrix are unknown or the size and threshold values of its dither matrix vary.

The conventional technology is based on the fact that dither threshold values of a dithered image to be compressed are known. Therefore, image simplification cannot be performed on a dithered image whose dither threshold values are unknown.

A still another object of this invention is to provide an image creation apparatus capable of performing image simplification such as low resolution and removal of a detailed structure on a dithered image in which threshold values of a dither matrix are not known, that is, capable of obtaining a simplified image with a certain degree of quality without using dither threshold values.

Since inventions in Japanese Patent No. 1402929, Japanese Patent No. 2634793, and Japanese Patent No. 2713298 use run-length encoding, the number of runs (number of codes) produced per block is not constant, which makes it impossible to perform high speed processing.

Since inventions in Japanese Patent No. 1807514, Japanese Patent No. 2113692, and Japanese Patent No. 2113693 perform pattern encoding in units of plural bits, a problem on speed is not significant, but patterns are restricted to a limited type, which causes the processing to become irreversible processing or causes the dither matrix or the like to be restricted.

A still another object of this invention is to provide an image encoding apparatus and an image encoding method capable of performing reversible compression, obtaining a high compression rate, and performing image encoding at a high speed on any dithered images.

In an image processing apparatus, an image to be processed is not always multi-value data, but the image to be processed is originally a dithered binary-value image, which sometimes has no information for which dither has been used for processing of this binary-value image. Dither itself has many aspects, which includes a size and a type (concentration type, dispersion type) of a dither matrix, and an arrangement order of threshold values. Therefore, it is virtually impossible to hold various types of dither information so as to cover the whole.

A still another object of this invention is to provide an image processing apparatus capable of separating areas having different characteristics from one another within a dithered image (image area separation) even if dither information for the image that has been dithered (dithered image) is unknown.

In order to solve the problems, according to one aspect of this invention, an image encoding method for encoding image data using a block consisting of plural pixels as a unit of processing is provided. This image encoding method comprises the steps of extracting statistical information for each pixel value, from a plurality of encoded blocks adjacent to an encoding target block, at each corresponding position within the respective blocks; and performing encoding processing on the encoding target block using the extracted statistical information.

Further, it is desirable that the encoding step comprises the steps of selecting a reference pixel for each pixel within the encoding target block from the encoding target block and a plurality of adjacent blocks whose encoding order is earlier than the target block, based on the extracted statistical information; predicting a value of each pixel within the encoding target block from the selected reference pixels; and performing entropy encoding on an error between the value of each pixel within the encoding target block and its predicted value.

Further, in the selecting step, it is desirable to select a pixel as a reference pixel from the encoding target block and a plurality of adjacent blocks whose encoding order is earlier than the target block. More specifically, this pixel is placed at a position within a block having a value of statistical information such that a difference between this value and a value of statistical information for the position of an encoding target pixel in the encoding target block is within a specified range, and the pixel's encoding order is earlier than the encoding target pixel.

Further, in the encoding step, it is desirable to predict a value of an encoding target pixel from the value of statistical information for the position of the encoding target pixel within the encoding target block, and perform entropy encoding on an error between this predicted value and the value of the encoding target pixel.

Further, in the encoding step, it is desirable to order pixels within the encoding target block based on the statistical information and perform entropy encoding on the ordered pixels.

Further, in the encoding step, it is desirable to estimate a symbol appearance probability of an encoding target pixel from a total value of pixel values within a block to be encoded immediately before the encoding target block and the value of statistical information for the position of the encoding target pixel within the encoding target block, and perform arithmetic encoding on the encoding target pixel based on the estimated probability as a parameter.

According to another aspect of this invention, an image encoding apparatus which encodes image data using a block consisting of plural pixels as a unit of processing is provided. This image encoding apparatus comprises a statistics unit that extracts statistical information for each pixel value, from a plurality of encoded blocks adjacent to an encoding target block, at each corresponding position within the respective blocks; and an encoding processing unit that performs encoding on the encoding target block by using the statistical information extracted by the statistics unit.

Further, it is desirable that the encoding processing unit comprises a prediction unit that selects a reference pixel used for an encoding target pixel within an encoding target block from the encoding target block and a plurality of encoded blocks adjacent to the target block based on the statistical information, and predicts a value of the encoding target pixel from the reference pixel; an error detection unit that detects an error between the predicted value by the prediction unit and the value of the encoding target pixel; and an encoding unit that performs entropy encoding on the error detected by the error detection unit.

Further, it is desirable that the prediction unit selects an encoded pixel as a reference pixel from an encoding target block and a plurality of encoded blocks adjacent to the target block. More specifically, this encoded pixel is placed at a position within a block having a value of statistical information such that a difference between this value and a value of statistical information for the position of an encoding target pixel within the encoding target block is within a predetermined range.

Further, it is desirable that the encoding processing unit comprises a prediction unit that predicts a value of an encoding target pixel from the value of statistical information at a position of the encoding target pixel; an error detection unit that detects an error between the predicted value by the prediction unit and the value of the encoding target pixel; and an encoding unit that performs entropy encoding on the error detected by the error detection unit.

Further, it is desirable that the encoding processing unit comprises an image conversion unit that orders pixels within an encoding target block based on the statistical information; and an encoding unit that performs entropy encoding on the pixels within the encoding target block from the pixel first ordered by the image conversion unit.

Further, it is desirable that the encoding processing unit comprises a probability estimation unit that estimates a symbol appearance probability of an encoding target pixel from a total value of pixel values within an encoded block immediately before an encoding target block and a value of statistical information for the position of an encoding target pixel within the encoding target block; and an arithmetic encoding unit that performs arithmetic encoding on the encoding target pixel using the probability estimated by the probability estimation unit as a parameter.

Further, it is desirable that the statistics unit obtains statistical information by summing the pixel values.

Further, it is desirable that the statistics unit obtains statistical information by assigning heavier weights to a block closer to an encoding target block and summing the weighted pixel values.

Further, it is desirable that the statistics unit reads out statistical information from a table based on a combination of pixel values as address.

Further, it is desirable that the statistics unit obtains statistical information based on a transition state of a pixel value.

According to still another aspect of this invention, a computer-executable program is provided. This program makes a computer execute the image encoding method according to the invention.

According to still another aspect of this invention, an image decoding method for decoding encoded data for image data encoded using a block consisting of plural pixels as a unit of processing is provided. This image decoding method comprises the steps of extracting statistical information for each pixel value, from reconstructed image data for a plurality of blocks adjacent to a decoding target block, at each corresponding position in the respective blocks; and performing decoding processing on the decoding target block using the extracted statistical information.

Further, it is desirable that the decoding step comprises the steps of performing entropy decoding on encoded data, selecting a reference pixel used for the decoding target pixel within a decoding target block from reconstructed image data for the decoding target block and a plurality of blocks adjacent to the target block based on the statistical information, predicting a value of a decoding target pixel from a reference pixel, and outputting a sum of the predictive value and the value of the decoding target pixel obtained through entropy decoding or an exclusive OR between these two values as a pixel value of the reconstructed image data.

Further, in the predicting step, it is desirable to select a pixel as a reference pixel from reconstructed image data for a decoding target block and a plurality of blocks adjacent to the target block. More specifically, this pixel is placed at a position within a block having a value of statistical information such that a difference between this value and a value of statistical information for the position of a decoding target pixel in the decoding target block is within a predetermined range.

Further, it is desirable that the decoding step comprises the steps of performing entropy decoding on encoded data; predicting a value of a decoding target pixel from a value of statistical information for the position of the decoding target pixel within a decoding target block; and outputting a sum of the predictive value and the value of the decoding target pixel obtained through entropy decoding or an exclusive OR between these two values as a pixel value of the reconstructed image data.

Further, it is desirable that the decoding step comprises the steps of performing entropy decoding on encoded data; ordering the pixel values within the decoding target block obtained through entropy decoding based on the statistical information, and outputting the ordered pixel values as pixel values of reconstructed image data.

Further, the decoding step, it is desirable to estimate a symbol appearance probability of a decoding target pixel from a total value of pixel values in a block decoded immediately before a decoding target block and a value of statistical information for the position of a decoding target pixel within the decoding target block, and perform arithmetic decoding on encoded data based on the estimated probability as a parameter for the decoding target pixel.

According to still another aspect of this invention, an image decoding apparatus which decodes encoded data for image data encoded using a block consisting of plural pixels as a unit of processing is provided. This image decoding apparatus comprises a decoding processing unit that performs decoding processing to reconstruct image data from the encoded data, and a statistics unit that extracts statistical information for each pixel value, from the image data reconstructed by the decoding processing unit for a plurality of blocks adjacent to a decoding target block, at each corresponding position in the respective blocks. This decoding processing unit utilizes the statistical information executed by the statistics unit for decoding processing for the decoding target block.

Further, it is desirable that the decoding processing unit comprises a decoding unit that performs entropy decoding on encoded data; a prediction unit that selects a reference pixel for a decoding target pixel within a decoding target block from the reconstructed image data for the decoding target block and a plurality of blocks adjacent to the target block based on the statistical information extracted by the statistics unit, and predicts a value of the decoding target pixel from the reference pixel; and an output unit that outputs a sum of the predictive value obtained by the prediction unit and the value of the decoding target pixel obtained through entropy decoding by the decoding unit or an exclusive OR between these two values as a pixel value of the reconstructed image data.

Further, it is desirable that the prediction unit selects a pixel as a reference pixel from the reconstructed image data for a decoding target block and a plurality of blocks adjacent to the target block. More specifically, this pixel is placed at a position within a block having a value of statistical information such that a difference between this value and a value of statistical information for the position of a decoding target pixel in the decoding target block is within a predetermined range.

Further, it is desirable that the decoding processing unit comprises a decoding unit that performs entropy decoding on encoded data; a prediction unit that predicts a value of a decoding target pixel from a value of statistical information for the position of the decoding target pixel; and an output unit that outputs a sum of the predictive value obtained by the prediction unit and the value of the decoding target pixel obtained through entropy decoding by the decoding unit or an exclusive OR between these two values as a pixel value of the reconstructed image data.

Further, it is desirable that the decoding processing unit comprises a decoding unit that performs entropy decoding on encoded data; and an image conversion unit that orders pixel values within a decoding target block obtained through entropy decoding by the decoding unit based on the statistical information, and outputs the ordered values as pixel values of the reconstructed image data.

Further, it is desirable that the decoding processing unit comprises a probability estimation unit that estimates a symbol appearance probability of a decoding target pixel from a total value of pixel values within a decoded block immediately before a decoding target block and a value of statistical information for a position of a decoding target pixel within the decoding target block; and an arithmetic decoding unit that performs arithmetic decoding on encoded data using the probability estimated by the probability estimation unit as a parameter for the decoding target pixel.

Further, it is desirable that the statistics unit obtains statistical information by summing the pixel values.

Further, it is desirable that the statistics unit obtains statistical information by assigning heavier weights to a block closer to a decoding target block and summing the weighted pixel values.

Further, it is desirable that the statistics unit reads out statistical information from a table based on a combination of pixel values as address.

Further, it is desirable that the statistics unit obtains statistical information based on a transition state of a pixel value.

According to still another aspect of this invention, a computer-executable program is provided. This program makes a computer execute the image decoding method according to any of claims 18 to 23.

According to still another aspect of this invention, an image formation apparatus is provided. This image formation apparatus comprises an image input unit that inputs image data; the image encoding apparatus according to the invention that encodes the image data input through the image input unit, an image accumulation unit that accumulates the encoded data for image data by the image encoding apparatus, the image decoding apparatus according to the invention that decodes the encoded data accumulated in the image accumulation unit and reconstructs the image data, and a unit that forms an image for the image data decoded by the image decoding apparatus.

According to still another aspect of this invention, an image encoding method is provided. This image encoding method comprises the steps of measuring a dither size of each unit of processing that consists of a predetermined number of blocks where dithered image data is continuous; deciding a size of blocks as each processing unit corresponding to the measured dither size of the last processing unit; and determining whether the measured dither size of each processing unit has been changed from the measured dither size of the last processing unit. The image encoding method also comprises the steps of performing encoding processing on the data in the processing unit immediately after the processing unit, which is determined that the dither size has not been changed, using a statistical quantity having a correlation to dither threshold values extracted from the next previous processing unit to extract a statistical quantity; and performing encoding processing on the data in the processing unit immediately after the processing unit, which is determined that the dither size has been changed, without using the statistical quantity extracted from the next previous processing unit to extract a statistical quantity.

According to still another aspect of this invention, an image creation apparatus is provided. This image creation apparatus comprises a statistics unit that targets an area with plural blocks consisting of plural pixels as a unit, and obtains discretely statistical information for each pixel value at each corresponding position within the respective blocks; and an image creation unit that creates a simplified image through simplification of a target image by using the statistical information obtained by the statistics unit.

According to still another aspect of this invention, an image creation apparatus is provided. This image creation apparatus comprises a statistics unit that targets an area with plural blocks consisting of plural pixels as a unit, and obtains discretely statistical information for each pixel value at each corresponding position within the respective blocks; an image creation unit that creates a simplified image through simplification of a target image by using the statistical information obtained by the statistics unit; and a differential data creation unit that creates differential data between the simplified image created by the image creation unit and its target image.

According to still another aspect of this invention, an image encoding apparatus is provided. This image encoding apparatus comprises a prediction unit that obtains a predictive value of a remarked pixel from an encoded adjacent pixel; and a prediction-error generation unit that compares the predicted value of the remarked pixel obtained by the prediction unit and a real value of the remarked pixel, and generates a prediction error between the predicted value of the remarked pixel obtained by the prediction unit and the real value of the remarked pixel. This image encoding apparatus also comprises a first-order setting unit that sets the order of a predictive probability as a first order in each pixel within a block consisting of plural pixels; a multi-value unit that orders values of all the prediction errors for all the pixels within the block generated by the prediction-error generation unit according to the first order set by the first-order setting unit, and obtains one multi-value data; and an encoding unit that encodes the multi-value data obtained from the multi-value unit.

According to still another aspect of this invention, an image encoding method is provided. This image encoding method comprises the steps of obtaining a predictive value of a remarked pixel from an encoded adjacent pixel; generating a prediction error between the predicted value and its real pixel value; setting the order of a predictive probability as a first order in each pixel within a block consisting of plural pixels; ordering values of all the prediction errors for all the pixels within the block by the first order to obtain one multi-value data; and encoding the multi-value data.

According to still another aspect of this invention, an image processing apparatus is provided. This image processing apparatus comprises a dither size detection unit that detects periodicity of pixels in a dithered image and detects a dither size; and a separation unit that separates image areas of the dithered image from one another based on the dither size detected by the dither size detection unit.

According to still another aspect of this invention, an image processing apparatus is provided. This image processing apparatus comprises a pixel frequency detection unit that determines a predetermined dither size as one block in a dithered image that has been dithered by the predetermined dither size, and detects frequencies of pixel data in a plurality of blocks as pixel frequencies, from the dithered image; a dither type detection unit that detects a dither type based on the pixel frequencies detected by the pixel frequency detection unit; and a separation unit that separates image areas of the dithered image from one another based on the dither type detected by the dither type detection unit.

According to still another aspect of this invention, an image processing apparatus is provided. This image processing apparatus comprises a dither size detection unit that detects periodicity of pixels in a dithered image and detects a dither size; a pixel frequency detection unit that determines the dither size detected by the dither size detection unit as one block, and detects frequencies of pixel data in a plurality of blocks as pixel frequencies, from the dithered image; a dither type detection unit that detects a dither type based on the pixel frequencies detected by the pixel frequency detection unit; and a separation unit that separates image areas of the dithered image from one another based on the dither type detected by the dither type detection unit.

According to still another aspect of this invention, an image processing apparatus is provided. This image processing apparatus comprises a pixel frequency detection unit that determines a predetermined dither size as one block in a dithered image that has been dithered by the predetermined dither size, and detects frequencies of pixel data in a plurality of blocks as pixel frequencies, from the dithered image; a pixel-frequency distribution generation unit that generates a pixel frequency distribution from the pixel frequencies detected by the pixel frequency detection unit; and a separation unit that separates image areas of the dithered image from one another based on the pixel frequency distribution generated by the pixel-frequency distribution generation unit.

According to still another aspect of this invention, an image processing apparatus is provided. This image processing apparatus comprises a dither size detection unit that detects periodicity of pixels in a dithered image and detects a dither size; a pixel frequency detection unit that determines the dither size detected by the dither size detection unit as one block, and detects frequencies of pixel data in a plurality of blocks as pixel frequencies, from the dithered image; a pixel-frequency distribution generation unit that generates a pixel frequency distribution from the pixel frequencies detected by the pixel frequency detection unit; and a separation unit that separates image areas of the dithered image from one another based on the pixel frequency distribution generated by the pixel-frequency distribution generation unit.

Other objects and features of this invention will become understood from the following description with reference to the accompanying drawings.

BRIEF DESCRIPTION OF THE DRAWINGS

FIG. 6A shows a dither matrix;

FIG. 6B shows dithered image data;

FIG. 6C shows statistical information;

FIG. 10 shows reference pixels used to predict a value of an encoding target pixel;

FIG. 11 shows statistical information and predictive values at positions within a block; pixel values of an encoding target block; and prediction errors in the encoding target block;

Figure 13:
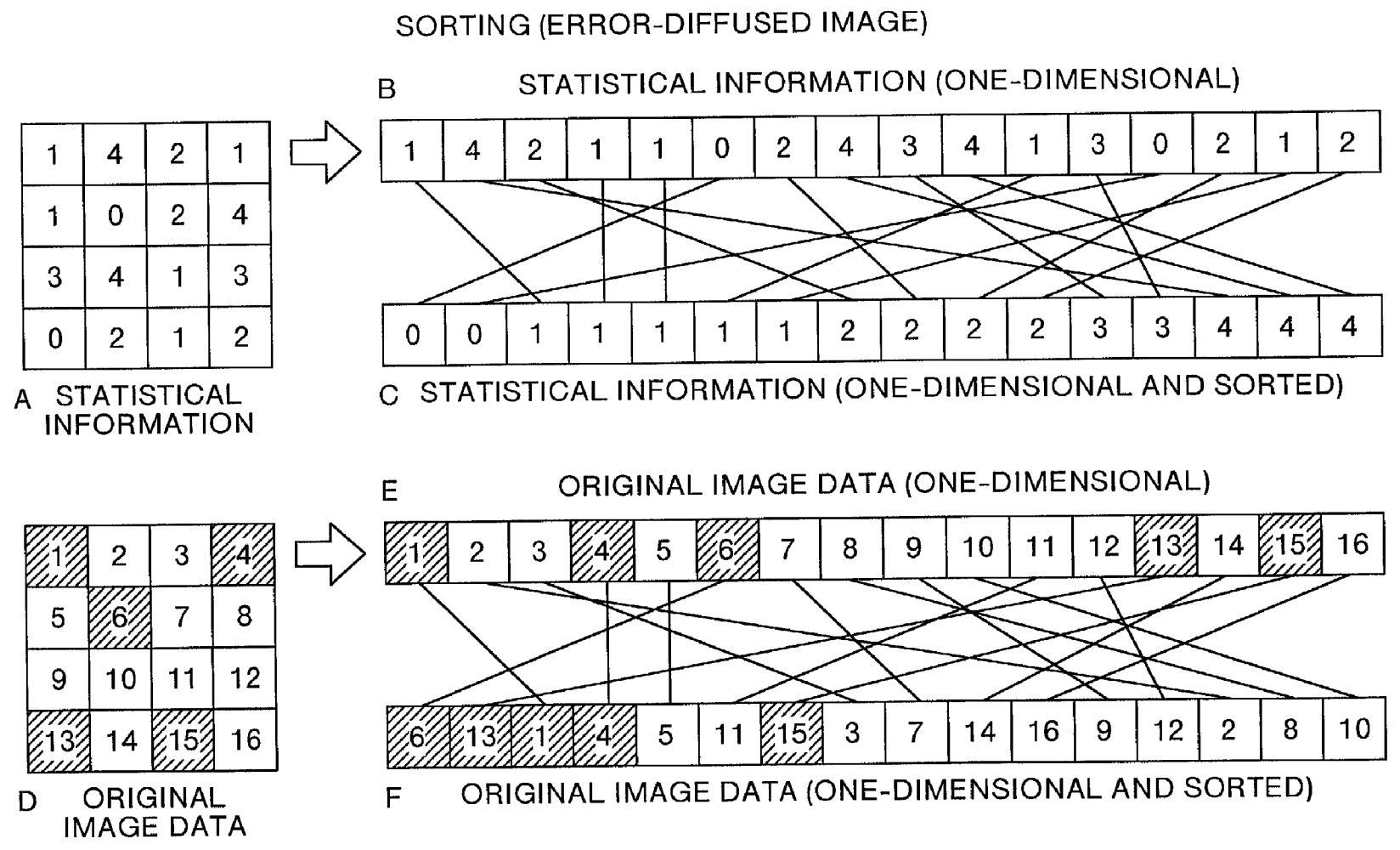

FIG. 13 shows statistical information; simple one-dimensional data for statistical information; data obtained by sorting the statistical information in its ascending order; pixel values and pixel numbers within one block of the error-diffused image; simple one-dimensional data for the pixels within the block; and data obtained by sorting the pixels within the block in ascending order by their statistical information values;

FIG. 25A shows an example of multi-gradation image data;

FIG. 25B shows an example of a dither matrix;

FIG. 25C shows dithered image data obtained by subjecting the multi-gradation image data to ordered dithering using the dither matrix;

FIG. 25D shows an example of a statistical quantity extracted from the dithered image data;

FIG. 27 shows an example of a table used to obtain the statistical quantity;

FIG. 46 shows a first configuration example of a statistics unit;

FIG. 47 shows a second configuration example of the statistics unit;

FIG. 60 shows a state in which the area consisting of six blocks has been encoded by a dither matrix;

FIG. 61 shows a second example of setting the zero-th order;

FIG. 62 shows an example of sorting data according to the zero-th order set in FIG. 61;

FIG. 63 shows an example of a table for creating statistical information;

FIG. 67 shows an example of a code table;

FIG. 71 shows an example of a dither size detection unit;

FIG. 72 shows the result of detecting the area AR as a part of the dithered image shown in FIG. 69 by the dither size detection unit;

FIG. 73 is a flow chart showing an image processing method of the image processing apparatus in FIG. 70;

FIG. 76A to FIG. 76E show how to detect pixel frequencies by a pixel frequency detection unit;

FIG. 86A to FIG. 86C show the ordered dither method (Part 1);

FIG. 87A to FIG. 87C show the ordered dither method (Part 2); and

FIG. 88A to FIG. 88D show the ordered dither method (Part 3).

DETAILED DESCRIPTION OF THE PREFERRED EMBODIMENTS

Preferred embodiments of the image encoding method, program for making a computer execute the image encoding method, image encoding apparatus, image decoding method, program for making a computer execute the image decoding method, image decoding apparatus, image processing method, and the image formation apparatus according to this invention will be explained in detail below with reference to the attached drawings in the order of [First embodiment], [Second embodiment], [Third embodiment], [Fourth embodiment], and [Fifth embodiment]. Explanation may be omitted or simplified by using the same reference numbers for the same sections or corresponding sections in some drawings of the attached drawings in order to reduce respective explanations that overlap one another.

Figure 1:
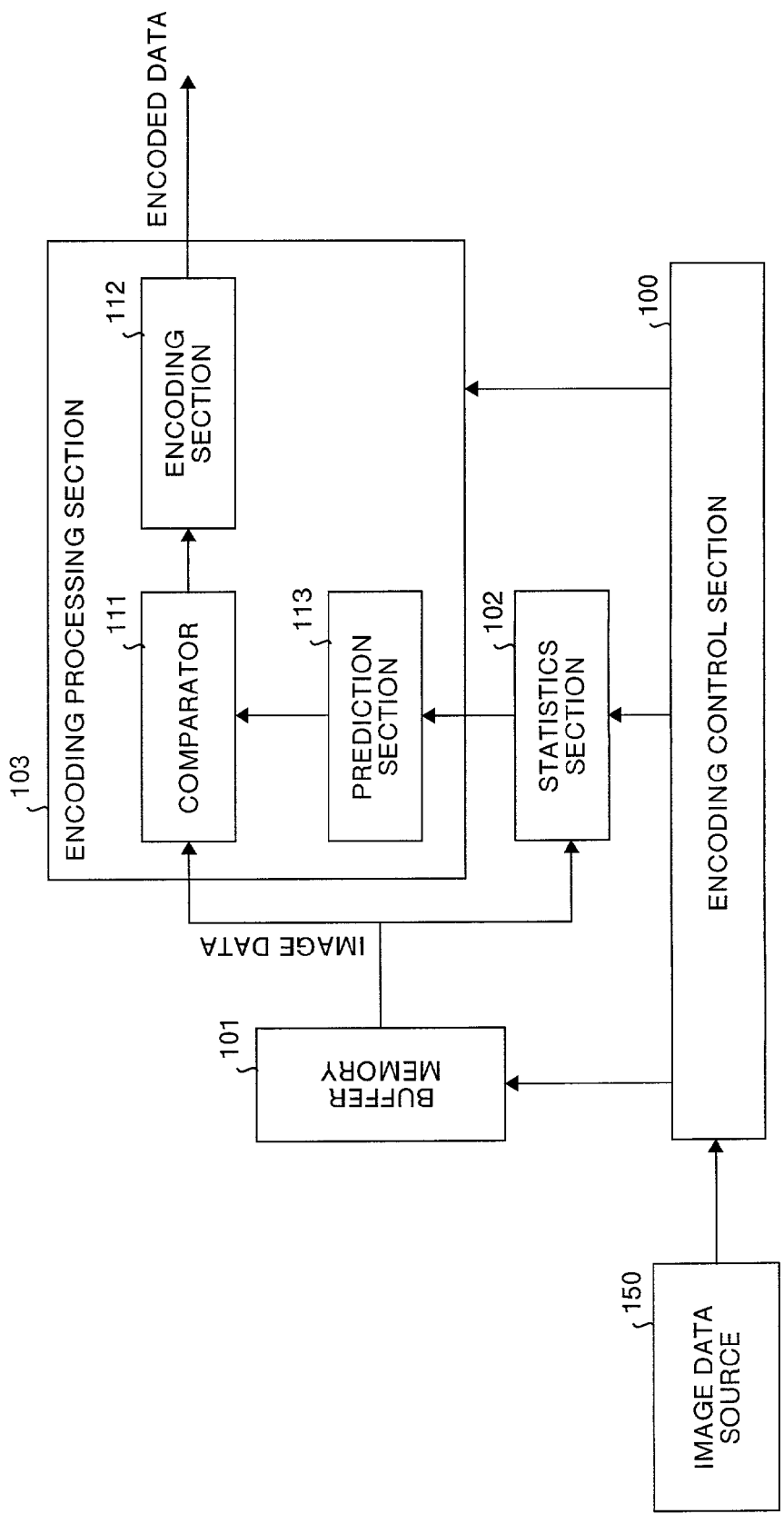
FIG. 1 is a block diagram showing an example of an image encoding apparatus according to a first embodiment of this invention.
Figure 2:
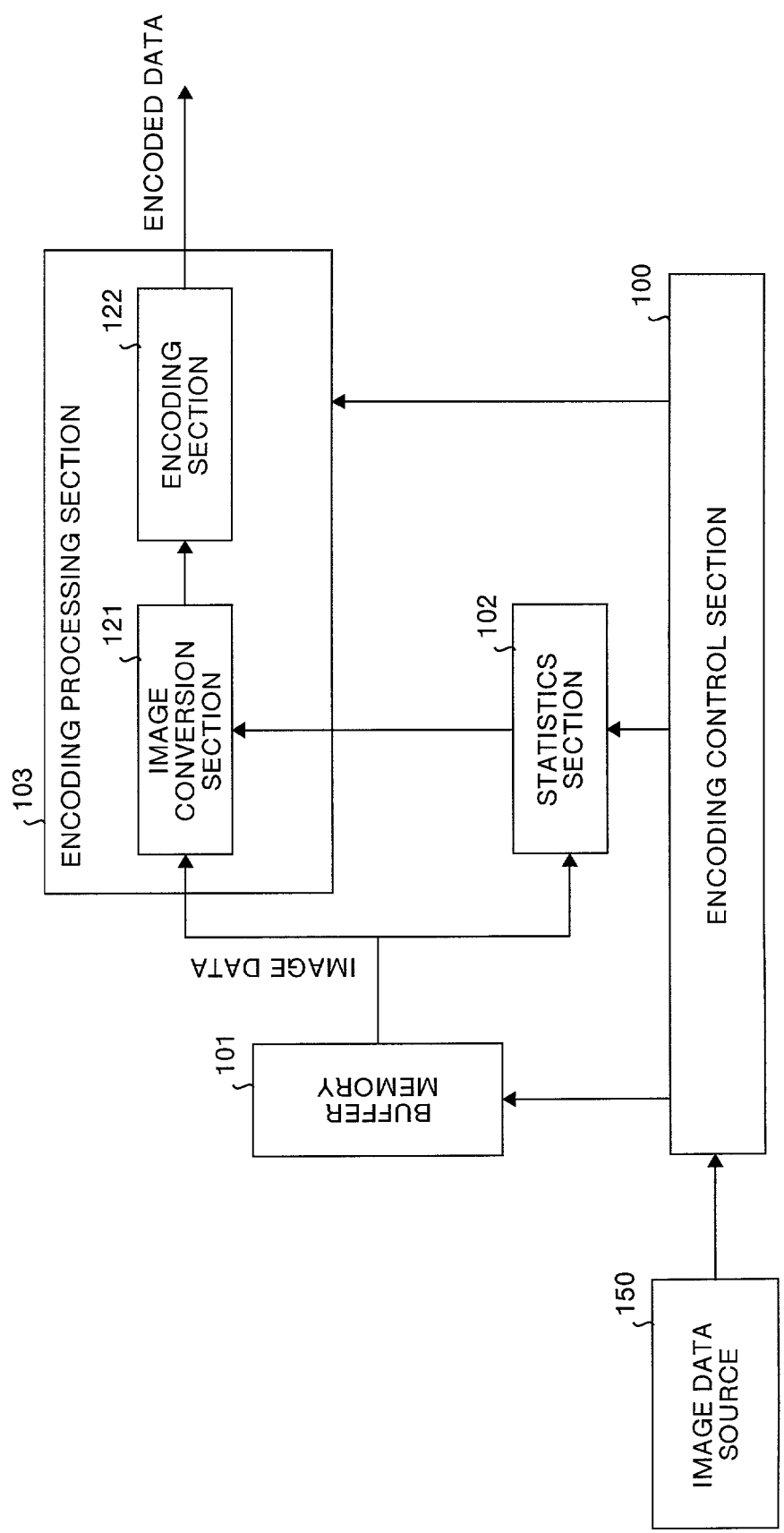
FIG. 2 is a block diagram showing another example of the image encoding apparatus according to the first embodiment.
Figure 3:
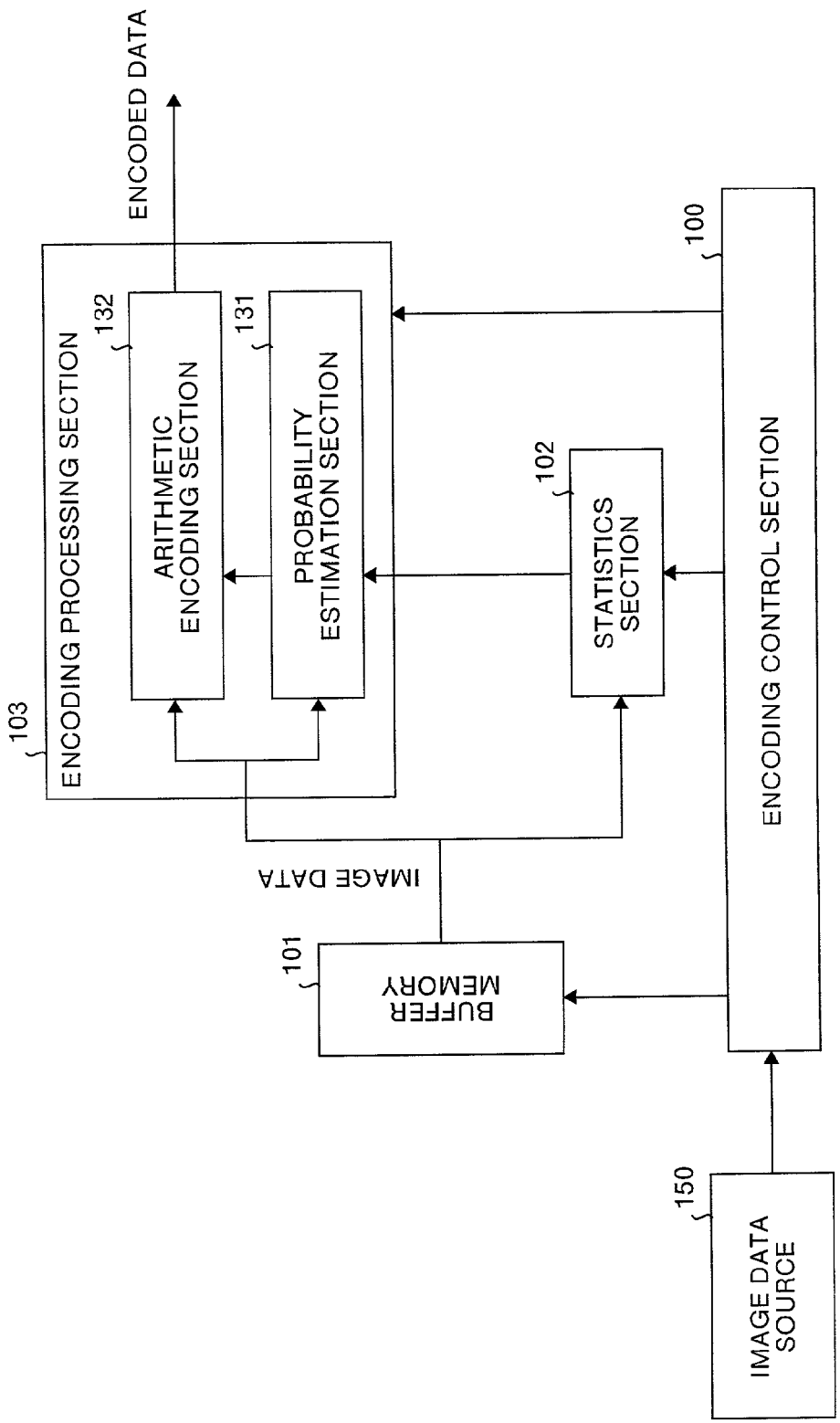
FIG. 3 is a block diagram showing another example of the image encoding apparatus according to the first embodiment.

A first embodiment of this invention will be explained below with reference to FIG. 1 to FIG. 21. The first embodiment mainly relates to the first object and the second object and claim 1 to claim 35. The block diagrams in FIG. 1, FIG. 2, and FIG. 3 show examples of the respective configurations of the image encoding apparatus according to the first embodiment of this invention. Each of these image encoding apparatuses comprises the encoding control section 100, buffer memory 101, statistics section 102, and the encoding processing section 103. In the image encoding apparatuses of FIG. 1 to FIG. 3, the configurations of the encoding control sections 100, buffer memories 101, and the statistics sections 102 are common, but the configurations of the encoding processing sections 103 are different from each other. Therefore, at first, these common parts will be explained.

The encoding control section 100 performs controls for loading image data for a block required for processing into the buffer memory 101 from a source 150 (e.g., memory) for encoding target image data (dithered image data or error-diffused image data). The encoding control section 100 also controls the operation of the statistics section 102 and the encoding processing section 103. The statistics section 102 extracts statistical information by referring to the image data in the buffer memory 101. The encoding processing section 103 encodes the image data in the buffer memory 101 by using the statistical information extracted by the statistics section 102. The encoding processing section 103 has the respective internal configurations as shown in FIG. 1 to FIG. 3. When the image data source 150 is a memory, this memory may be used as the buffer memory 101, so that the buffer memory 101 may not be provided in the image encoding apparatus itself.

Figures 4, 5:
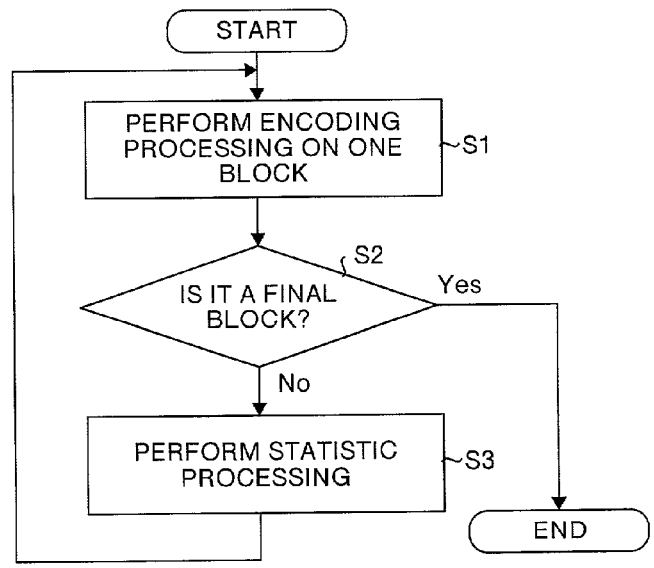
FIG. 4 is a flow chart schematically showing overall operation of the image encoding apparatus according to the first embodiment.
FIG. 5 shows an example of multi-gradation image data.

The schematic encoding operation of the image encoding apparatuses of FIG. 1 to FIG. 3 will be explained below with reference to the flow chart of FIG. 4. FIG. 4 shows a schematic processing flow of the encoding operation of the image encoding apparatuses in FIG. 1 to FIG. 3. In FIG. 4, the encoding processing section 103 performs encoding processing on one-block image data under the control of the encoding control section 100 (step S1), and the statistics section 102 extracts statistical information (step S3). The encoding processing section 103 executes encoding processing to the next block using the extracted statistical information (step S1). Likewise, the encoding processing based on a block as a unit of processing is continued up to a final block (step S2, Yes), where the encoding operation for one image data is finished. A 4×4-pixel area is assumed here to be one block. Details of the image encoding apparatuses shown in FIG. 1 to FIG. 3 will be explained below.

At first, image data as a target to be processed will be explained. FIG. 5 shows an example of multi-gradation image data, and respective numerical values in the figure indicate gradation levels of the pixels.

FIG. 6A to FIG. 6C show how to calculate statistical information when the dither method is used. FIG. 6A is an example of a dither matrix, in which numerical values are threshold values. In contrast to the multi-gradation image data of FIG. 5, dithered image data obtained by subjecting data to ordered dithering (binarization) using the dither matrix of FIG. 6A is shown in FIG. 6B.

Figures 7A, 7B, 7C, 7D, 7E:
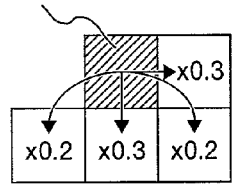
FIG. 7A shows an error diffusion matrix.
FIG. 7B shows pixel values of a remarked pixel and adjacent four pixels before being processed.
FIG. 7C shows pixel values of the adjacent four pixels after the remarked pixel is quantized.
FIG. 7D shows error-diffused image data.
FIG. 7E shows statistical information.

FIG. 7A to FIG. 7E show how to calculate statistical information when the error diffusion method is used. FIG. 7A is an example of an error diffusion matrix. A quantization error of a shaded remarked pixel is multiplied by respective factors (error diffusion factors) shown in the figure, and the obtained values are distributed to the peripheral pixels. Therefore, when the remarked pixel is quantized (binarized) based on the pixel values as shown in FIG. 7B, the peripheral pixel values are changed as shown in FIG. 7C through distribution of the quantization error. FIG. 7D shows the error-diffused image data obtained by subjecting the values to error diffusion processing using the error diffusion matrix shown in FIG. 7A.

The statistics sections 102 shown in FIG. 1 to FIG. 3 will be explained below.

When the dithered image data is to be targeted, in the seven blocks whose positional relations are as indicated by the heavy lines in FIG. 6B, for example, the statistics section 102 extracts values each obtained by summing pixel values at respective corresponding positions in the blocks as statistical information. The statistical information obtained in such a manner from the seven blocks shown in FIG. 6B is shown in FIG. 6C. Each value of this statistical information corresponds to the number of summed black pixels at respective corresponding positions in the seven blocks. The position with a larger value as statistical information indicates that it had a strong tendency to become a black pixel. That is, this value means that the dither threshold value at the position was low. Thus, the statistical information values have a close correlation to the dither threshold values. In this invention, the statistical information extracted from the seven blocks surrounded by the heavy lines of FIG. 6B is used instead of the dither threshold values for encoding the block, on the lower right side of the figure, that is not surrounded by the heavy lines. Thus, high-efficiency encoding can be performed even on the dithered image data without known dither threshold values.

Likewise, when the error-diffused image data is to be targeted, in the seven blocks whose positional relations are as indicated by the heavy lines in FIG. 7D, for example, the statistics section 102 extracts values each obtained by summing pixel values at respective corresponding positions in the blocks as statistical information. The statistical information obtained in such a manner from the seven blocks shown in FIG. 7D is shown in FIG. 7E. The position with a larger value as the statistical information indicates that it had a strong tendency to become a black pixel in the past. If dots of the error-diffused image appear randomly without periodicity, statistical information values at respective corresponding positions are supposed to be closer to the same values as one another as statistical parameters (number of target blocks for statistics) increase. This can be said irrespective of sizes of the blocks. Conversely, when the statistical parameters are smaller, variations in statistical information values at the positions become large, which means that a dot appeared repeatedly in the near past at the position whose value was large. This means that there is in turn little likelihood that the dot will appear at the position in the near future. Likewise, it can be said that a dot will easily appear in the near future at a position whose statistical information value is small. Based on such an idea, in this invention, the statistical information extracted from the seven blocks surrounded by the heavy lines of FIG. 7D is used for encoding of the block on the lower right side of the figure, which is not surrounded by the heavy lines. Thus, high-efficiency encoding can be performed even on the error-diffused image data without known error diffusion factors.

The statistical information is updated as an encoding target block shifts to the next. Therefore, by using such statistical information for encoding, appropriate high-efficiency encoding becomes possible even when a dither threshold value or an error diffusion factor is changed within an image.

Even when either one of the dithered image data and the error-diffused image data is to be targeted, an extracting method of statistical information in the statistics section 102 is not limited only to the above-mentioned method. For example, it is possible to increase or decrease the number of target blocks for statistics, or to alter a positional relation with an encoding target block. It is also possible to extract values, obtained by assigning heavier weights to a block closer to the encoding target block and summing the weighted pixel values, as statistical information. Since it is considered that the data for a block closer to the encoding target block has a closer correlation to the data for the encoding target block, it can be expected that the method of extracting the weighted and summed values realizes the processing more reflecting the changes in image contents.

Figures 8, 9:
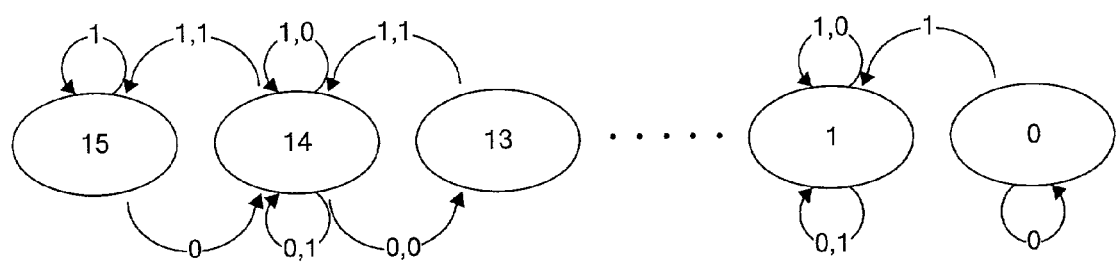
FIG. 8 shows an example of a table to obtain statistical information.
FIG. 9 is a diagram of state transition used to create statistical information.
Figure 12:
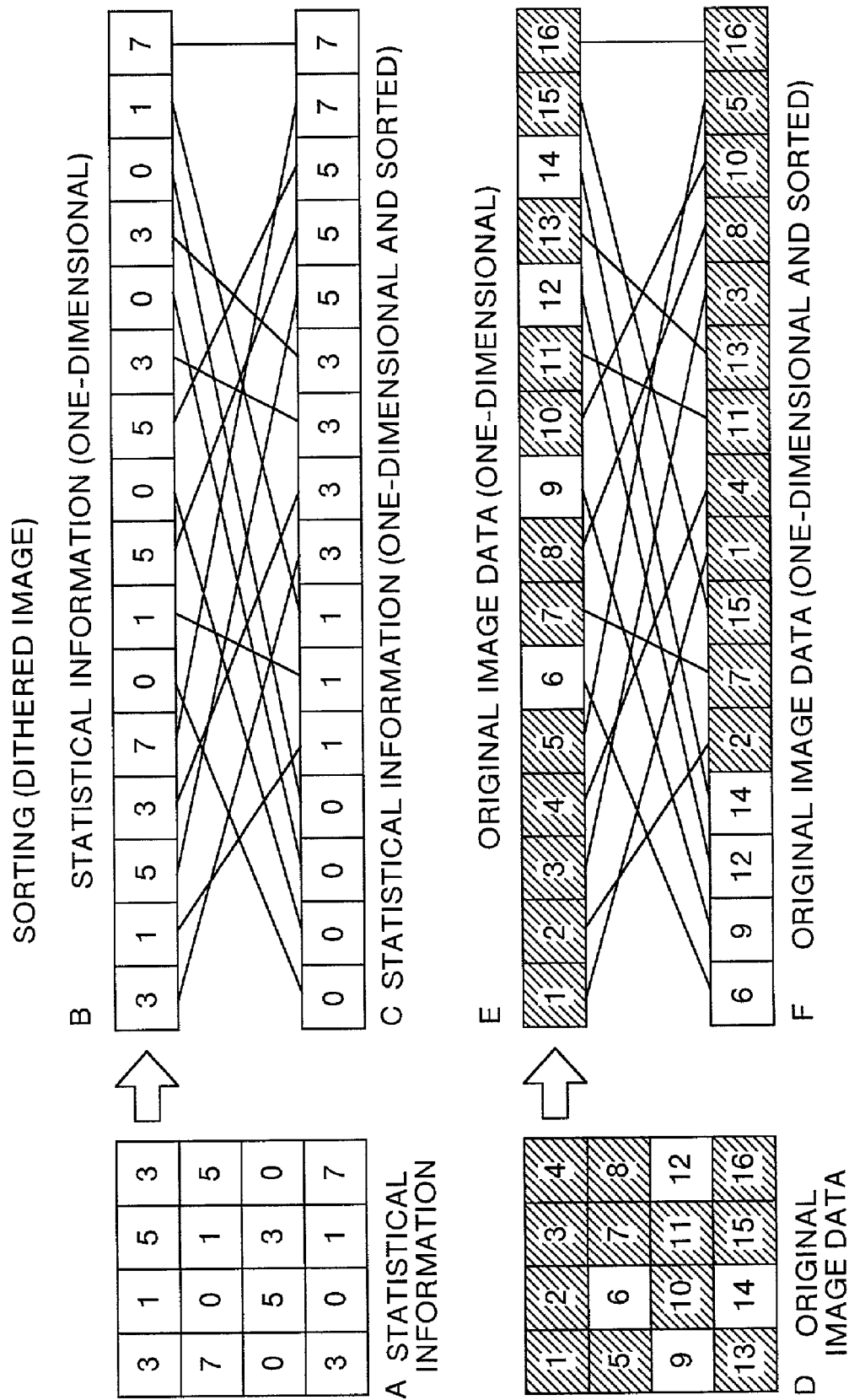
FIG. 12 shows statistical information; simple one-dimensional data for statistical information; data obtained by sorting the statistical information in ascending order; pixel values and pixel numbers Within one block of the dithered image; simple one-dimensional data for the pixels within the block; and data obtained by sorting the pixels within the block in ascending order by their statistical information values.

In place of calculating statistical information through arithmetic, for example, the table as shown in FIG. 8 may be used to calculate the information. This table is applied to the case where statistics of the seven blocks are to be collected as explained above, and each bit in each address corresponds to a pixel value at each remarked position in the seven blocks (a black pixel is "1" and a white pixel is "0"). For example, if all the pixel values at remarked positions in the seven blocks are "0" (white pixel), the address becomes "0000000", and "0" is obtained as a statistical information value. If the pixel value at the remarked position of the seventh block is "1" and the pixel values at the remarked positions of the first to sixth blocks are "0", the address becomes "0000001", and "7" is obtained as a statistical information value. The method of using such a table can realize high speed processing as compared to that of any method based on arithmetic, and has an advantage such that it can flexibly cope with various methods of extracting statistical information.

As another method of extracting statistical information, a statistical information value may be determined from a transition state of pixel values at positions of a block. FIG. 9 shows this method. In FIG. 9, each of the circled numerical values indicates a state, and the state to which the remarked position of a block currently belongs becomes a statistical information value at the position. For example, when the statistical information value at the remarked position of a block is now "14" and the pixel values at the remarked positions are "1" in the next two blocks, the state is shifted to the left hand side and the statistical information value becomes "15". If the pixel values at the remarked positions are "0" in these two blocks, the state is shifted to the right hand side and the statistical information value becomes "13". If the pixel value at the remarked position of either one of the two blocks is "1" and the pixel value at the remarked position of the other block is "0", the state is not shifted, and the statistical information value remains "14" as it is. As explained above, the method of determining a statistical information value according to the transition state of pixel values has an advantage such that image data only for the last two blocks is required for the data to be stored for extraction of statistical information.

In the explanation below, statistical information is supposed to be extracted from image data for the seven blocks as explained above with reference to FIG. 6 and FIG. 7.

The image encoding apparatus as shown in FIG. 1 will be explained in detail below. The encoding processing section 103 in this image encoding apparatus is configured to perform predictive encoding, and is formed with the comparison section 111, encoding section 112, and the prediction section 113. The prediction section 113 is a unit for predicting a value of an encoding target pixel. The comparison section 111 is a unit for detecting an error (prediction error) between the predicted value and the actual value of the encoding target pixel. The unit outputs "0" when the value of the encoding target pixel and its predictive value match with each other, and outputs "1" when the two values do not match. That is, the comparison section 111 takes an exclusive OR between the encoding target pixel value and its predictive value. The encoding section 112 is a unit for performing entropy encoding such as run-length encoding on prediction error data output from the comparison section 111. Based on such a configuration, "0" is continuously output from the comparison section 111 in a block where prediction by the prediction section 113 is succeeded. Thus, high-efficiency compression and encoding become possible.

The method of predicting pixel values in the prediction section 113 is as follows.

The prediction method in the case of encoding dithered image data will be explained below with reference to FIG. 10. When the dithered image data is targeted, a value of an encoding target pixel is predicted by referring to encoded pixels adjacent to the encoding target pixel. In order to enhance prediction precision, it is required to select a pixel having a close correlation to the encoding target pixel as a reference pixel. In this invention, an encoded pixel at a position within a block, whose statistical information value is the same as or the closest to the statistical information value at the position of the encoding target pixel, is selected as a reference pixel from the encoding target block and the adjacent encoded blocks.

Assume that the eight blocks in FIG. 10 are the same as the eight blocks shown in FIG. 6B. The statistical information as shown in FIG. 6C is obtained as statistical information for the encoding target block on the lower right side of FIG. 10. Referring to the statistical information as shown in FIG. 6C, it is found that the statistical information value at the position of the encoding target pixel shown in FIG. 10 is "3" and there are three more positions, within the block, each at which the statistical information value is "3". Accordingly, if any of pixels at the positions having the same statistical information values is selected as a reference pixel, the pixels at the positions shown by the sign b in the adjacent seven blocks and the encoding target block in FIG. 10 are selected as reference pixels. The fact that the statistical information values are the same as or close to each other means that the dither threshold values are close to each other. In fact, referring to the dither matrix shown in FIG. 6A, the dither threshold value at the position (at the lower left corner) of the encoding target pixel is "70". Each difference between this target pixel and the respective dither threshold values "90", "80", and "50" at the positions of the reference pixels is within a range of ±20. That is, the pixels having a close correlation to the encoding target pixel are selected as reference pixels. Therefore, by calculating values of these reference pixels based on majority rule and determining a predictive value, high-precision prediction becomes possible.

Although only the pixels at the positions having the same statistical information value as that of the encoding target pixel are selected as reference pixels in this example, a method of selecting pixels at positions having a statistical information value approximate to the statistical information value at the position of the encoding target pixel (e.g., the difference is within a range of ±1) may be used. Such a method is also included in this invention.

The prediction method used for the case where error-diffused image data is to be encoded will be explained below with reference to FIG. 11. For encoding the error-diffused image data, the prediction section 113 determines a predictive value based on only statistical information. More specifically, the statistical information values from "0" to "1" are classified as a group A, and the statistical information values from "2" to "7" are classified as a group B. If the statistical information value at a position of an encoding target pixel belongs to the group A, its predictive value will be set to "1" (black pixel), while if it belongs to the group B, its predictive value will be set to "0" (white pixel).

For example, referring to the encoding target block shown in FIG. 7D, the statistical information shown in FIG. 11A (the same as FIG. 7E) is extracted. The shaded positions are predicted as black pixels, and the other positions are predicted as white pixels. The original image data for the encoding target block is as shown in FIG. 11B, therefore, a prediction error at each position within the encoding target block becomes as shown in FIG. 11C. As is clear from the comparison between FIG. 11C and FIG. 11B, "0" increases in the prediction error data, thus improving a compression rate.

Figure 21:
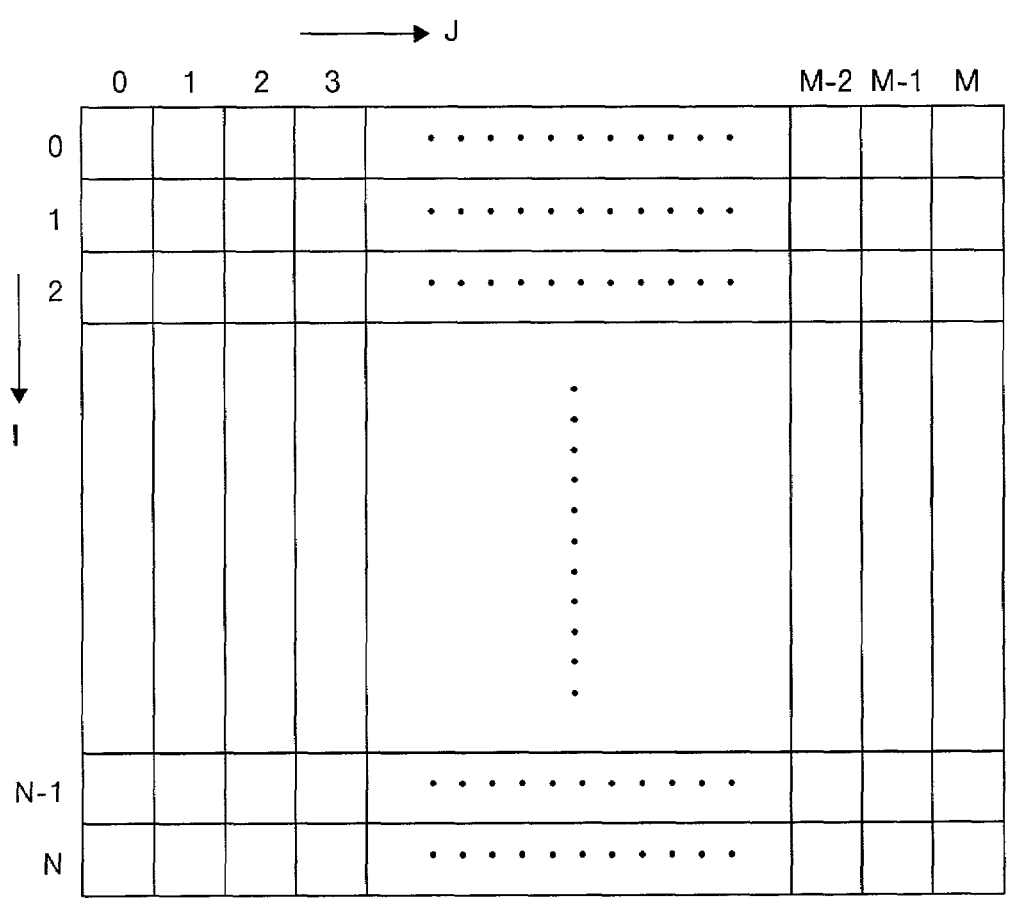
FIG. 21 shows block arrays in the image.

The operation of the image encoding apparatus shown in FIG. 1 will be explained in more detail below assuming that the image data is a cluster of blocks (I, J) as shown in FIG. 21. It is assumed that virtual blocks, in which all pixels are white ones (0), exist on the periphery of the image data. The processing is performed by using the virtual blocks instead of blocks that do not exist on the block array of I=0 and on the left end part and the right end part of each block array.

The encoding control section 100 clears the buffer memory 101 (having memory capacity for eight blocks) and the statistics section 102, loads image data of a block (0, 0) as a first encoding target block from the image data source 150 into the buffer memory 101, and orders the encoding processing section 103 to execute the encoding processing (FIG. 4, step S1). In this case, all the statistical information values output from the statistics section 102 are "0". Since the encoded seven blocks adjacent to the encoding target block (See FIG. 6B and FIG. 7D) do not really exist, virtual seven blocks are assumed to exist and handled. If target image data is dithered image data, the prediction section 113 determines a predictive value from reference pixels selected in the above manner based on the statistical information to be output, and the comparison section 111 outputs an error between the predicted value and the encoding target pixel value. This prediction error data is encoded by the encoding section 112. If the target image data is error-diffused image data, the prediction section 113 determines a predictive value based on only the statistical information in the above manner.

When the encoding processing on the block (0, 0) is finished, the encoding control section 100 orders the statistics section 102 to extract statistical information (FIG. 4, step S3). In this case, the statistical information is extracted, by means of the above method, from the block (0, 0) within the buffer memory 101 and the seven blocks consisting of the virtual blocks in which the values at all the positions are "0".

Subsequently, the image data for the block (0, 1) on the right is written in the buffer memory 101, and the encoding processing is executed. The last extracted statistical information is used for this encoding processing. If the target image data is dithered image data, the prediction section 113 determines a predictive value from the reference pixels selected from the block (0, 0) in the buffer memory 101 and the seven blocks as virtual blocks based on the statistical information. If the target image data is error-diffused image data, the prediction section 113 determines a predictive value based on only the statistical information.

The same operation is repeated thereafter. Data for a required block is overwritten on data for an unnecessary block on the buffer memory 101 while each block is processed.

For example, when the block (1, 3) is a target to be encoded, the adjacent seven blocks (0, 1), (0, 2), (0, 3), (0, 4), (1, 0), (1, 1), and (1, 2) are real ones, so that all the real data for these blocks are written in the buffer memory 101, and an encoding target pixel value is predicted using the data for the real reference pixels (in the case of dithered image data). When the block (1, 3) is encoded, the data for the block (0, 5) is overwritten on the data for the block (0, 1), which has become unnecessary, on the buffer memory 101, and statistical information is extracted from the data for the real seven blocks. The data for the next encoding target block (1, 4) is overwritten on the data for the block (1, 0) on the buffer memory 101, and a value of the encoding target pixel is predicted by using the real reference pixel data (in the case of dithered image data). Encoding is continued in such a manner up to the final block (N, M), where a series of encoding operation is finished.

The image encoding apparatus shown in FIG. 2 will be explained in detail below. The encoding processing section 103 in the image encoding apparatus of FIG. 2 is configured to encode pixels within an encoding target block in the order based on statistical information. The encoding processing section 103 comprises the image conversion section 121 that orders 16 pixels within the block based on statistical information, and the encoding section 122 that performs entropy encoding such as run-length encoding on the ordered pixel array.

FIG. 12A to FIG. 12F and FIG. 13A to FIG. 13F show operations how to order pixels based on statistical information by the image conversion section 121. FIG. 12A to FIG. 12F show the case of dithered image data, and FIG. 13A to FIG. 13F show the case of error-diffused image data. FIG. 12A and FIG. 13A show statistical information, which is the same as that of FIG. 6C or FIG. 7E. FIG. 12D and FIG. 13D show an encoding target block the same as that of FIG. 6B or FIG. 7D, in which the numerical values indicate pixel numbers and the shaded positions indicate black pixels. By simply arranging the 16 pixels within the encoding target block from the first pixel to the 16th pixel, one-dimensional information as shown in FIG. 12E and FIG. 13E is obtained, but encoding efficiency is low due to a large number of runs. Therefore, the statistical information is arranged simply to one-dimensional like FIG. 12B and FIG. 13B, and this one-dimensional information is rearranged in ascending order by the statistical information values as shown in FIG. 12C and FIG. 13C. One-to-one conversion based on the sorted statistical information is performed on the 16 pixels within the encoding target block. That is, the 16 pixels are ordered from the pixel whose statistical information value is small to the pixel whose statistical information value is large, i.e., in ascending order. FIG. 12F and FIG. 13F show a pixel array after the pixels are ordered or sorted. In these figures, the number of runs are largely decreased as compared to the case where the information is simply converted to one-dimensional, thus more effective encoding being possible.

The actual processing of the image conversion section 121 includes reading the pixels in the encoding target block from the buffer memory 101 in order by the ordered pixels and outputting the pixels to the encoding section 122. Alternatively, the image conversion section 121 once reads the first pixel to the 16th pixel in this order and holds them inside the section and outputs these pixels in order by the ordered pixels.

The 16 pixels in the encoding target block may be ordered in descending order by statistical information values. Any image encoding apparatuses and image encoding methods for performing such ordering are also included in this invention.

The overall operation of the image encoding apparatus shown in FIG. 2 is the same as that of the image encoding apparatus shown in FIG. 1. However, this operation is not based on the predictive encoding, so that a memory capacity only for seven blocks is sufficient for the buffer memory 101 because it is not necessary to refer to the adjacent seven blocks for encoding each of the blocks even when the dithered image data is targeted. For example, when the block (1, 3) in FIG. 21 is a target to be encoded, by writing the data for the blocks (0, 2), (0, 3), (0, 4), (0, 5), (1, 1), (1, 2), and (1, 3) on the buffer memory 101, encoding of the block (1, 3) and extraction of statistical information for the next block (1, 4) are possible.

The image encoding apparatus shown in FIG. 3 will be explained in detail below. The encoding processing section 103 in the image encoding apparatus is configured to perform arithmetic encoding representing Markov encoding. The encoding processing section 103 comprises a probability estimation section 131 that estimates a symbol appearance probability of an encoding target pixel, and an arithmetic encoding section 132 that performs arithmetic encoding on the encoding target pixel using the estimated probability as a parameter. The probability estimation section 131 outputs an absolute value (distance) of a difference, as estimated probability information, between the number of black pixels (total value of pixel values) within an encoded block immediately before the encoding target block and a statistical information value at the position of an encoding target pixel.

Figure 14:
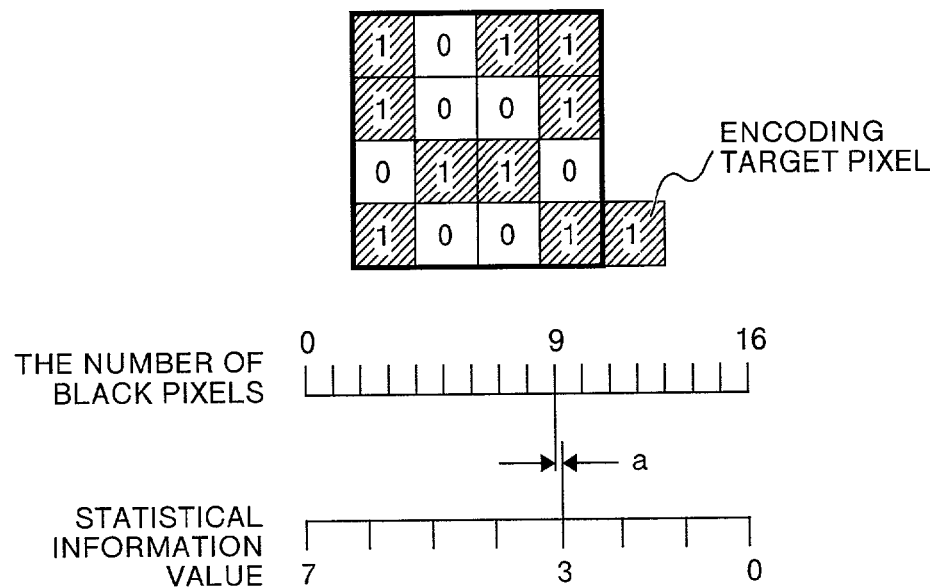
FIG. 14 shows how to estimate a symbol appearance probability of an encoding target pixel in the dithered image.
Figure 15:
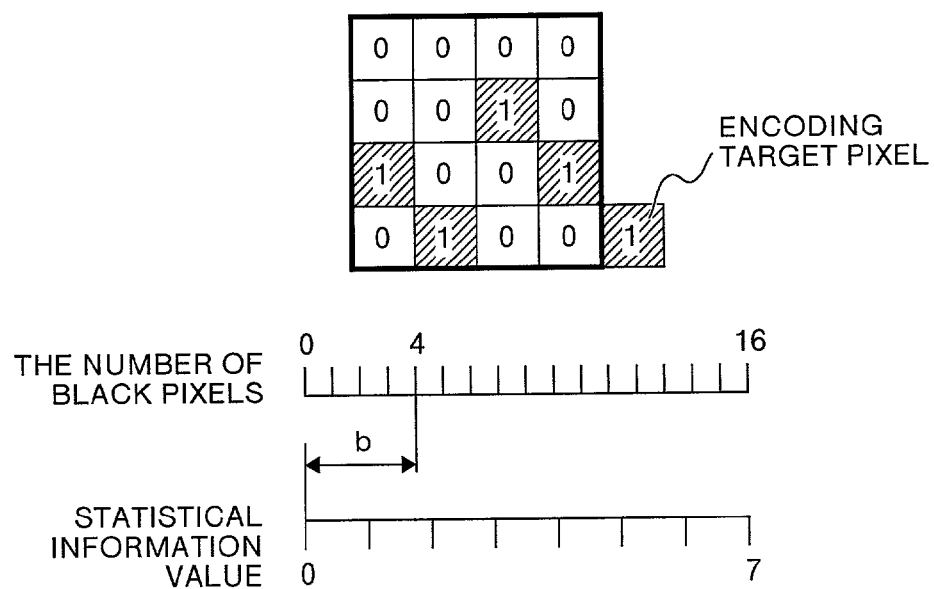
FIG. 15 shows how to estimate a symbol appearance probability of an encoding target pixel in the error-diffused image.

FIG. 14 shows how to estimate a probability when the pixel on the lower left corner of the encoding target block shown in FIG. 6B is an encoding target pixel. FIG. 15 shows how to estimate a probability when the pixel on the lower left corner of the encoding target block shown in FIG. 7D is an encoding target pixel. The distances a and b in the figures are information for the estimated probability. The wider the distance, the closer the estimated probability to 1 or 0. While the distance is narrower, the estimated probability is closer to 0.5. As shown in FIG. 15, if the number of black pixels is on the right side from the statistical information value, the encoding target pixel is predicted as a black pixel. The arithmetic encoding section 132 performs arithmetic encoding on an error between this predictive value and the actual pixel value based on the estimated probability as a parameter.

The overall operation of the image encoding apparatus shown in FIG. 3 is the same as that of the image encoding apparatus shown in FIG. 1. However, the buffer memory 101 requires a memory capacity only for seven blocks like the image encoding apparatus shown in FIG. 2.

The above-mentioned image encoding apparatus has a configuration in which the encoding processing section 103 and the statistics section 102 operate alternately. However, the apparatus may be configured to concurrently operate the encoding processing section 103 and the statistics section 102. Any image encoding apparatuses and image encoding methods having such a configuration are also included in this invention.

The above-mentioned image encoding apparatus has a configuration such that encoding processing and extraction of statistical information are executed with one pass. However, it is also possible to have such a configuration that statistical information for all the blocks is extracted at the first pass and each block is encoded by using the extracted statistical information at the second pass. Such a two pass method requires a memory to store whole image data and statistical information. However, if an image data source is a memory capable of storing the whole image data, the image encoding apparatus only has a buffer memory like the previously mentioned image encoding apparatus and a memory to store statistical information. Further, when statistical information is extracted or a pixel value is predicted from a block whose encoding order is earlier than the encoding target block, encoding data can be reconstructed to its original image data without transferring the statistical information to the decoding side. Conversely, if any block, whose encoding order is later than the encoding target block, is used for extraction of statistical information, improvement in compression can be expected. That is because information for adjacent blocks, including the block whose encoding order is later than the encoding target block, having a close correlation to the encoding target block can be used although the statistical information needs to be transferred to the decoding side. Any image encoding apparatuses and image encoding methods using such a two pass method are also included in this invention.

The image decoding apparatus according to the first embodiment will be explained below.

Figure 16:
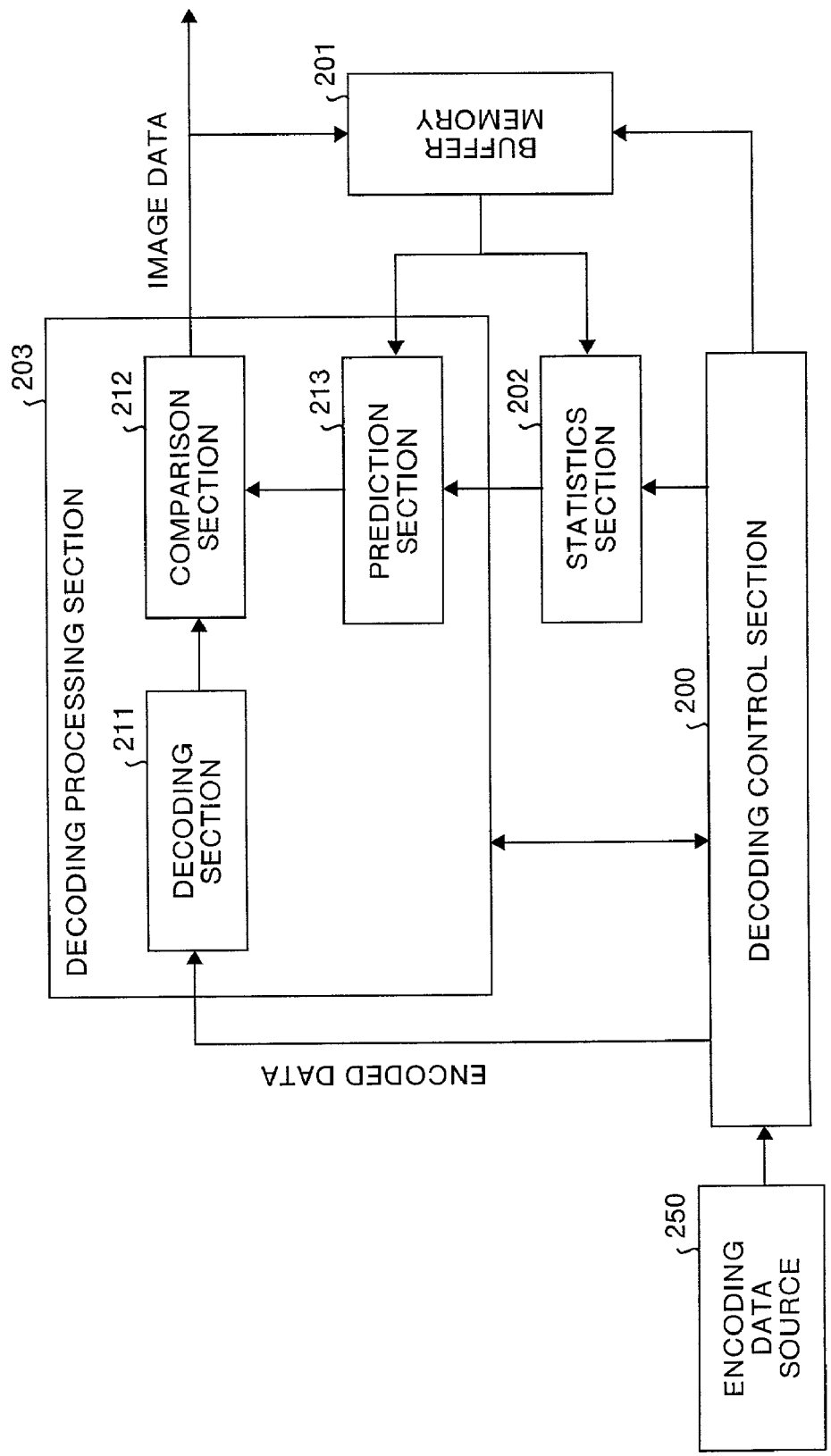
FIG. 16 is a block diagram showing an example of an image decoding apparatus according to the first embodiment.
Figure 17:
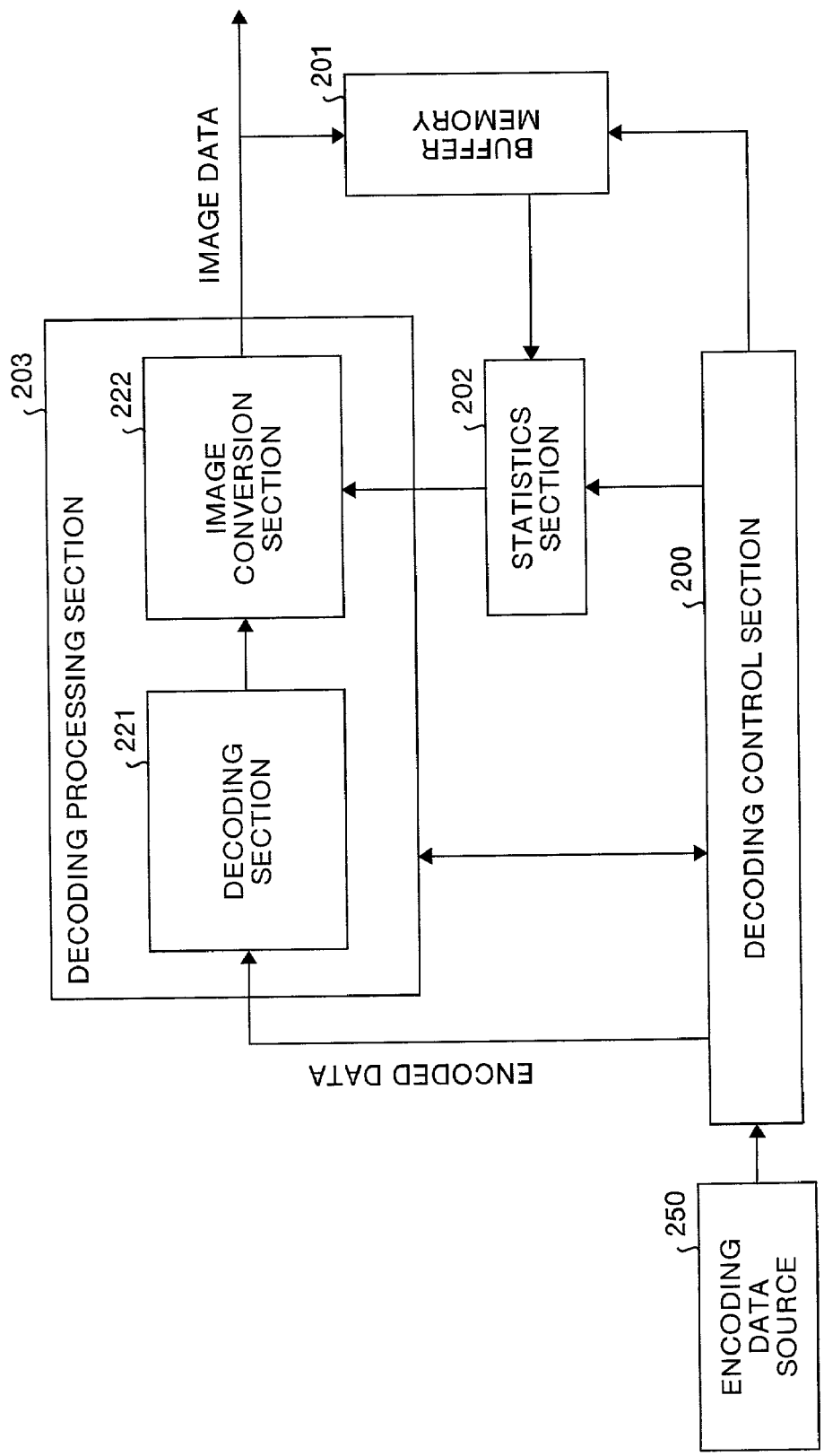
FIG. 17 is a block diagram showing another example of the image decoding apparatus according to the first embodiment.
Figure 18:
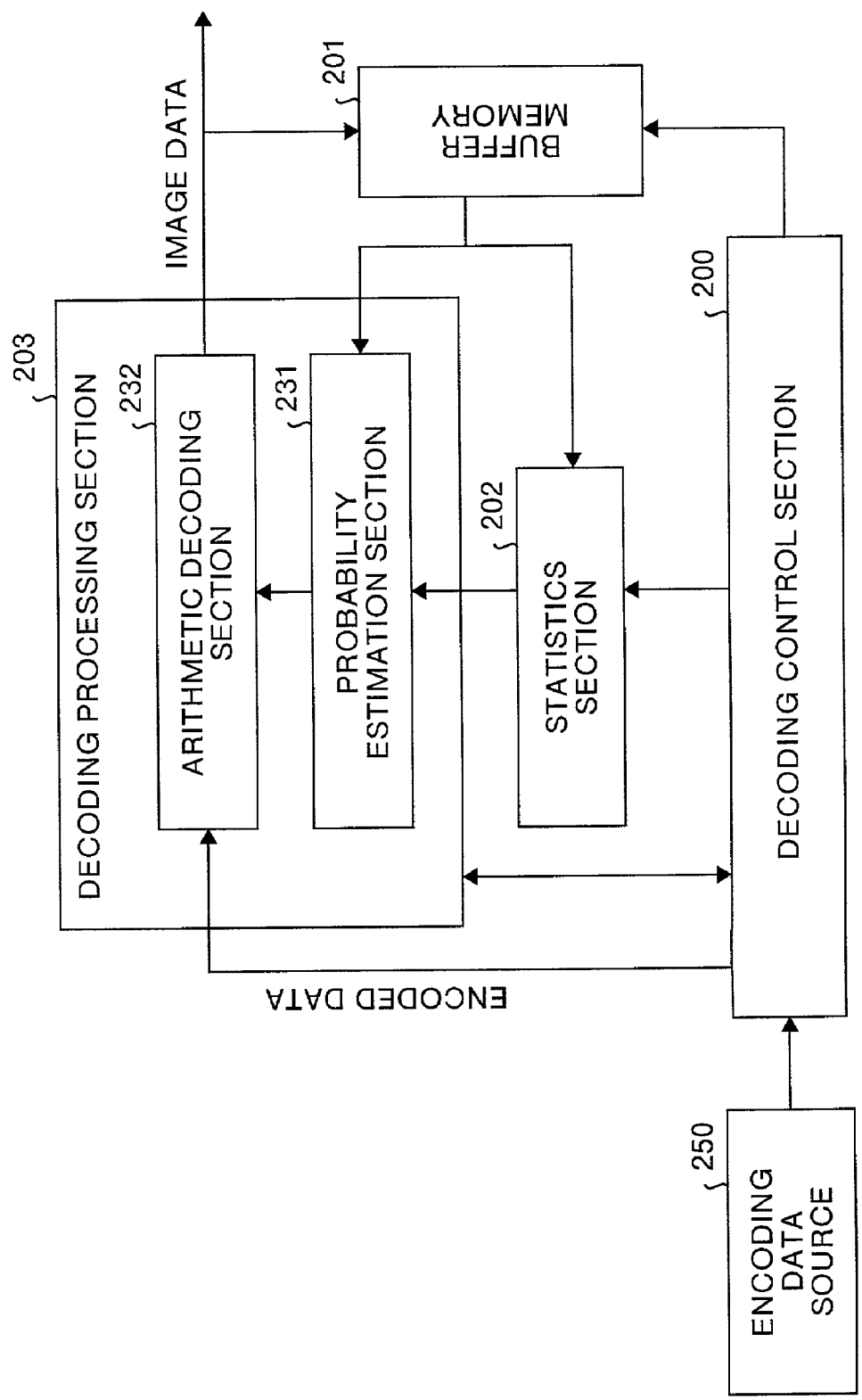
FIG. 18 is a block diagram showing another example of the image decoding apparatus according to the first embodiment.

FIG. 16 is a block diagram of the image decoding apparatus that is applied for decoding the data encoded by the image encoding apparatus of FIG. 1. FIG. 17 is a block diagram of the image decoding apparatus that is applied for decoding the data encoded by the image encoding apparatus of FIG. 2. FIG. 18 is a block diagram of the image decoding apparatus that is applied for decoding the data encoded by the image encoding apparatus of FIG. 3.

Each of these image decoding apparatuses comprises the decoding control section 200, buffer memory 201, statistics section 202, and the decoding processing section 203. The decoding control section 200 is a unit for controlling the operation of the statistics section 202 and the decoding processing section 203, synchronizing to the decoding processing by the decoding processing section 203 to transmit encoded data from an encoded data source 250 (e.g., memory) to the buffer memory 101, controlling write-in of reconstructed image data into the buffer memory 201 and read-out of the reconstructed image data from the buffer memory 201. The buffer memory 201 temporarily stores reconstructed image data (dithered image data or error-diffused image data) by one page or some blocks referred to for decoding operation. The statistics section 202 is a unit for extracting statistical information the same as that of the encoding side from the reconstructed image data within the buffer memory 201. The decoding processing section 203 is a unit for reconstructing encoded data to its original image data through decoding processing by using the statistical information extracted by the statistics section 202. The decoding processing sections 203 have respective internal configurations as shown in FIG. 16, FIG. 17, and FIG. 18. When the memory for storing reconstructed image data is provided outside the image decoding apparatus, this memory is used as the buffer memory 201 and the image decoding apparatus itself may not have the buffer memory 201. Any image decoding apparatuses having such a configuration are also included in this invention.

Figure 19:
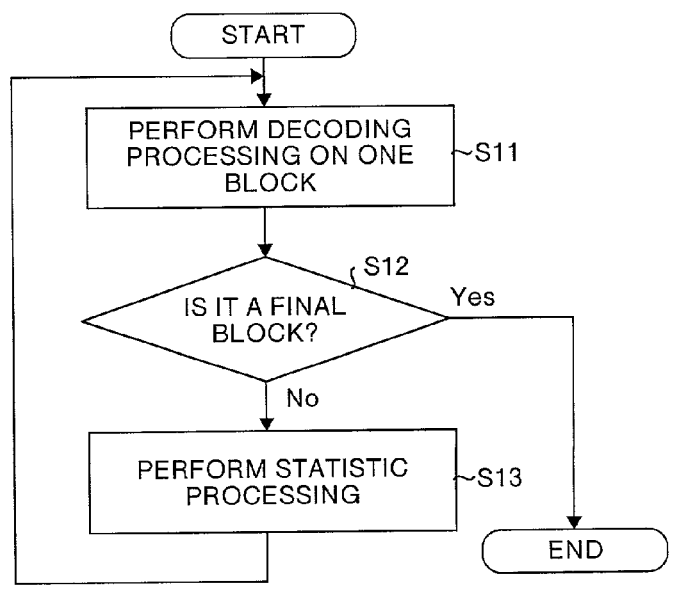
FIG. 19 is a flow chart schematically showing overall operation of the image decoding apparatus according to the first embodiment.

FIG. 19 shows a schematic processing flow of these image decoding apparatuses. The decoding operation is reverse to the encoding operation, and its outline is as follows. The decoding processing section 203 performs decoding processing on encoded data to be reconstructed to one-block image data under the control of the decoding control section 200 (step S11), and the statistics section 202 extracts statistical information for reconstructing the next one-block image data (step S23). The decoding processing section 203 executes decoding processing to the next one-block data using the extracted statistical information (step S11). Likewise, the decoding processing based on such a block as a unit of processing is continued up to the final block (step S12, Yes), where the decoding operation is finished. Like in the encoding, the decoding processing is executed based on assumption that virtual blocks with all the pixel values of 0 exist on the periphery of the image.

The decoding processing section 203 in the image decoding apparatus shown in FIG. 16 comprises the decoding section 211 for performing entropy decoding on encoded data, prediction section 213 for predicting a value of a decoding target pixel, and the comparison section 212 for taking an exclusive OR between the value of the decoding target pixel decoded by the decoding section 211 and its predictive value by the prediction section 213. Output of the comparison section 212 becomes pixel values of the reconstructed image data. The comparison section 212 determines a sum of the entropy decoded pixel value (prediction error) and its predictive value, but takes an exclusive OR here because binary data of one bit is processed. When the encoded data for dithered image data is to be decoded, the prediction section 213 determines a predictive value in the same manner as that of the encoding side. More specifically, this predictive value is determined from reference pixels, in the reconstructed image data within the buffer memory 201, selected in the same manner as that of the encoding side based on the statistical information extracted by the statistics section 202. When the encoded data for error-diffused image data is to be decoded, the prediction section 213 determines a predictive value based on only statistical information in the same manner as that of the encoding side.

The decoding processing section 203 in the image decoding apparatus shown in FIG. 17 comprises a decoding section 221 that performs entropy decoding on the encoded data, and an image conversion section 222 that orders the pixel values within the block decoded by the decoding section 221 in the same manner as that of the encoding side based on the statistical information extracted by the statistics section 202, and outputs the ordered values as pixel values of the reconstructed image data.

The decoding processing section 203 in the image encoding apparatus shown in FIG. 18 comprises a probability estimation section 231 that estimates a symbol appearance probability of a decoding target pixel, in the same manner as that of the encoding side, from the number of black pixels (total value of pixel values) in the reconstructed image data in the block immediately before the decoding target block within the buffer memory 201 and also from the statistical information extracted by the statistics section 202. This decoding processing section 203 also comprises an arithmetic decoding section 232 that performs arithmetic decoding on the encoded data using the estimated probability information as a parameter.

Up to this point, explanation has been given based on the block having a 4×4 pixel size assuming that the dither matrix is a 4×4 pixel size. However, when the dither matrices have different sizes, the size of the block may be selected according to the size of the dither matrix.

As a block, a one-dimensional block such as a block with four pixels in the lateral direction and one pixel in the longitudinal direction may also be used. In this case, the end of each line in the horizontal direction and the header of the next line are handled as if they are successively connected, and by extracting statistical information and predicting values of encoding/decoding target pixels by referring to the block before encoding/decoding target blocks, the whole image can be serially processed along a scanning line. According to such a processing method, controls can be simplified, and buffer memory capacity of image data can be reduced. Any image encoding and decoding apparatuses having such a configuration and methods for the same are also included in this invention.

Although explanation has been given assuming that binary image data (dithered image data or error-diffused image data) is processed, the present invention can be also applied to multi-value dithered image data or error-diffused image data. When the multi-value image data is to be targeted, the configuration may be such that the comparison section 111 on the encoding side is replaced with a means for calculating a difference between the value of an encoding target pixel and its predictive value and the comparison section 212 on the decoding side is replaced with a means for calculating a sum of an entropy-decoded pixel value and its predictive value. Any image encoding and decoding apparatuses having such a configuration and methods for the same are also included in this invention.

The sequence of processing for the image encoding apparatus or the image encoding method according to the first embodiment, and the sequence of processing for the image decoding apparatus or the image decoding method according to the first embodiment can be realized by software by using hardware resources of a computer such as a PC comprising a processor and a memory. When the sequence of processing is realized on the computer, the program for this purpose is loaded into the memory of the computer from any of recording media such as a magnetic disk, an optical disk, a magneto-optical disk, or a semiconductor memory device, or is loaded into the memory of the computer through a network. Any recording medium with such a program recorded is also included in this invention.

The above-mentioned image encoding apparatus and image decoding apparatus according to the first embodiment can be applied to various types of image processing apparatus for image filing, image formation, or image transfer. Any image processing apparatus in which at least one of the image encoding apparatus and the image decoding apparatus of the first embodiment is built-in is also included in this invention.

As an example of such an image processing apparatus, an image formation apparatus to which the image encoding apparatus and the image decoding apparatus of the first embodiment are applied will be explained below with reference to FIG. 20.

Figure 20:
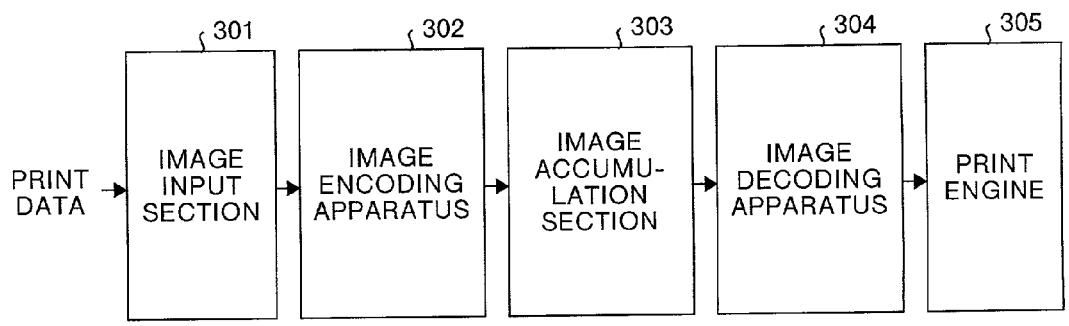
FIG. 20 is a block diagram showing an example of an image formation apparatus using the image encoding apparatus and the image decoding apparatus according to the first embodiment.

The image formation apparatus shown in FIG. 20 is a laser beam printer that performs image formation by a page unit. In FIG. 20, legend 301 represents an image input section for inputting image data. This image input section expands print data described in page description language (PDL) given from the outside, for example, to image data such as dithered image data or error-diffused image data. Legend 302 represents an image encoding apparatus for encoding input image data. The above-mentioned image encoding apparatus according to this invention is used as this image encoding apparatus 302. Legend 303 represents an image accumulation section that accumulates the data encoded by the image encoding apparatus 302. Legend 304 represents an image decoding section that reads in the encoded data from the image accumulation section 303 to be decoded, and reconstructs its original image data. The above-mentioned image decoding apparatus according to this invention is used as this image decoding section 304. Legend 305 represents a print engine, which is a unit for image formation of the reconstructed dithered image data or error-diffused image data. This print engine 305 scans a photoreceptor with a laser beam whose brightness is modulated according to the reconstructed image data to form an electrostatic latent image of the image, develops this latent image, transfers the developed image onto printing paper, and fixes it.

In this type of laser beam printer, pages of a document are printed continuously. Therefore, before starting the printing operation, image data for all the pages of the document needs to be prepared. If dithered image data or error-diffused image data is accumulated as it is, the image accumulation section 303 requires a large-capacity memory. However, in the laser beam printer shown here, the image data for the document is compressed and encoded, and then accumulated in the image accumulation section 303, thus largely reducing the memory capacity required for the image accumulation section 303.

Figure 22:
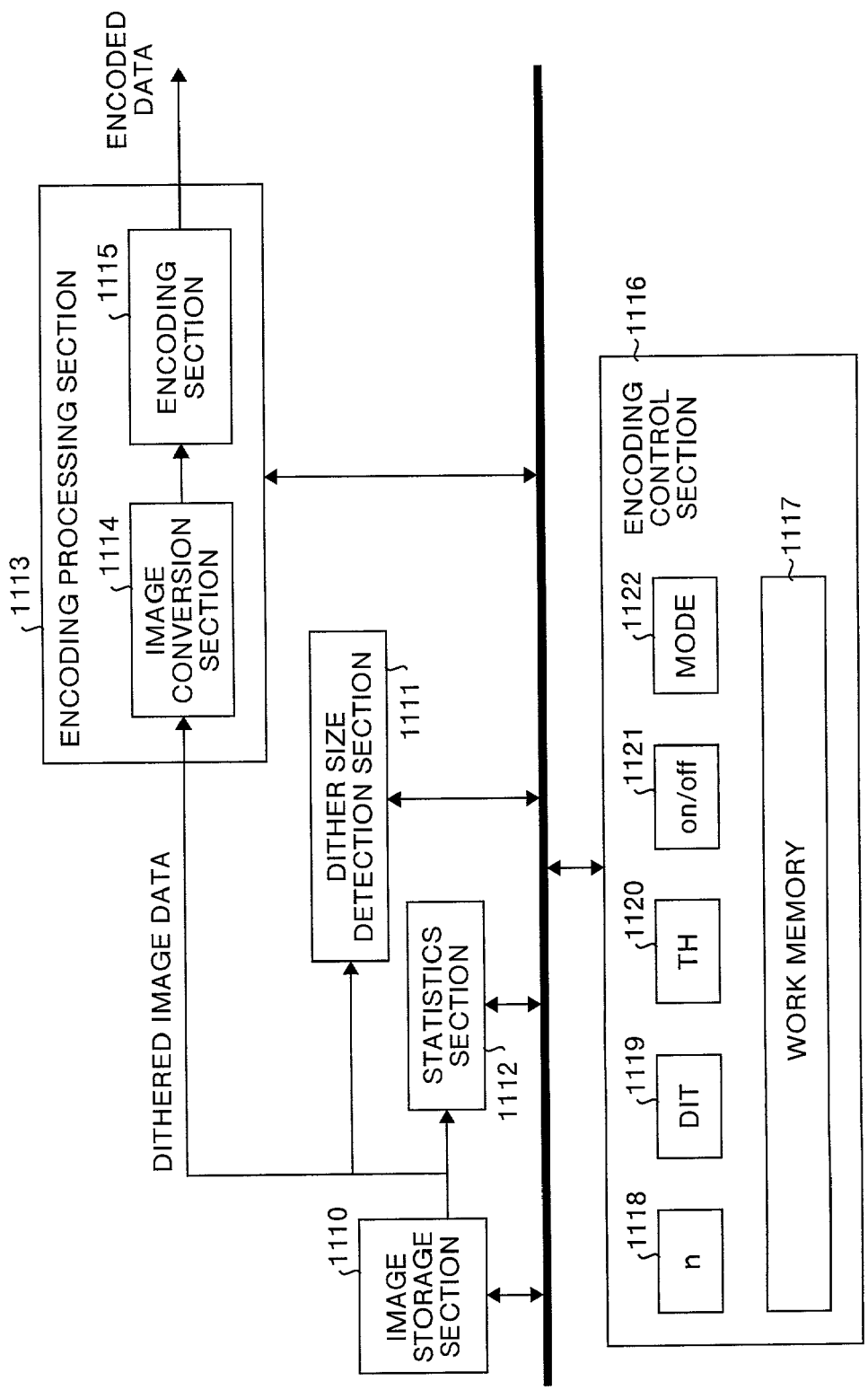
FIG. 22 is a block diagram showing an example of an image encoding apparatus according to a second embodiment of this invention.

A second embodiment will be explained below with reference to FIG. 22 to FIG. 44. The second embodiment mainly relates to the third object of this invention and claim 36. The block diagram in FIG. 22 shows an example of an image encoding apparatus according to the second embodiment. The image encoding apparatus shown here comprises the image storage section 1110 that temporarily stores dithered image data, dither size detection section 1111 that measures a size of a dither matrix (dither size) from the dithered image data, and the statistics section 1112 that extracts a statistical quantity correlated to a dither threshold value from the dithered image data. The image encoding apparatus also comprises the encoding processing section 1113 that performs encoding processing on the dithered image data so as to compress the amount of its information and outputs the encoded data, and the encoding control section 1116 that controls operations of the sections, determines a measured value of the dither size, determines a block size, and checks the change of the dither size.

The encoding processing section 1113 utilizes the extracted statistical quantities to effectively encode dithered image data having dither matrices of different sizes and threshold values. The encoding processing section 1113 shown here comprises the image conversion section 1114 that converts the dithered image data to a form with which the data can be more efficiently encoded, and the encoding section 1115 that allocates codes to image data input through the image conversion section 1114 and generates encoded data. It is explained here that the image conversion section 1114 sorts the pixel order as image conversion and the encoding section 1115 performs entropy encoding such as run-length encoding or Huffman encoding on the image data after the pixels are sorted. However, as explained later, the configuration of the encoding processing section 1113 is not limited only by this configuration.

The encoding control section 1116 comprises the work memory 1117 that temporarily stores information related to controls, and the registers 1118 to 1122 that set an n value, a value (DIT) of a dither size, a statistical quantity (TH), on-value/off-value as control information for sorting pixels, and operation mode, which are control parameters for the dither size detection section 1111, statistics section 1112, and the encoding processing section 1113.

Such an image encoding apparatus or the sequence of processing for an image encoding method of this invention executed in the same apparatus can be realized with dedicated hardware, but it can be also realized with software using hardware resources of a computer such as a PC comprising the processor and memory. When the sequence of processing is operated on the computer, the program for this purpose is loaded into the memory of the computer from any of recording media such as a magnetic disk, an optical disk, a magneto-optical disk, or a semiconductor memory device, or is loaded into the memory of the computer through a network. Various types of recording media with such a program recorded are also included in this invention.

Figure 23:
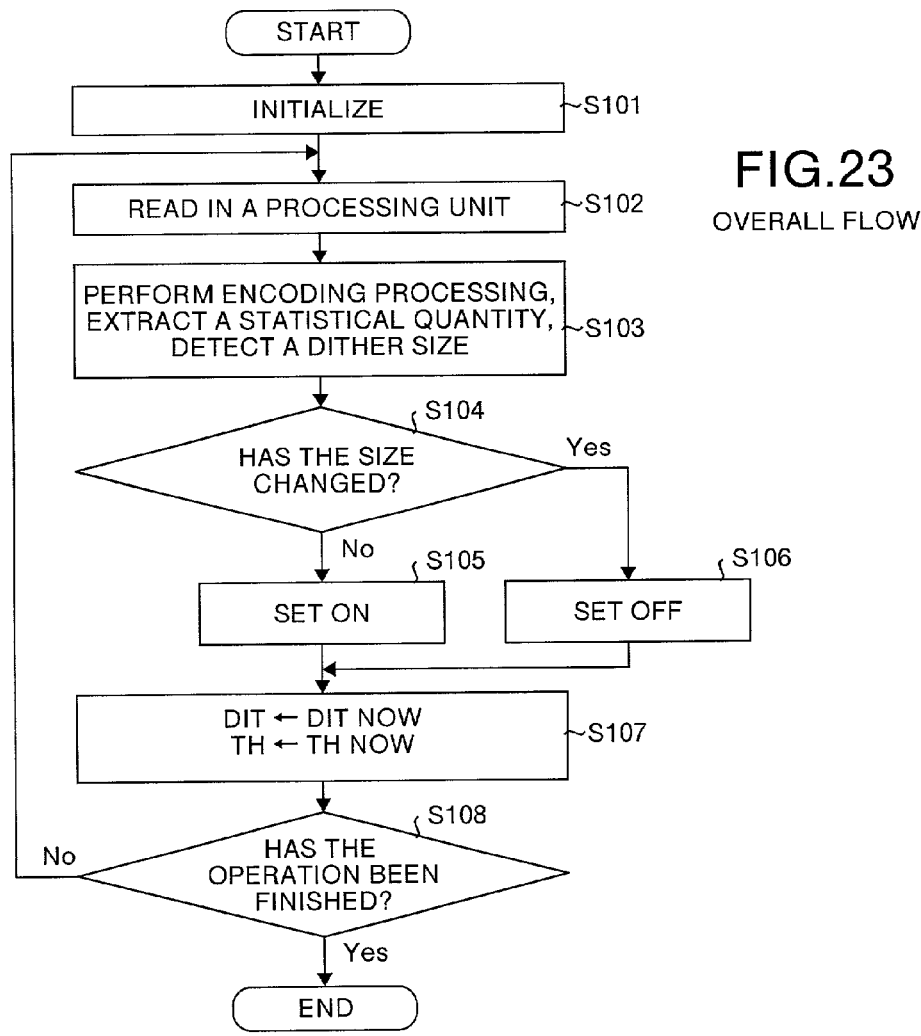
FIG. 23 is a flow chart showing overall operation of the image encoding apparatus shown in FIG. 22.
Figure 24:
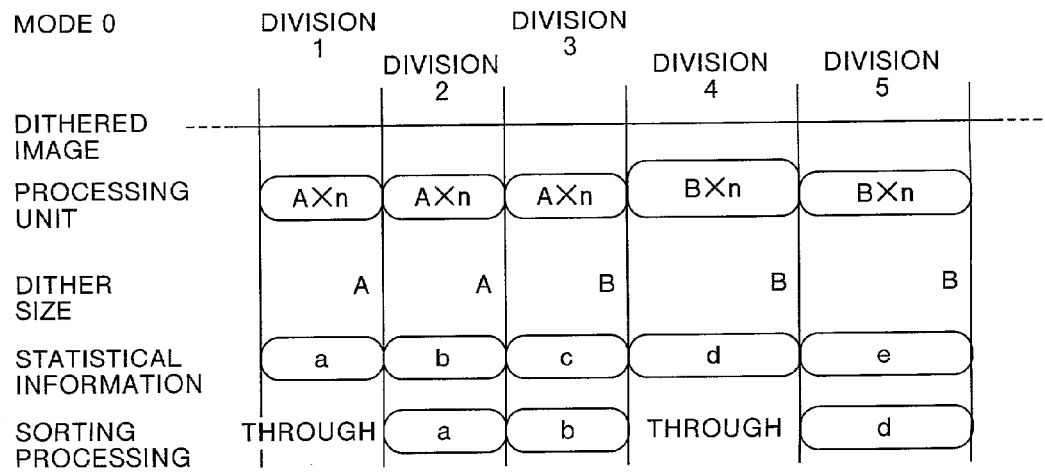
FIG. 24 shows the processing in operation mode 0.

FIG. 23 is a flow chart for the overall operation of this image encoding apparatus, in other words, for brief explanation on the sequence of encoding processing. FIG. 24 shows the processing in operation mode 0. The overall operation in operation mode 0 will be explained below with reference to FIG. 23 and FIG. 24.

When the dithered image data required for the processing is prepared in the image storage section 1110, the encoding control section 1116 initializes the apparatus (step S101). In this initialization, a specified n value is set in the n-value register 1118, a specified value of dither size (A in FIG. 24) is set in the DIT register 1119, a specified statistical quantity is set in the TH register 1120, and an off value is set in the on/off register 1121. In this case, since the operation mode is 0, the value for operation mode 0 is set in the operation mode register 1122.

After this initialization, the encoding control section 1116 transfers data for one processing unit from the head on the first horizontal line of the dithered image data from the image storage section 1110 to the encoding processing section 1113, dither size detection section 1111, and the statistics section 1112 (step S102), and orders the dither size detection section 1111, statistics section 1112, and the encoding processing section 1113 to start respective processing (step S103). A unit of processing is (DIT×n) pixels that are continuous in the horizontal direction in the operation modes 0 and 1. DIT mentioned here is a value of a dither size (A in FIG. 24) set in the DIT register 1119, and n is a set value (generally, multiples of 2) of the n-value register 1118. The continuous DIT-pixels are handled as one block. However, in the operation mode 2, as explained later, only a processing unit following the processing unit, in which the change of the dither size has been detected, becomes continuous DIT× n×1.5-pixel array (n×1.5 block).

Initially, the off value is set in the on/off register 1121. Therefore, in the encoding processing section 1113, the image conversion section 1114 sends loaded data as a processing unit to the encoding section 1115 without any conversion given to the data (which is called "through operation"). The encoding section 1115 immediately encodes the sent data or temporarily stores the data in the buffer and then encodes it. The statistics section 1112 extracts statistical quantities using the whole data as a processing unit due to the operation mode 0. Regarding each processing unit, the encoding control section 1116 determines a measured value DITnow of the dither size in its processing unit from the detected value of the dither size output from the dither size detection section 1111. How to determine the value will be explained later. As understood from this explanation, the unit that measures a dither size in each processing unit is formed with the dither size detection section 1111 and the encoding control section 1116.

The above-mentioned operation indicates the operation for "division 1" shown in FIG. 24.

The encoding control section 1116 compares between the dither-size measured value DITnow in this "division 1" and the value DIT of the dither size set in the DIT register 1119, and determines whether the dither size has been changed (step S104). When it is determined that the dither size has been changed, the off value is set in the on/off register 1121 (step S106). When it is determined that the dither size has not been changed, the on value is set in the on/off register 1121 (step S105). In the "division 1" shown in FIG. 24, the dither-size measured value is the same as the initial value A, therefore, the on value is set in the on/off register 1121. The encoding control section 1116 sets the dither-size measured value DITnow in the DIT register 1119, and sets the statistical quantity THnow (which is expressed by a in "division 1" of FIG. 24) extracted by the statistics section 1112 in the TH register 1120 (step S107).

When the processing as one processing unit is finished in the above manner, the encoding control section 1116 returns to step S102 to perform the same controls, and orders the sections to state processing for the next processing unit. The operation will be explained below with reference to FIG. 24. In "division 2" of FIG. 24, the on value is set in the on/off register 1121. Therefore, the image conversion section 1114 in the encoding processing section 1113 sorts pixels based on the statistical quantity (a) set in the TH register 1120, and the encoding section 1115 encodes the data after the pixels are sorted. The operation of sorting pixels is executed in each block. The size of the block in its horizontal direction coincides with the value DIT of the dither size set in the DIT register 1119, and the size of the block in its vertical direction is one pixel. That is, the encoding control section 1116 determines the size of a block forming the next processing unit by setting the value of a dither size in the DIT register 1119.

The value of the dither size measured in "division 2" remains A as it is, therefore, the on value is also kept as it is in the on/off register 1121. Accordingly, in "division 3", the image conversion section 1114 in the encoding processing section 1113 sorts the pixels based on the statistical quantity (b) extracted in "division 2".

Since the value (B) of the dither size measured in "division 3" is different from the value (A) of the dither size measured in "division 2", the off value is set in the on/off register 1121. Therefore, the image conversion section 1114 in the encoding processing section 1113 performs through operation in the next "division 4".

The dither-size measured value (B) in "division 4" is the same value as that of the previous division. Therefore, in the next "division 5", the image conversion section 1114 in the encoding processing section 1113 sorts the pixels based on the statistical quantity (d) extracted in "division 4".

In such a manner, the dithered image data is serially encoded in each processing unit along the main scanning line. The subsequent dithered image data is successively loaded in the image storage section 1110 in sync with proceeding of the processing. The processing proceeds up to the final stage for the encoding target dithered image data (step S108, Yes), where the encoding control section 1116 finishes the operation. There is a case where data is short for one processing unit at the end part of each line. In this case, the data for shortage is taken in from the header of the next line.

The statistical quantity extracted by the statistics section 1112 and the pixel sorting based on the quantity will be explained in detail below with reference to FIG. 25A to FIG. 25D and FIG. 26A and FIG. 26B.

FIG. 25A shows an example of multi-gradation image data, in which numerical values indicate gradation levels of the pixels. FIG. 25B shows an example of a 4×4 dither matrix, in which numerical values indicate threshold values. FIG. 25C shows dithered image data obtained by subjecting the multi-gradation image data of FIG. 25A to ordered dithering using the dither matrix of FIG. 25B, in which the boxes surrounded by heavy lines are blocks each corresponding to the dither matrix. FIG. 25D shows an example of statistical quantity obtained when each four blocks on each line of the dithered image data shown in FIG. 25C is a unit of processing (n=4).

The statistical quantity shown here is values each obtained by dividing a pixel array within a processing unit into blocks each corresponding to the dither size (here four continuous pixels on the line) and simply counting the number of black pixels at corresponding positions in the blocks (simply summed values of pixel values). In other words, the number of black pixels corresponding to each threshold value within the dither matrix is extracted as a statistical quantity. As for this statistical quantity, a pixel position with a higher value indicates that the position had a strong tendency of becoming a black pixel, i.e., this means that the dither threshold value of this position was low, which indicates a close correlation to the dither threshold value. It can be also said that a pixel position with a higher value of the statistical quantity has a higher possibility of producing a black pixel. Therefore, it can be also considered that the statistical quantity is information for predictive probability of black pixels. By sorting pixels using such a statistical quantity, a compression rate can be improved.

Figure 26A:
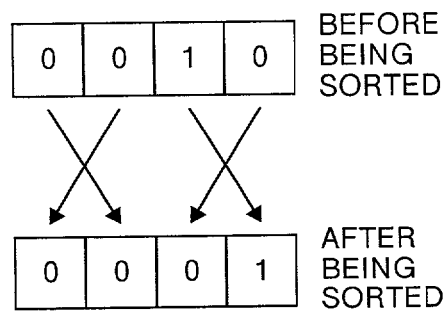
FIG. 26A and FIG. 26B show how to sort the pixels based on the statistical quantity.
Figure 26B:
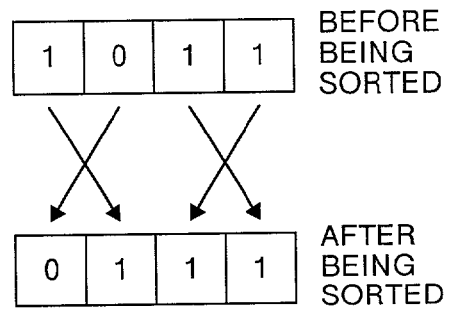

FIG. 26A and FIG. 26B show how to sort the pixels based on the statistical quantity and its effect. The operation of sorting the pixels is performed in each block. As shown in FIG. 26A, when the four pixels in the second block on the first line of the dithered image data in FIG. 25C are rearranged in ascending order by values of the statistical quantity, the number of runs decreases from three to two. Likewise, as shown in FIG. 26B, when the four pixels in the third block on the first line of the dithered image data in FIG. 25C are rearranged in ascending order by values of the statistical quantity, the number of runs decreases from three to two. Therefore, by performing entropy encoding such as run-length encoding on the data after the pixels are rearranged, the compression rate can be improved more as compared to that of the case where the data before being rearranged is encoded as it is. Although explanation has been given assuming that the dither size is 4, the number of runs is more remarkably decreased due to pixel rearrangement as the dither size becomes larger like 16, 24, etc., thus the effect of improvement in the compression rate becomes further significant. The reason that rearranging the pixels based on the statistical quantity decreases the number of runs is because a high-frequency component included in an original multi-gradation image data is generally a smaller amount.

As explained above, it is recognized that a correlation, such that a pixel position with a higher value of the statistical quantity has a lower dither threshold value, exists between the statistical quantity and the dither threshold value. Therefore, rearrangement of pixels in ascending order by statistical quantities corresponds to rearrangement of pixels in descending order by dither threshold values. It is also possible to rearrange pixels in descending order by statistical quantities (in ascending order by dither threshold values).

Each statistical quantity shown in FIG. 25D is a value (simply summed value of pixel values) obtained by simply counting black pixels at corresponding positions in the blocks as a processing unit. However, the following case is also effective. The lightest weight factor is set to the first block in the processing unit, the heaviest weight factor is set to the final block, the black pixels are weighted using such weight factors and counted, and the counted value (weighted summed value of pixels values) is extracted as a statistical quantity. That is because data in the block on the rear side of each processing unit is considered to have a closer correlation to data for the next processing unit since the statistical quantities extracted in each processing unit are used for processing in the next processing unit.

Instead of calculating the statistical quantities through operation, the calculation may be carried out by using the table as shown in FIG. 27, for example. This table is applied when n=7. Each bit in address corresponds to a pixel value at a remarked position of seven blocks within a processing unit (black pixel: 1, white pixel: 0). For example, if all the pixel values at remarked positions of all the blocks are 0 (white pixel), the address becomes "0000000" to obtain a statistical value of 0. If the pixel value at the remarked position of the seventh block is 1 and the pixel values at the remarked positions of the first to sixth blocks are 0, the address becomes "0000001" to obtain a statistical value of 7. The statistical quantity obtained by this table is a statistical quantity obtained through the weighting and counting. The method of using such a table can realize high speed processing as compared to that of any method based on arithmetic operation, and has an advantage such that it can flexibly cope with various methods of extracting a statistical quantity.

Figure 28:
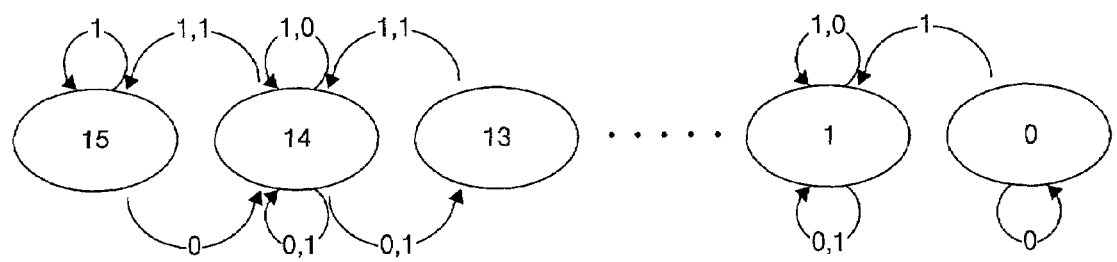
FIG. 28 shows a diagram of state transition used to extract the statistical quantity.

As another method of obtaining a statistical quantity, a statistical quantity may be determined from a transition state of pixel values at the corresponding positions of the blocks. FIG. 28 shows this method. In FIG. 28, each of the circled numbers indicates a state, and the state to which the remarked position of a block currently belongs becomes a statistical quantity at the position. For example, when the statistical quantity at the remarked position of a block is now "14" and each pixel value at the remarked positions is "1" in the next two blocks, the state is shifted to the left hand side and the statistical quantity becomes "15". If each pixel value at the remarked positions is "0" in these two blocks, the state is shifted to the right hand side and the statistical quantity becomes "1". If the pixel value at the remarked position of either one of the two blocks is "1" and the pixel value at the remarked position of the other block is "0", the state is not shifted, and the statistical quantity remains "14" as it is.

Figure 29:
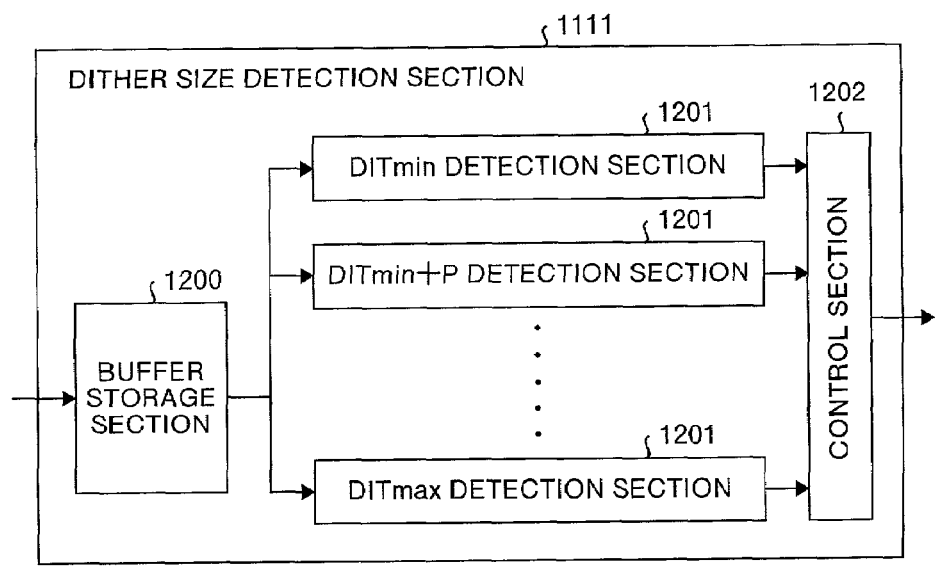
FIG. 29 is a block diagram showing an example of the internal configuration of a dither size detection section.
Figure 30:
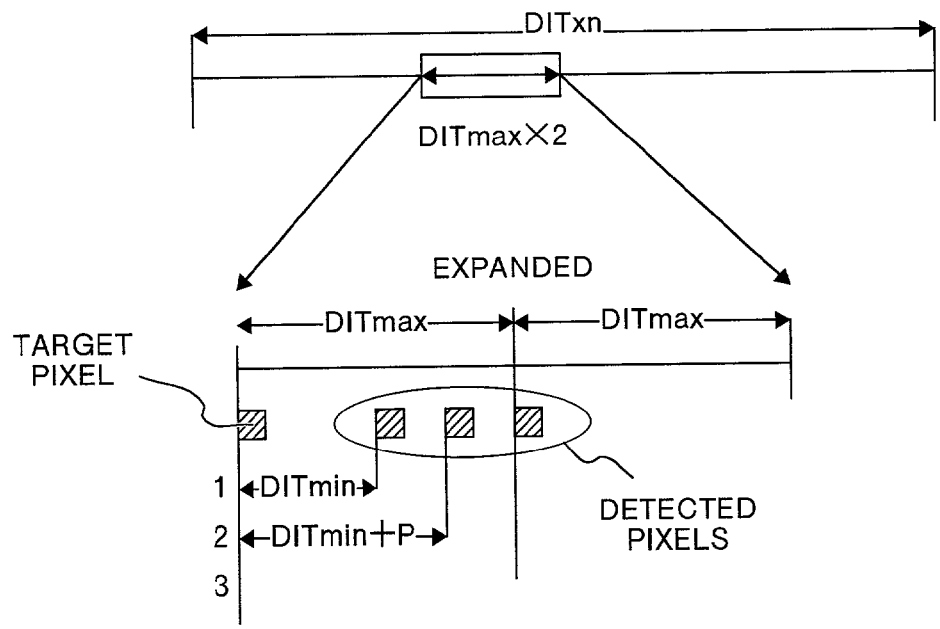
FIG. 30 shows how to detect the dither size.

The dither size detection section 1111 will be explained below. A simplified configuration example of the dither size detection section 1111 is shown in FIG. 29. The dither size detection section 1111 comprises the buffer storage section 1200 that temporarily stores dithered image data, a plurality of detection sections 1201 for detecting different dither sizes (DITmin, DITmin+P, DITmin+2P ..., DITmax), and the control section 1202. DITmin is the detectable minimum dither size, for example, 4. DITmax is the detectable maximum dither size. These plural detection sections detect different dither sizes from DITmin to DITmax by a pixel pitch P. Any value more than 1 can be selected for P. If P=1, a dither size can be detected by 1 pixel pitch. However, the number of detection sections 1201 increases, the amount of hardware increases, and the processing time also increases, therefore, generally, 8 may be appropriate for P. The operation of detecting a dither size in the dither size detection section 1111 will be explained below with reference to the explanatory diagram of operation shown in FIG. 30 and the flow chart shown in FIG. 32.

Data for (DITmax×2) pixels from the header of a processing unit is read as reference data from the buffer storage section 1200 into the detection sections 1201 under the control of the control section 1202 (step S110). Each of the detection sections 1201 takes an exclusive NOR between a target pixel (initially, the header pixel of the reference data), and a detected pixel on the right side by DITmin pixels from the target pixel, a detected pixel on the right side by DITmin+P pixels, a detected pixel on the right side by DITmin+2P pixels, or a detected pixel on the right side by DITmax pixels (step S111). "1" is output from any of the detection sections 1201 where the pixel values of the target pixel and the detected pixel coincide with each other. The control section 1202 counts the number (frequency) of outputting "1" for each detection section 1201 (step S112). The control section 1202 then shifts the position of the target pixel to the right by one pixel (step S113). Each of the detection sections 1201 takes an exclusive NOR between this target pixel and the detected pixel, and the control section 1202 counts the number of outputting "1" for each detection section 1201 (step S113). The same operation is repeated while the target pixel is shifted to the right one by one.

When the operation for the DITmax−1 th pixel from the header of the reference data as a target pixel is finished (step S114, Yes), the control section 1202 detects the maximum value of count values (frequencies of coincidence between the target pixel and the detected pixel) for each detection section 1201. The control section 1202 then outputs the dither size (any of DITmin, DITmin+P, ..., DITmax) corresponding to any detection section 1201, from which the maximum value (maximum frequency) is obtained, as a detected value of the dither size (step S115). At this point in time, the count value for each detection section 1201 is cleared.

The control section 1202 shifts the position of the target pixel to the right by one pixel (step S116), and transfers the data for DITmax×2 pixels from the position of the target pixel as reference data from the buffer storage section 1200 to the detection sections 1201 (step S110). The above-mentioned operations from step S111 to step S114 are repeated for this reference data. When the operation for the DITmax−1 th pixel from the header of the reference data as a target pixel is finished, the control section 1202 outputs the detected value of the dither size corresponding to the detection section 1201 whose count value is the maximum.

The same operation is repeated, and when the number of pixels from the target pixel to the final pixel in the processing unit becomes less than DITmax×2 (step S117, Yes), the operation of detecting the dither size for one processing unit is finished.

As understood from this explanation, the dither-size detected value is output from the dither size detection section 1111 for each DITmax pixel in each of the processing unit. The encoding control section 1116 determines a measured value DITnow of the dither size in each processing unit from the detected values of the dither size output from the dither size detection section 1111. How to determine the dither-size measured value will be explained below.

A first method is a method of determining a dither-size detected value output last from the dither size detection section 1111 in a processing unit as a dither-size measured value DITnow in the processing unit. In this method, a priority is given to the dither-size detected value detected at the position closest to the next processing unit because the dither-size measured value DITnow in the processing unit is applied to the processing in the next processing unit.

A second method is a method of determining a dither-size detected value with the highest number of outputting, i.e., frequencies, of the dither-size detected values output from the dither size detection section 1111 in a processing unit, as a dither-size measured value DITnow.

A third method is a method of determining a value output continuously more than a predetermined number of times (e.g., 2 times), of the dither-size detected values output from the dither size detection section 1111 in a processing unit, as a dither-size measured value DITnow. If there are two or more of dither-size detected values each of which is continuously output more than the predetermined number of times, the dither-size detected value whose output time is the latest in the values is determined as a dither-size measured value DITnow.

A fourth method is a method of determining the latest dither-size detected value as a dither-size measured value DITnow in the current processing unit. The latest value is among dither-size detected values output from the dither size detection section 1111 from the initial processing unit to the current processing unit, or the dither-size detected values output continuously a predetermined number of times from the dither size detection section 1111 in a predetermined number of processing units including the current processing unit.

According to the first method, there are advantages such that the encoding control section 100 does not need to store a plurality of dither-size detected values in the work memory 1117 and does not require particular processing for determining a dither-size measured value DITnow. On the other hand, if a periodicity component different from a dither periodicity is included in the latter half of a processing unit, the period of the periodicity component may erroneously be determined as a dither-size measured value DITnow.

According to the second method to the fourth method, the encoding control section 100 needs to store a plurality of dither-size detected values in the work memory 1117 and requires particular processing such as calculation of frequencies of the dither-size detected values in order to determine a dither-size measured value DITnow. However, as compared to the first method, the determination is not much affected by the periodicity component different from the dither periodicity, so that reliability of the dither-size measured value DITnow is increased, thus improving stability of the encoding operation.

The operations in the operation mode 1 and the operation mode 2 will be explained below. In these two operation modes, respective operations of the statistics section 1112, encoding processing section 1113, and the encoding control section 1116 in a processing unit following the processing unit where the change of the dither size has been detected are slightly different from those in the operation mode 0.

Figure 31:
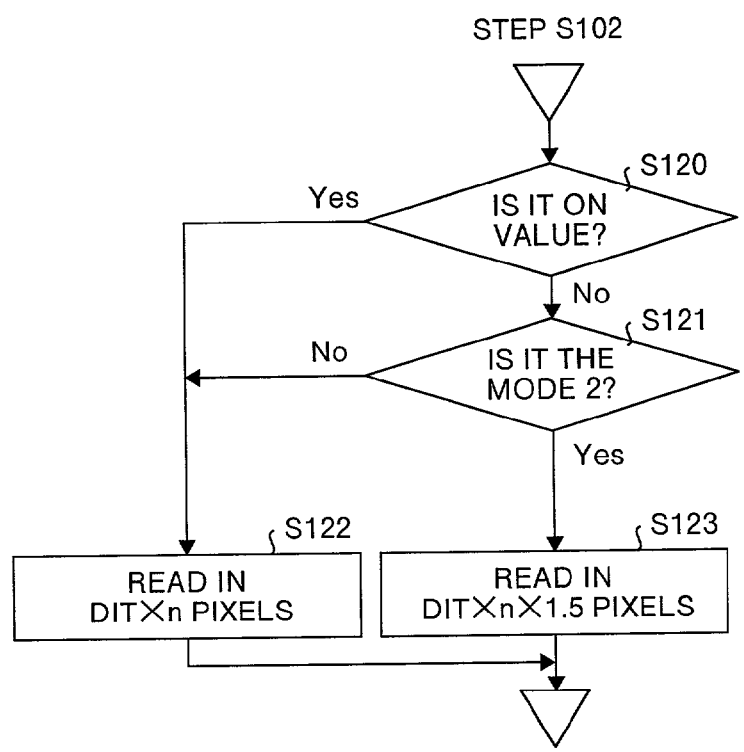
FIG. 31 is a flow chart showing operation of the dither size detection section.
Figure 32:
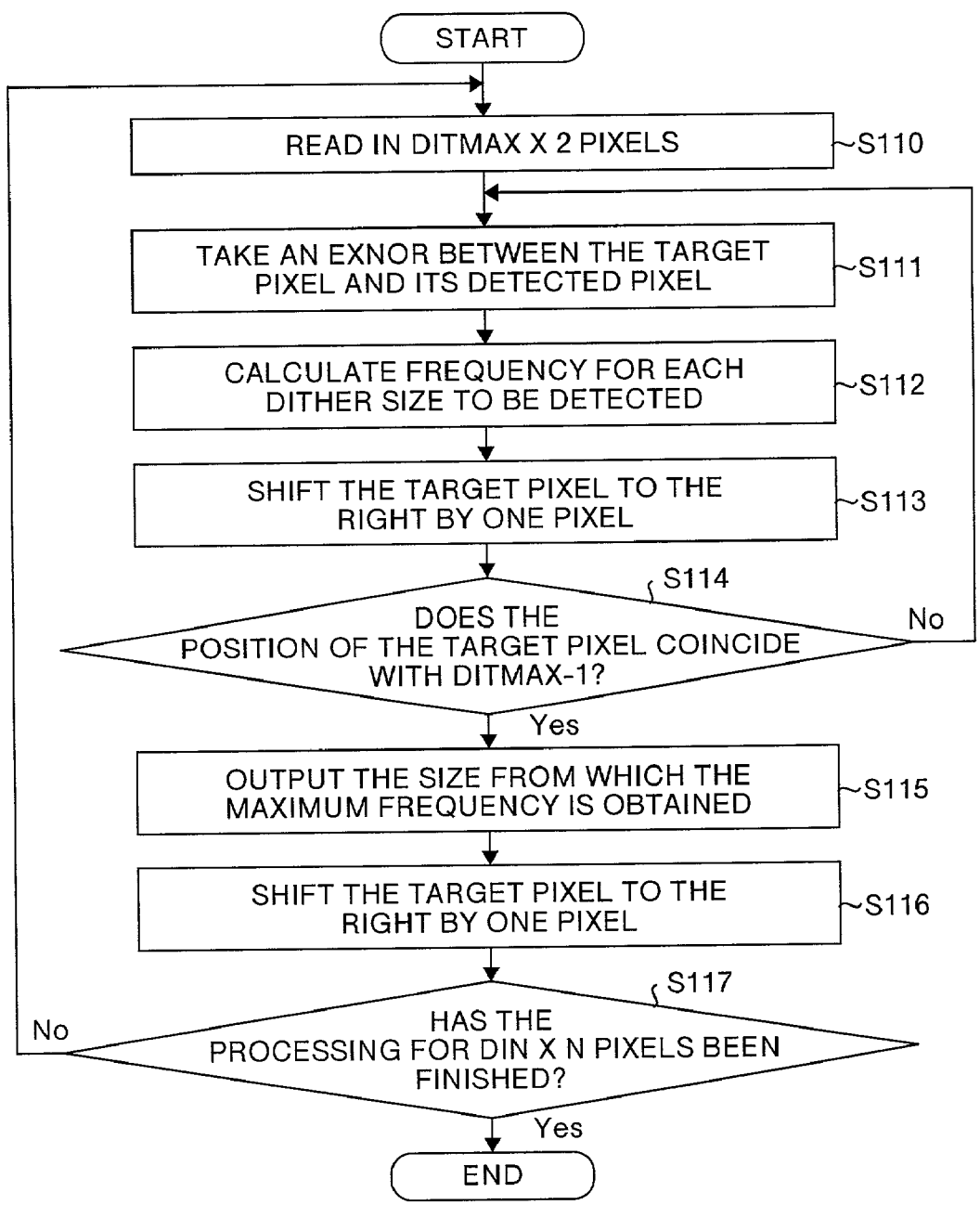
FIG. 32 is a flow chart for explaining step S102 in FIG. 23.

At step S102 of FIG. 23, the encoding control section 1116 performs slightly different controls according to the operation mode as shown in the flow chart of FIG. 31. If the set value of the on/off register 1121 is the on value (step S120, Yes), the encoding control section 1116 transfers data for DIT×n pixels (n blocks) as a processing unit, to the dither size detection section 1111, statistics section 1112, and the encoding processing section 1113 in either of the operation modes (step S122).

However, if the set value of the on/off register 1121 is the off value (step S120, No), the encoding control section 1116 performs different controls depending on the operation mode. That is, if the mode is not the operation mode 2 (step S121, No), the encoding control section 1116 transfers the data for DIT×n pixels (n blocks) as a processing unit (step S122), while if the mode is the operation mode 2 (step S121, Yes), the encoding control section 1116 transfers the data for DIT×n×1.5 pixels (n blocks+n/2 blocks) as a processing unit (step S123).

Figure 33:
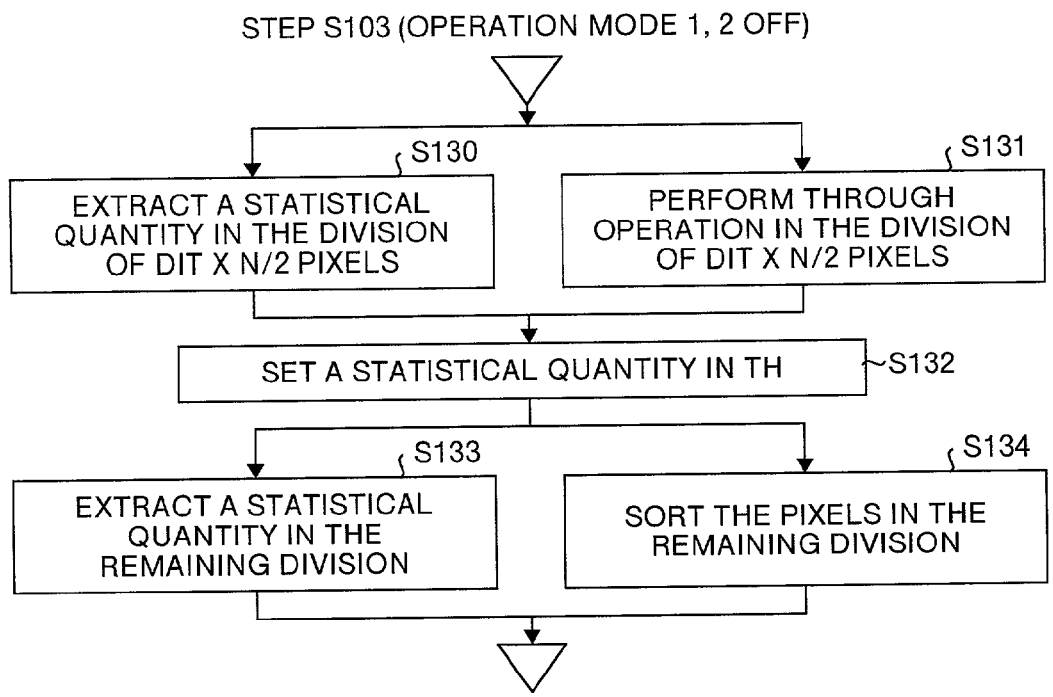
FIG. 33 is a flow chart for explaining step S103 in FIG. 23.

If the set value of the on/off register 1121 is the off value in the operation mode 1 or the operation mode 2, at step S103 of FIG. 23, the statistics section 1112, the encoding processing section 1113, and the encoding control section 1116 perform operations as shown in FIG. 33. That is, in a part of a division by DIT×n/2 pixels (n/2 blocks) from the header of the processing unit, the statistics section 1112 extracts a statistical quantity targeting the data in this part, and the image conversion section 1114 in the encoding processing section 1113 performs through operation (steps S130, S131). When the statistics section 1112 finishes extraction of the statistical quantity, the encoding control section 1116 sets the statistical quantity in the TH register 1120 (step S132). Subsequently, the statistics section 1112 extracts statistical quantity for data in the remaining division as the processing unit, and the image conversion section 1114 in the encoding processing section 1113 rearranges the pixels based on the statistical quantity set in the TH register 1120 (steps S133, S134).

Figure 34:
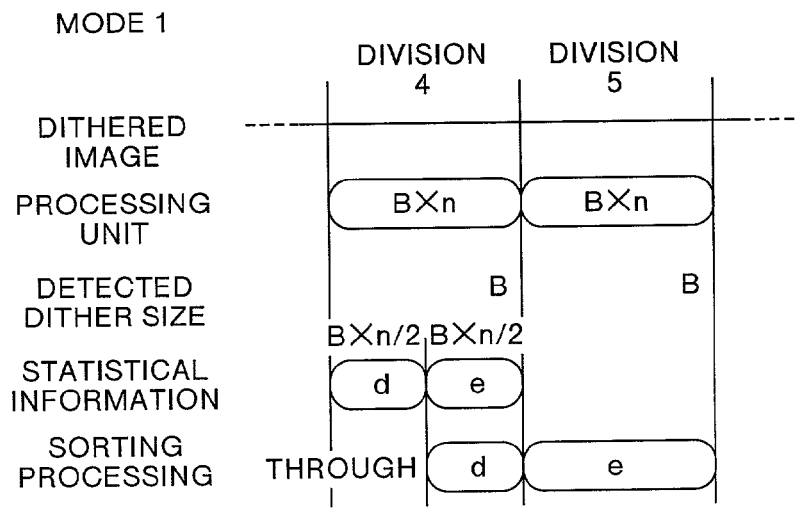
FIG. 34 shows the processing in operation mode 1.
Figure 35:
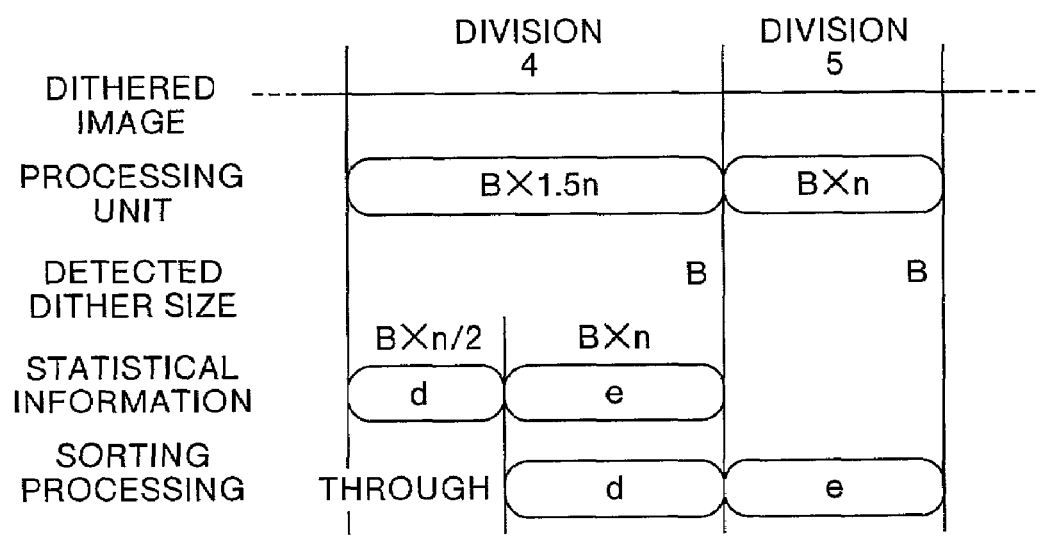
FIG. 35 shows the processing in operation mode 2.

As understood from the explanation, in "division 4" shown in FIG. 24, for example, the processing as shown in FIG. 34 is executed in the operation mode 1, and the processing as shown in FIG. 35 is executed in the operation mode 2. As explained above, in the operation mode 1 or the operation mode 2, through operation is carried out only in the first half of the division (n/2 blocks) in a processing unit immediately after the change of the dither size is detected, and the pixels are rearranged in the latter half of the division using the extracted statistical quantity during that period. Therefore, a proportion of the part for through operation is decreased as compared to the operation mode 0, thus improving encoding efficiency. Particularly, in the operation mode 2, the proportion of the through-operation part is decreased more positively by setting the number of blocks as a processing unit to 1.5 times, thus further improving the encoding efficiency.

According to this image encoding apparatus, as explained above, the dithered image data whose dither size and dither threshold value are not specified can be compressed and encoded with high efficiency. A dither size and a dither threshold value are changed within a page of a document with the page formed with a plurality of objects such as text, graphics, or photographs. However, according to this image encoding apparatus, high-efficiency compression and encoding adaptable to changes in a dither size and a dither threshold value becomes possible even when additional information such as the dither size and the dither threshold value for each object is not provided.

Figure 36:
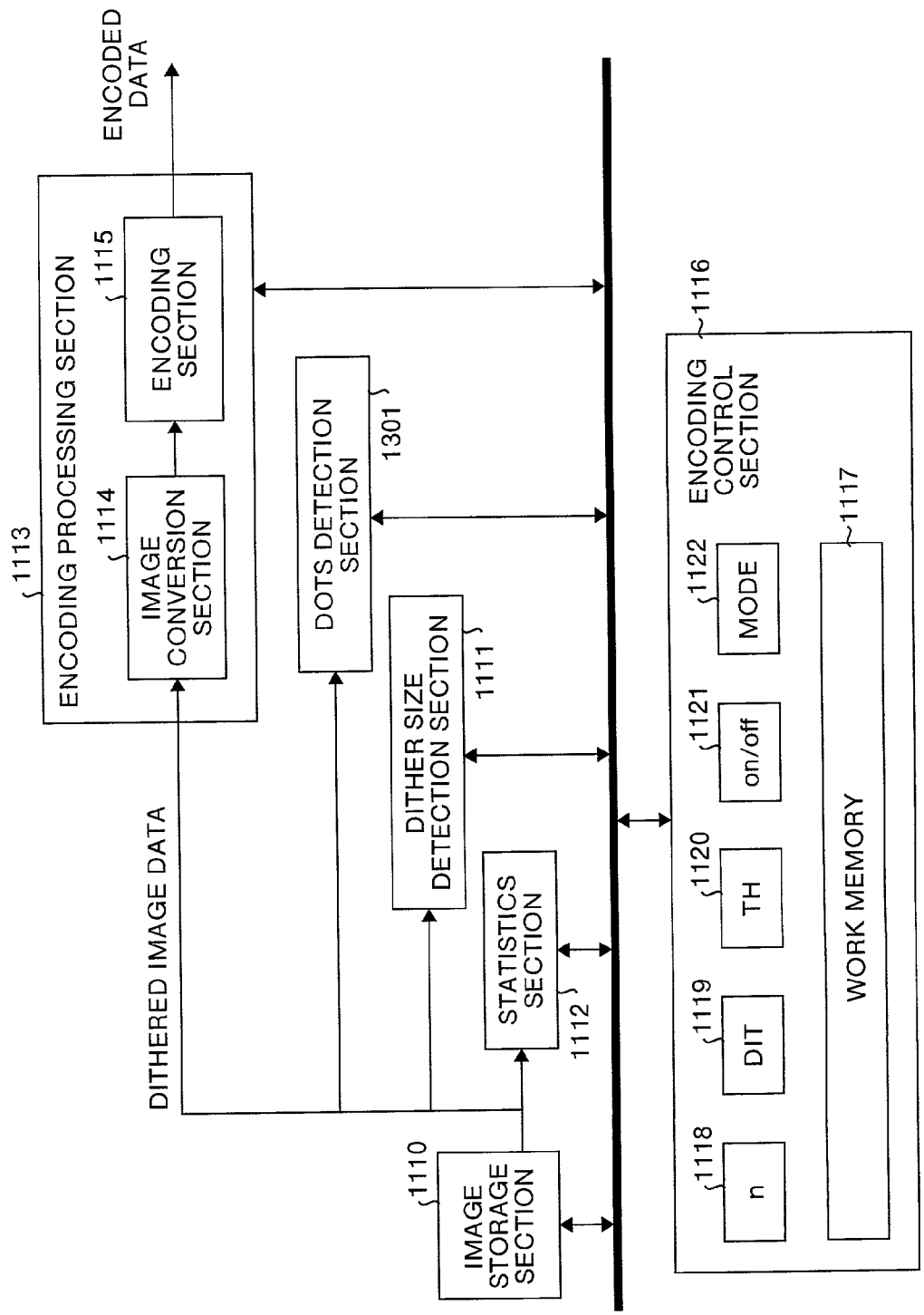
FIG. 36 is a block diagram showing another example of the image encoding apparatus according to the second embodiment.

FIG. 36 is a block diagram showing another example of the image encoding apparatus according to this invention. The image encoding apparatus shown here has a configuration such that a dots detection section 1301 is added to the image encoding apparatus shown in FIG. 22.

The dots detection section 1301 is a unit for identifying whether a remarked area in dithered image data is a dots area or a non-dots area. Many conventional technologies on this dots detection have been known. Therefore, the same method as any of the conventional technologies may be utilized. As one example, similarly to the conventional technology described in Japanese Patent Kokoku publication No. 6-66884 (Japanese Patent No. 1934458), it is possible to use a method of identifying the dots area or the non-dots area by measuring level change between adjacent two pixels within a processing unit and comparing the measured quantity with a predetermined value in each block.

The dots detection section 1301 sends the result of identifying the dots area or the non-dots area to the encoding control section 1116. The encoding control section 1116 invalidates a dither-size detected value related to a block regarded as the non-dots area by the dots detection section 1301, of dither-size detected values output from the dither size detection section 1111 on each processing unit basis. According to another example, in the block identified as the non-dots area, the operation for the dither size in the dither size detection section 1111 is directly inhibited or indirectly through the encoding control section 1116 according to an output signal of the dots detection section 1301. The operations other than this are the same as these in the image encoding apparatus 1100 according to the first embodiment.

When original multi-gradation image data (e.g., data for 256-level gray scale) has text and some other drawings expressed by 0 level and 255 levels in an even-density portion, the non-dots area is produced in the text/drawing portion, which causes normal dither size detection to be prevented. According to this image encoding apparatus, the dither-size detected value in such a non-dots area is invalidated or the dither size detecting operation is inhibited. Therefore, stable measurement of a dither size becomes possible even if the non-dots area exists, thus stability of encoding is improved.

Although the encoding processing section 1113 has a configuration such that the image conversion section 1114 rearranges pixels based on statistical quantity and the encoding section 1115 performs entropy encoding such as run-length encoding, the configuration is not limited by this. It is also effective that the encoding processing section 1113 is configured so as to perform predictive encoding or arithmetic encoding using statistical quantity.

Figure 37:
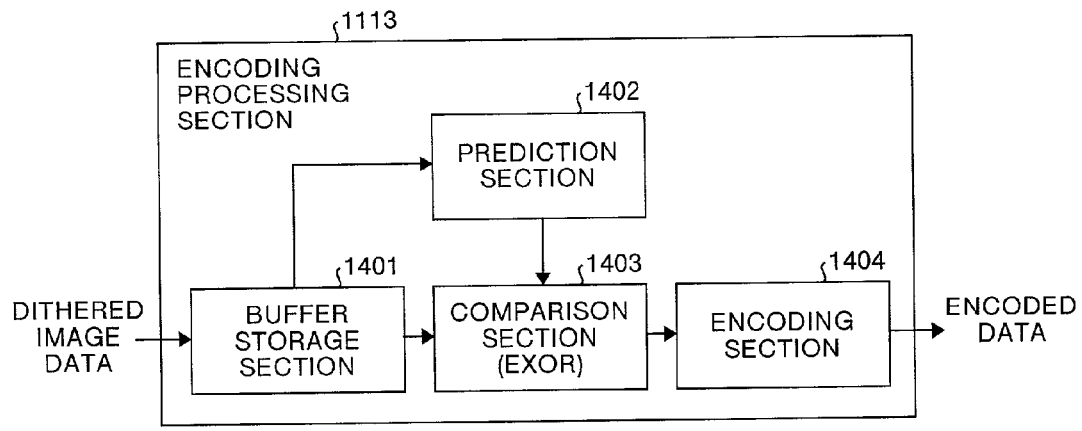
FIG. 37 is a block diagram showing an example of an encoding processing section that performs predictive encoding.

FIG. 37 is a block diagram showing an example of the encoding processing section 1113 that performs predictive encoding. In FIG. 37, legend 1401 represents a buffer storage section that temporarily stores dithered image data. Legend 1402 represents a prediction section that selects a reference pixel from processed pixels based on statistical quantity and predicts a value of an encoding target pixel from the value of the reference pixel. Legend 1403 represents a comparison section that obtains a difference (prediction error) between the value of an encoding target pixel and its predictive value. Since 1-bit binary data is handled here, the comparison section 1403 takes an exclusive OR between the value of an encoding target pixel and its predictive value. When the encoding target pixel value coincides with its predictive value, the comparison section 1403 outputs "0", and outputs "1" when these two values do not coincide with each other. However, in the operation mode 0, the comparison section 1403 outputs the input dithered image data as it is (through operation) in the through-operation divisions shown in FIG. 24 (whole divisions on a processing unit basis when the off value is set in the on/off register 1121). In the operation mode 1 or 2, the comparison section 1403 performs through operation in the through-operation division shown in FIG. 34 or FIG. 35. According to another example, in the above-mentioned through-operation division, the prediction section 1402 obtains a predictive value using an encoded pixel as a reference pixel, which has a predetermined positional relation with an encoding target pixel irrespective of a statistical quantity. The comparison section 1403 takes an exclusive OR between the predicted value and the encoding target pixel value in the same division.

Legend 1404 represents an encoding section that performs entropy encoding such as run-length encoding on the prediction error data output from the comparison section 1403. Based on such a configuration, "0" is continuously output from the comparison section 1403 in a division where prediction by the prediction section 1402 is succeeded. Thus, high-efficiency compression and encoding become possible.

If output data of the comparison section 1403 is regarded as conversion data for dithered image data, a portion formed with the buffer storage section 1401, prediction section 1402, and the comparison section 1403 corresponds to the image conversion section 1114 shown in FIG. 22. That is, it may be considered that the example shown here performs image conversion from dithered image data to prediction error data.

Figure 38:
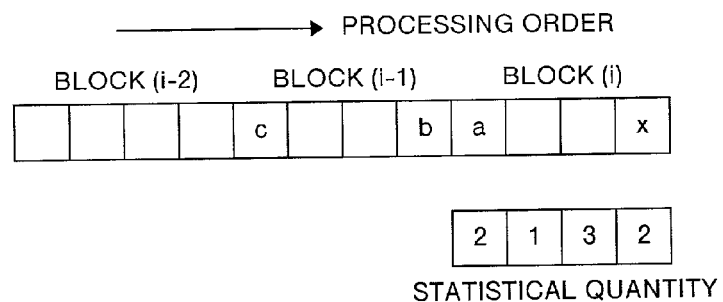
FIG. 38 shows how to select a reference pixel for prediction.

How to select a reference pixel based on a statistical quantity will be explained below with reference to FIG. 38. In FIG. 38, the value DIT of the dither size is assumed to be "4". When a cross-marked pixel, for example, in the block (i) is a target to be encoded, some pixels at positions within a block, whose statistical quantities are the same as or close to the value at the position of the encoding target pixel, are selected out of adjacent processed pixels as reference pixels. When the statistical quantities are as shown on the lower right side of FIG. 38, the value of the statistical quantity at the position of the encoding target pixel is "2". Therefore, for example, the processed pixel a within the same block (i) and the pixels b and c within the block (i−1) immediately before the block (i) are selected as reference pixels. The prediction section 1402 determines a predictive value, for example, by determining values of these reference pixels based on majority rule. However, it is also possible to employ a method of determining a predictive value by assigning heavier weights to a reference pixel closer to the encoding target pixel instead of simple majority rule.

Figure 39:
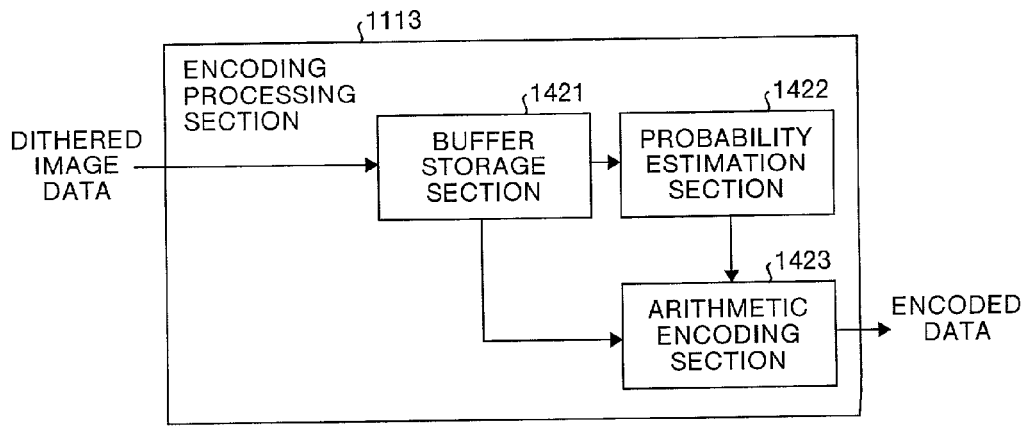
FIG. 39 is a block diagram showing an example of an encoding processing section that performs arithmetic encoding.

FIG. 39 is a block diagram showing an example of the encoding processing section 1113 that performs arithmetic encoding representing the Markov encoding. In FIG. 39, legend 1421 represents a buffer storage section that temporarily stores dithered image data. Legend 1422 represents a probability estimation section that estimates a symbol appearance probability of an encoding target pixel. Legend 1423 represents an arithmetic encoding section that performs arithmetic encoding on an encoding target pixel using the estimated probability by the probability estimation section 1422 as an encoding parameter.

Figure 40:
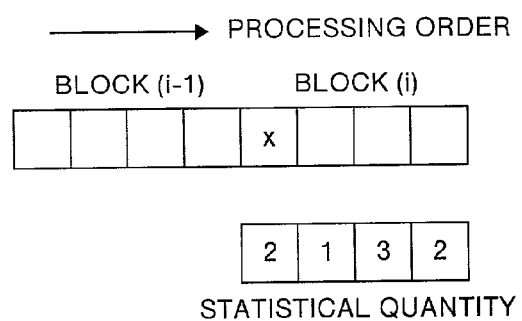
FIG. 40 shows how to estimate a symbol appearance probability.

In divisions other than the through-operation division, the probability estimation section 1422 outputs an absolute value, as estimated probability information, of a difference between the number of black pixels within an encoded block immediately before the block to which an encoding target pixel belongs and the value of a statistical quantity at the position of the encoding target pixel. For example, a cross-marked pixel in the block (i) as shown in FIG. 40 is an encoding target pixel, and the statistical quantities as shown on the lower right side of FIG. 40 are assumed to be obtained. In this case, an absolute value of a difference between the number of black pixels in the processed block (i−1) and the value "2" of the statistical quantity at the position of the encoding target pixel is estimated probability information. Since the statistical quantity has a close correlation to a dither threshold value as explained above, the estimated probability information obtained by the probability estimation section 1422 corresponds to a distance between the number of black pixels in the block immediately before the target block and the dither threshold value at the position of the encoding target pixel. When this distance is larger, the estimated probability is close to 1 or 0, and when it is smaller, the estimated probability is close to 0.5. However, the probability estimation section 1422 outputs estimated probability information corresponding to, for example, the estimated probability 0.5 without using the statistical quantity in the through-operation division.

The image encoding apparatus according to this invention can be applied to various types of image processing apparatuses for image filing, image formation, image transfer and the like. As an example, an image formation apparatus using the image encoding apparatus of this invention will be explained below with reference to FIG. 41.

Figure 41:
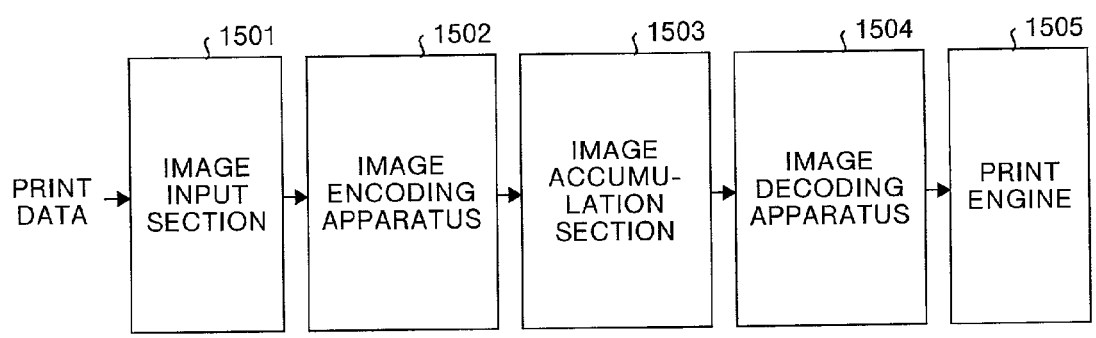
FIG. 41 is a schematic block diagram showing a laser beam printer using the image encoding apparatus according to the second embodiment.

The image formation apparatus shown in FIG. 41 is a laser beam printer that performs image formation by a page unit. In FIG. 41, legend 1501 represents an image input section for inputting dithered image data. This image input section expands print data described in page description language (PDL) given from the outside, for example, to dithered image data. Legend 1502 represents the image encoding apparatus of this invention for encoding the input dithered image data. Legend 1503 represents an image accumulation unit that accumulates data encoded by the image encoding apparatus 1502. Legend 1504 represents the image decoding apparatus according to this invention, which reads in the encoded data from the image accumulation unit 1503 to be decoded, and reconstructs the data to its original dithered image data. Legend 1505 represents a print engine, which is a unit for image formation of the reconstructed dithered image data. This print engine 1505 scans a photoreceptor with a laser beam whose brightness is modulated according to the dithered image data reconstructed by the image decoding apparatus 1504 to form an electrostatic latent image of the image, develops this latent image, transfers the developed image onto printing paper, and fixes it.

In this type of laser beam printer, pages of a document are printed continuously. Therefore, before starting the printing operation, dithered image data for all the pages of the document needs to be prepared. If the dithered image data is accumulated as it is, the image accumulation section 303 requires a large-capacity memory. On the other hand, in the laser beam printer shown here, the dithered image data for the document is compressed by the image encoding apparatus 1502 and then accumulated in the image accumulation unit 1503, thus largely reducing the memory capacity required for the image accumulation unit 1503.

The image decoding apparatus 1504 reconstructs the original dithered image data from the encoded data in the same sequence as that of the image encoding apparatus 1502. An example of this configuration is shown in FIG. 42 and FIG. 43.

Figure 42:
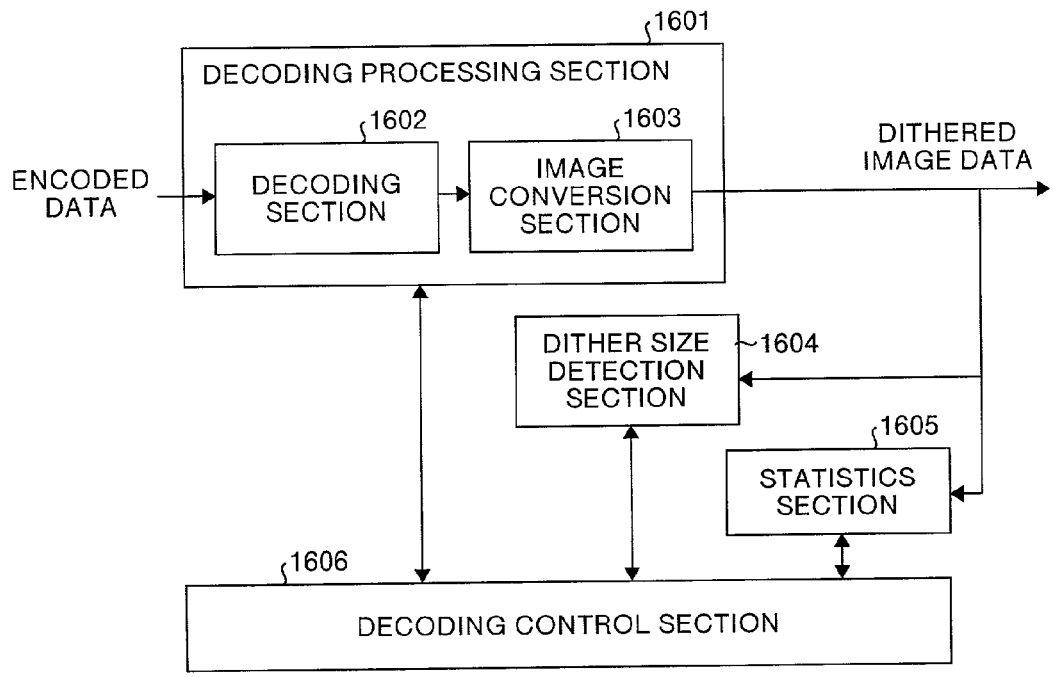
FIG. 42 is a block diagram showing an example of an image decoding apparatus according to the second embodiment.
Figure 43:
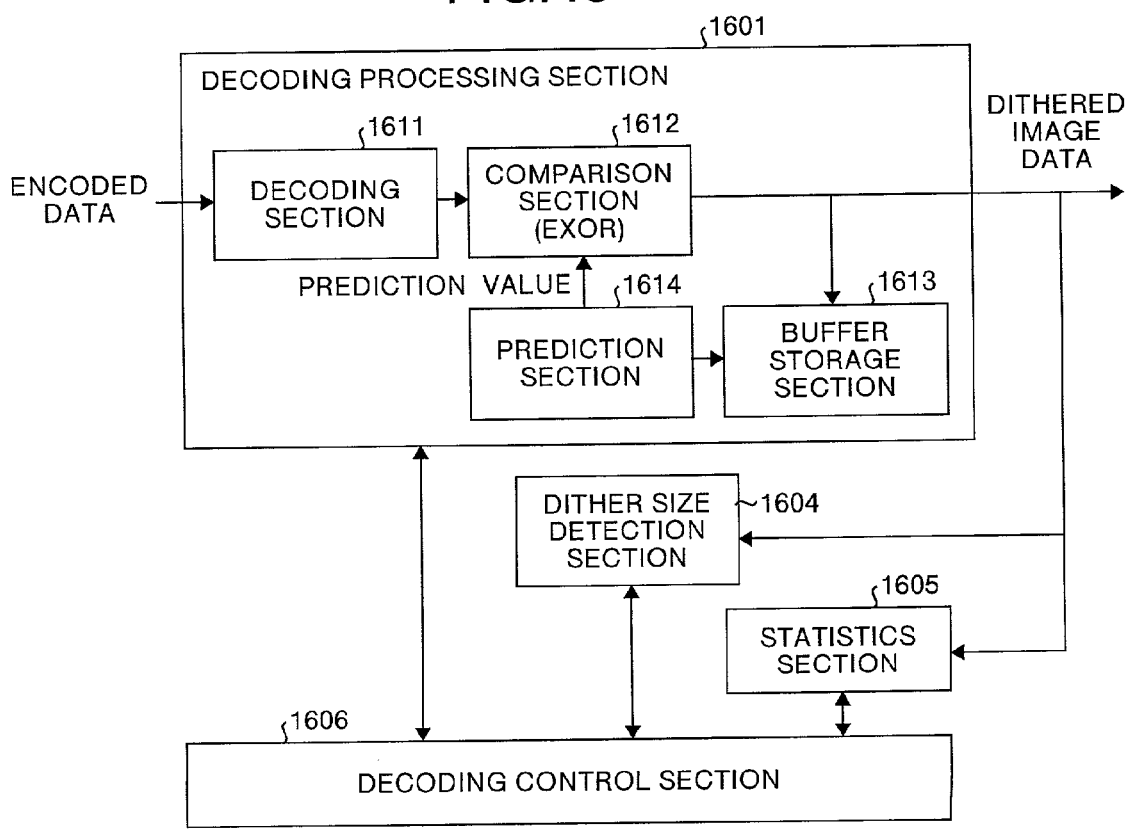
FIG. 43 is a block diagram showing another example of the image decoding apparatus according to the second embodiment.

The image decoding apparatus shown in FIG. 42 is used in the case where the encoding processing section (1113) in the image encoding apparatus 1502 performs pixel rearrangement based on statistical quantities as explained with reference to FIG. 22. The image decoding apparatus shown in FIG. 43 is used in the case where the encoding processing section (1113) in the image encoding apparatus 1502 performs predictive encoding as explained with reference to FIG. 37.

In FIG. 42, legend 1601 represents a decoding processing section that reconstructs dithered image data from encoded data. This decoding processing section comprises the decoding section 1602 that performs entropy decoding on the encoded data, and the image conversion section 1603 that performs pixel rearrangement on output data of the decoding section 1602, the same as that of the encoding side. Legend 1604 represents a dither size detection section that detects a dither size in the same manner as that of the encoding side. Data input to this section is the dithered image data reconstructed by the decoding processing section 1601. Legend 1605 represents a statistics section that extracts a statistical quantity in the same manner as that of the encoding side. Data input to this section is the reconstructed dithered image data. Legend 1606 represents a decoding control section that performs the same control as that of the encoding control section (1116) on the encoding side. This image decoding apparatus has operation modes corresponding to the operation modes 0, 1, and 2 in the image encoding apparatus. The overall operation flow of this image decoding apparatus, in order words, the schematic flow of the image decoding processing can be expressed by the same flow chart as that of FIG. 23. However, a unit of processing read-in at the step corresponding to step S101 in FIG. 23 is dithered image data reconstructed through decoding, and decoding processing instead of encoding processing is performed at the step corresponding to step S103.

The operation of this image decoding apparatus does not need to be explained in detail because it is the same as the encoding operation for pixel rearrangement. However, the case of the operation mode 0 will be explained below with reference to FIG. 24. In the initial "division 1", the image conversion section 1603 performs through operation, and outputs the data decoded by the decoding section 1602 as it is as the reconstructed dithered image data. The decoding control section 1606 determines that the dither size remains A as the initial value. Therefore, in the next "division 2", the dithered image data arranged in the order of the original pixels is reconstructed through pixel rearrangement by the image conversion section 1603 based on the statistical quantity (a) extracted in the previous division. In the next "division 3", the same operation is performed. In "division 4", it is determined that the dither size has been changed in the next previous division, therefore, the operation of the image conversion section 1603 is through operation. In the operation mode 1 or 2, the operation as explained with reference to FIG. 34 or FIG. 35 (but, decoding operation) is performed in a processing unit following the processing unit where the dither size has been changed.

In FIG. 43, legend 1601 represents a decoding processing section that reconstructs dithered image data from encoded data. This decoding processing section comprises the decoding section 1611 that performs entropy decoding on the encoded data, prediction section 1614, comparison section 1612 that takes an exclusive OR between the value of output data (prediction error data) of the decoding section 1602 and its predictive value by the prediction section 1614 and reconstructs the dithered image data, and the buffer storage section 1613 that temporarily stores the reconstructed dithered image data. The comparison section 1612 generally obtains a sum of the entropy-decoded prediction error and its predictive value, but takes the exclusive OR here because 1-bit binary data is processed here.

This image decoding apparatus comprises the dither size detection section 1604, statistics section 1605, and the decoding control section 1606, the same as these in the image decoding apparatus of FIG. 42. The image decoding apparatus also has the operation modes corresponding to the operation modes 0, 1, and 2 of the image encoding apparatus. The overall operation flow of this image decoding apparatus can be expressed by the same flow chart as that of FIG. 23. However, a unit of processing read-in at the step corresponding to step S101 in FIG. 23 is dithered image data reconstructed through decoding, and decoding processing instead of encoding processing is performed at the step corresponding to step S103.

The operation of this image decoding apparatus is the same as the encoding operation for performing predictive encoding. However, the case of the operation mode 0 will be briefly explained below with reference to FIG. 24. In the initial "division 1", the comparison section 1612 performs through operation, and outputs the data decoded by the decoding section 1611 as it is. The decoding control section 1606 determines that the dither size remains A as the initial value. Therefore, in the next "division 2", an exclusive OR between the value of output data (prediction error data) of the decoding section 1611 and its predictive value by the prediction section 1614 is taken by the comparison section 1612, and the original dithered image data is reconstructed from the prediction error data. Pixels to be referred to for prediction in the prediction section 1614 are selected from the decoded pixels within the buffer storage section 1613 based on the statistical quantity extracted in "division 1". In the next "division 3", the same operation is performed. In "division 4", it is determined that the dither size has been changed in the next previous division, therefore, the operation in the comparison section 1612 is through operation. In the operation mode 1 or 2, the operation as explained with reference to FIG. 34 or FIG. 35 (but, decoding operation is performed instead of encoding processing) is performed in a processing unit following the processing unit where the dither size has been changed.

On the encoding side, prediction is performed using reference pixels having a previously determined positional relation and an prediction error is to be encoded in the through-operation division. In this case, on the decoding side, the prediction section 1614 also obtains a predictive value from predetermined reference pixels, and the comparison section 1612 takes an exclusive OR between the predicted value and the value of a decoding target pixel.

When the decoding processing section 1601 performs arithmetic decoding, which is not shown, encoded data is input into the arithmetic decoding section and the dithered image data output from the arithmetic decoding section and statistical quantities extracted by the statistics section are given to the probability estimation section. The overall operation is the same as that of the image decoding apparatus in FIG. 42 or FIG. 43.

The image decoding apparatus may have a unit the same as the dots detection section 1301 shown in FIG. 36, which may identify whether the area is a dots area or a non-dots area in each block within a processing unit of the reconstructed dithered image data, invalidate a dither-size detected value related to the non-dots area by the dither size detection section 1604, or inhibit the operation for dither size detection in the dither size detection section 1604 in the non-dots area. The image decoding apparatus having such a configuration is also included in this invention.

The above-mentioned image decoding apparatus or the processing sequence of the image decoding method executed by this apparatus can also be realized by using a computer. Various types of recoding media with the program for that purpose recorded are also included in this invention.

Figure 44:
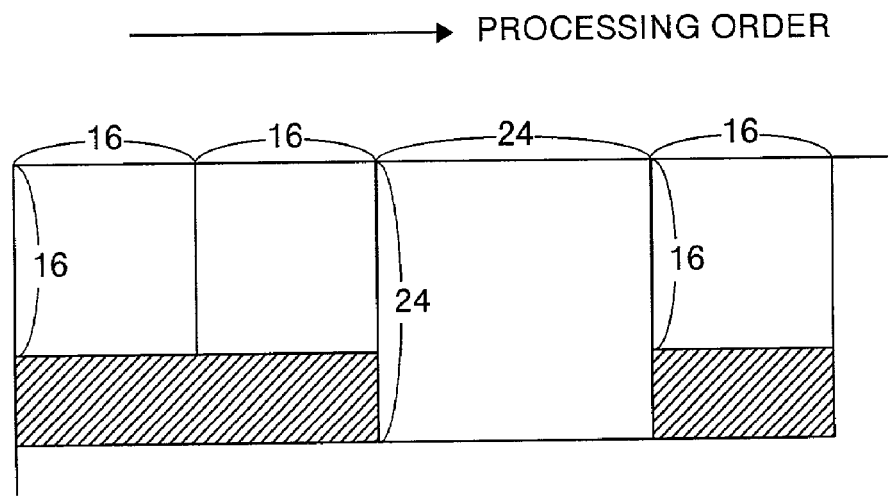
FIG. 44 shows an advantage of the one-dimensional block and a problem on a two-dimensional block.

In the above explanation, blocks forming a processing unit are one-dimensional blocks with one pixel in size in the auxiliary scanning direction, but the blocks can be expanded to two-dimensional blocks. However, when the blocks have been expanded to the two-dimensional blocks, the controls for the case where the block size is changed in a page becomes quite complicated. For example, as shown in FIG. 44, when a 16×16-pixel block and a 24×24-pixel block exist in the same processing unit, the shaded portions require exceptional processing, resultantly, complicated control cannot be avoided. Such processing also requires a buffer storage for a quite wide range of processed dithered image data. This is also required on the decoding side. Such a problem can be avoided based on a configuration such that the size in the auxiliary scanning direction is set to a one-dimensional block with one pixel and the block is serially processed along the horizontal scanning line like in the image encoding apparatus and the image decoding apparatus.

Explanation has been given up to here assuming that the dithered image data is binary data, but this invention is also applicable to multi-value dithered image data.

When the multi-value dithered image data is to be targeted, the statistics section (1112, 1605) can determine a value, as a statistical quantity, obtained by simply summing pixel values in corresponding positions in blocks within a processing unit. Alternatively, the statistics section can determine a value, as statistical information, obtained by setting the lightest weight factor to the first block in the processing unit and the heaviest weight factor to the final block, weighting pixel values with such weight factors, and summing the weighted values. Each detection section (1201) of the dither size detection section (1111, 1604) may be configured to output "1" when both values of a target pixel and a detected pixel coincide with each other, or when a difference between the pixel values is a predetermined value or less. The comparison section (1403) on the encoding side can be replaced with a means for calculating a difference between the value of an encoding target pixel and its predictive value, and the comparison section (1612) on the decoding side can be replaced with a means for summing an entropy-decoded pixel value and its predictive value. Further, the probability estimation section (1422) can be configured to determine a distance between a total value of pixels values in encoded blocks and a value of a statistical quantity at the position of an encoding target pixel as estimated probability information.

Figure 45:
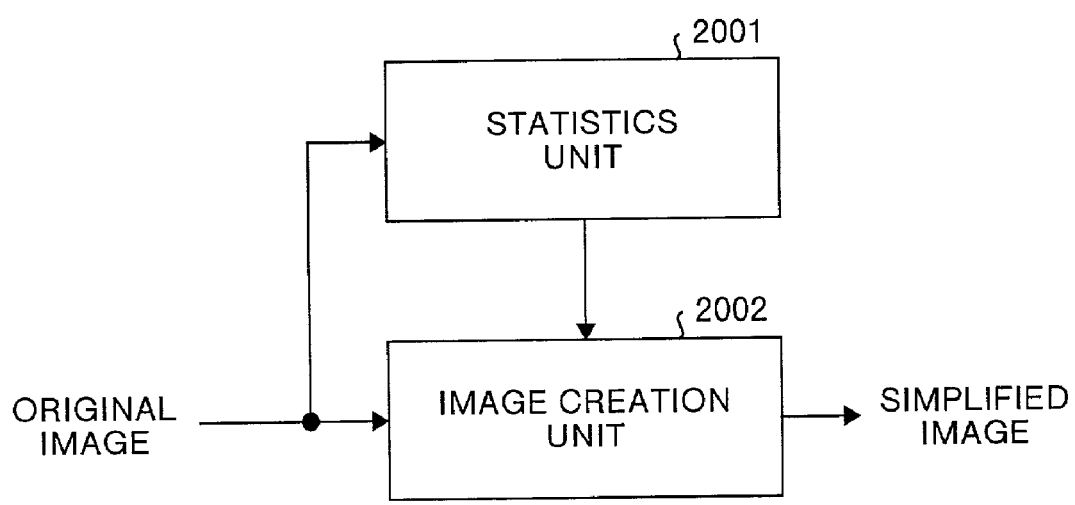
FIG. 45 shows a configuration example of an image creation apparatus according to a third embodiment of this invention.

A third embodiment will be explained below with reference to FIG. 45 to FIG. 56. The third embodiment mainly relates to the fourth object of this invention and claim 37 and claim 38. FIG. 45 shows a configuration example of an image creation apparatus according to the third embodiment. The image creation apparatus shown in FIG. 45 comprises the statistics unit 2001 that obtains statistical information, within an area of a plurality of blocks each formed with a plurality of pixels as a unit, for each pixel value at respective corresponding positions in the blocks, discretely at each of the positions. The image creation apparatus also comprises an image creation unit 2002 that creates a simplified image obtained by simplifying (low resolution and removal of a detailed structure) a target image by using the statistical information obtained by the statistics unit 2001.

The block mentioned here is a rectangle including a plurality of pixels, and whose size in its lateral direction (direction of encoding) is an integral multiple of the lateral-direction size of a dither matrix and whose size in its longitudinal direction is a given one. Explanation will be given below assuming that the same length and width as these of the dither matrix is set as one block for convenience in explanation. That is, in the example of FIG. 1, the dither matrix consists of 4×4 pixels, so that the block will be explained assuming that a 4×4 size is one block.

The statistics unit 2001 creates statistical information from the input dithered image as information corresponding to dither threshold values. The image creation unit 2002 creates a simplified image using the statistical information obtained by the statistics unit 2001 as parameters.

As explained above, the image creation apparatus of FIG. 45 has a sequence such that statistical information obtained from an image area where image creation processing has been finished is used as parameters for creating a currently possible simplified image. The parameters in the initial state are defined values of some kind. By following this sequence, the statistical information is updated as necessary even if one image includes an area processed by a different dither matrix. Therefore, it is possible to create a simplified image with high image quality adaptable to changes in the image. This invention, however, is not limited to this adaptable processing, but statistical information may be created with the first pass (by searching one page), and a simplified image may be created by using the statistical information with the second pass (by searching one page again). The statistical information for a current area can be also used as parameters for creation of a currently possible simplified image.

The statistics unit 2001 and the image creation unit 2002 will be explained in detail below.

At first, the statistics unit 2001 will be explained. FIG. 46 shows a first configuration example of the statistics unit 2001. In this first configuration example, the statistics unit 2001 obtains a total value, obtained by summing pixel values at the respective corresponding positions in plural blocks, discretely at each of the positions in the blocks, and calculates the values as statistical information.

More specifically, the example of FIG. 46 shows a case where statistical information is obtained from a six-block area. In this example of FIG. 46, the same weights ($a_i$ (i=0 to 5)=1) are assigned to all the six blocks (six blocks surrounded by the heavy lines in FIG. 86C) from which statistics are collected, and values are summed ($\Sigma a_i * x_i$) assuming that a black pixel is 1 to obtain the statistical information (3, 1, 5, 3, . . . , 3, 0, 1, 6) shown on the right side of FIG. 46. The statistical information is discretely obtained at each of 16 positions of the dither matrix. The position with larger numeric indicates that this position had a strong tendency to become a black pixel. That is, this fact is brought to the fact that its original dither threshold value was low. In short, it can be said that the statistical information obtained in such a manner has a close correlation to the dither threshold values. The present invention has focused on this fact and has intended to create a simplified image using this statistical information instead of the dither threshold values.

FIG. 47 shows a second configuration example of the statistics unit 2001. In this second configuration example, the statistics unit 2001 determines statistical information by assigning weights according to each block of plural blocks to each pixel value at the respective corresponding positions in the blocks, summing the weighted values, and discretely obtaining the summed total value at each of the positions.

More specifically, the example of FIG. 47 shows a case where statistical information is obtained from a six-block area. In this example of FIG. 47, different weights ($a_5=1$, $a_4=2$, $a_3=3$, $a_2=4$, $a_1=5$, $a_0=6$) are assigned to the six blocks (the six blocks surrounded by the heavy lines in FIG. 86C) from which statistics are collected, and values are summed ($\Sigma a_i * x_i$) assuming that a black pixel is 1 to obtain the statistical information (13, 4, 20, 13, . . . , 13, 0, 4, 21) shown on the right side of FIG. 47. The statistical information is discretely obtained at each of 16 positions of the dither matrix. The statistical information in the second example shown in FIG. 47 is more or less complicated as compared to the statistical information in the first example shown in FIG. 46. However, changes of the dither type in the image are more easily reflected, that is, the latest dither type is reflected.

Figures 48, 49:
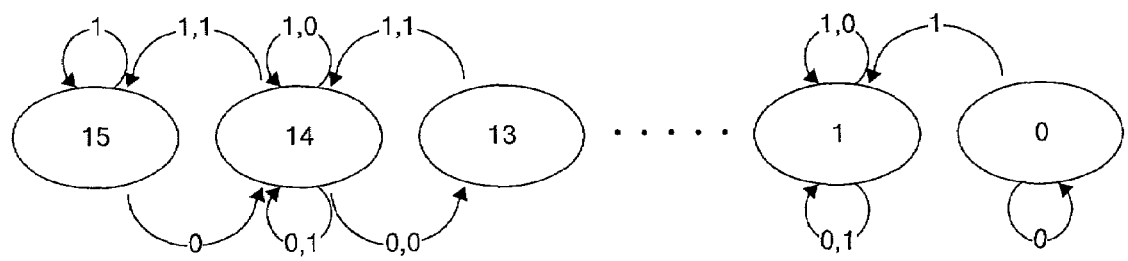
FIG. 48 shows a third configuration example of the statistics unit.
FIG. 49 shows a fourth configuration example of the statistics unit.
Figure 50:
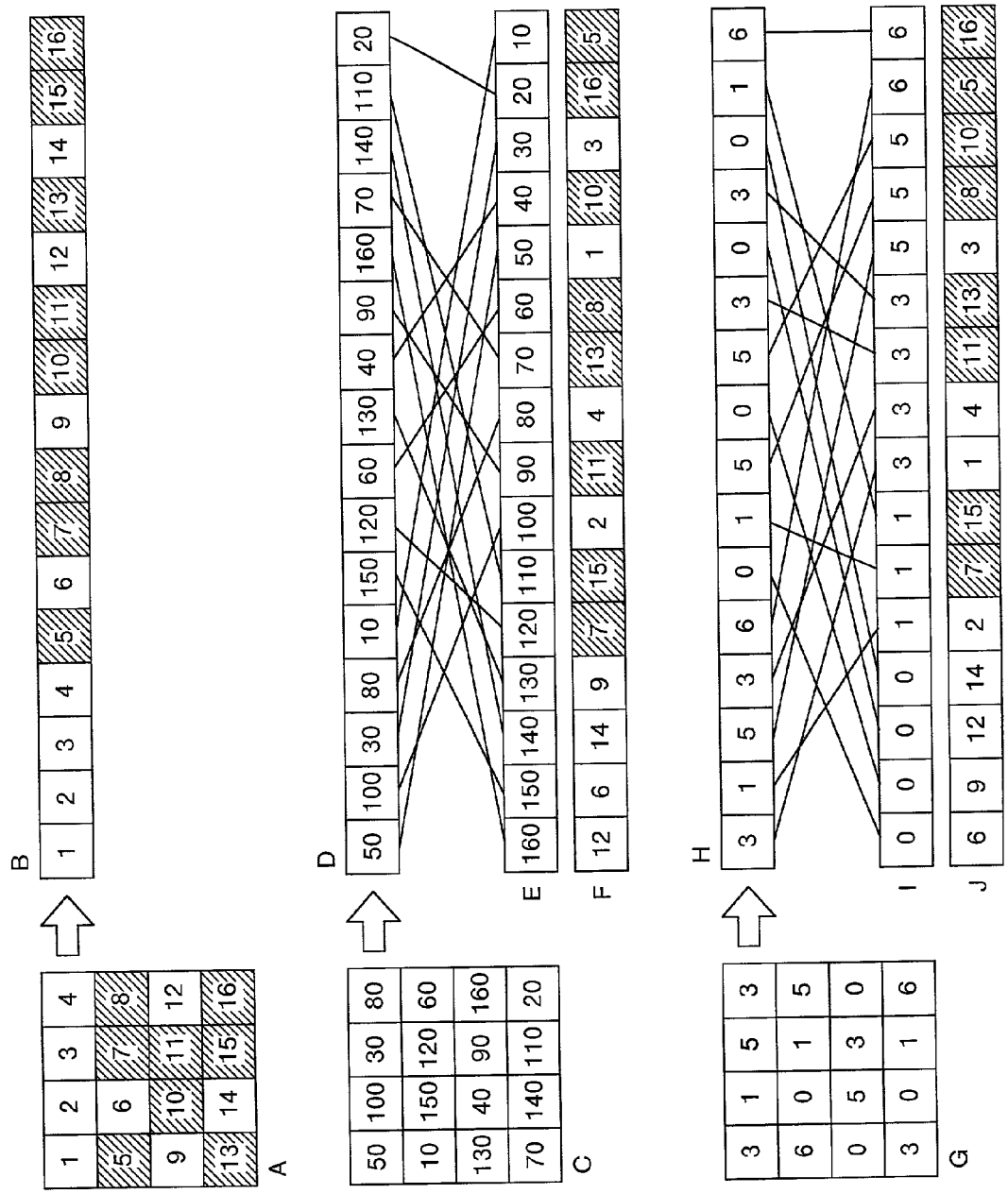
FIG. 50 shows how to order all the pixel positions within a block in the image creation unit.
Figure 51:
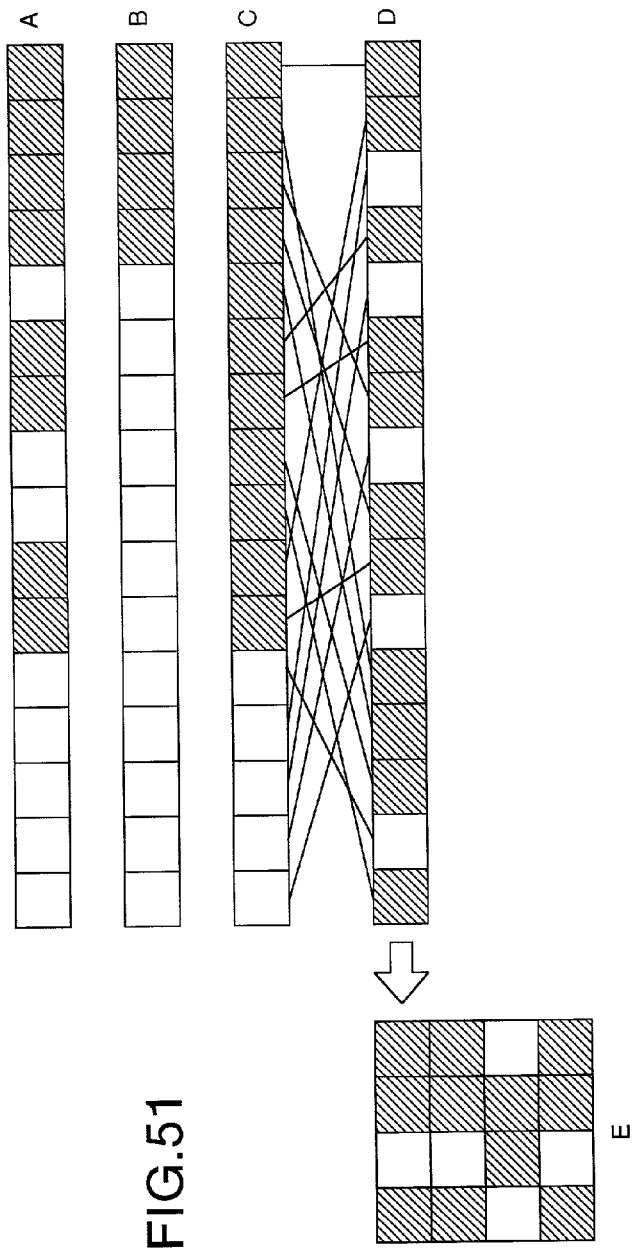
FIG. 51 shows a first configuration example of the image creation unit.
Figure 52:
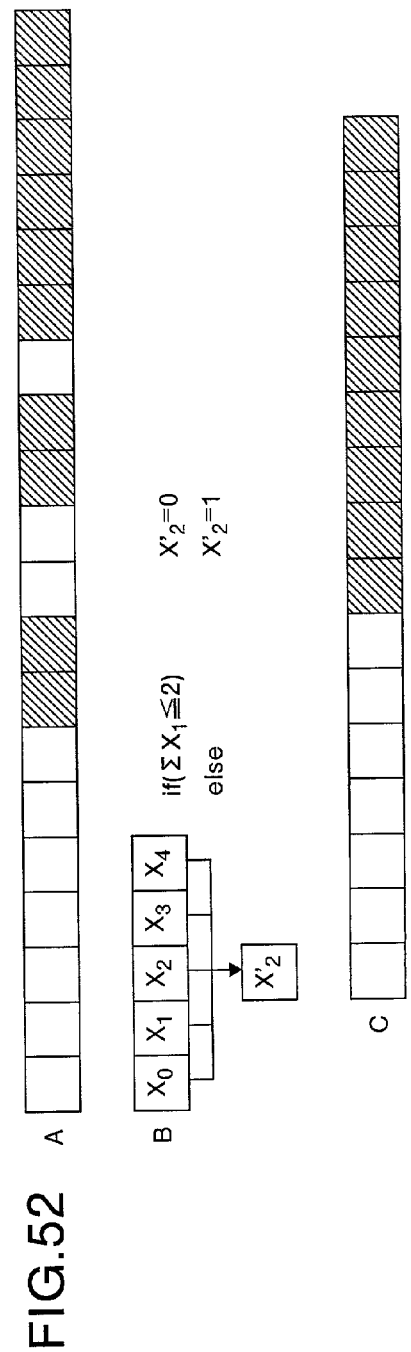
FIG. 52 shows a second configuration example of the image creation unit.
Figure 53:
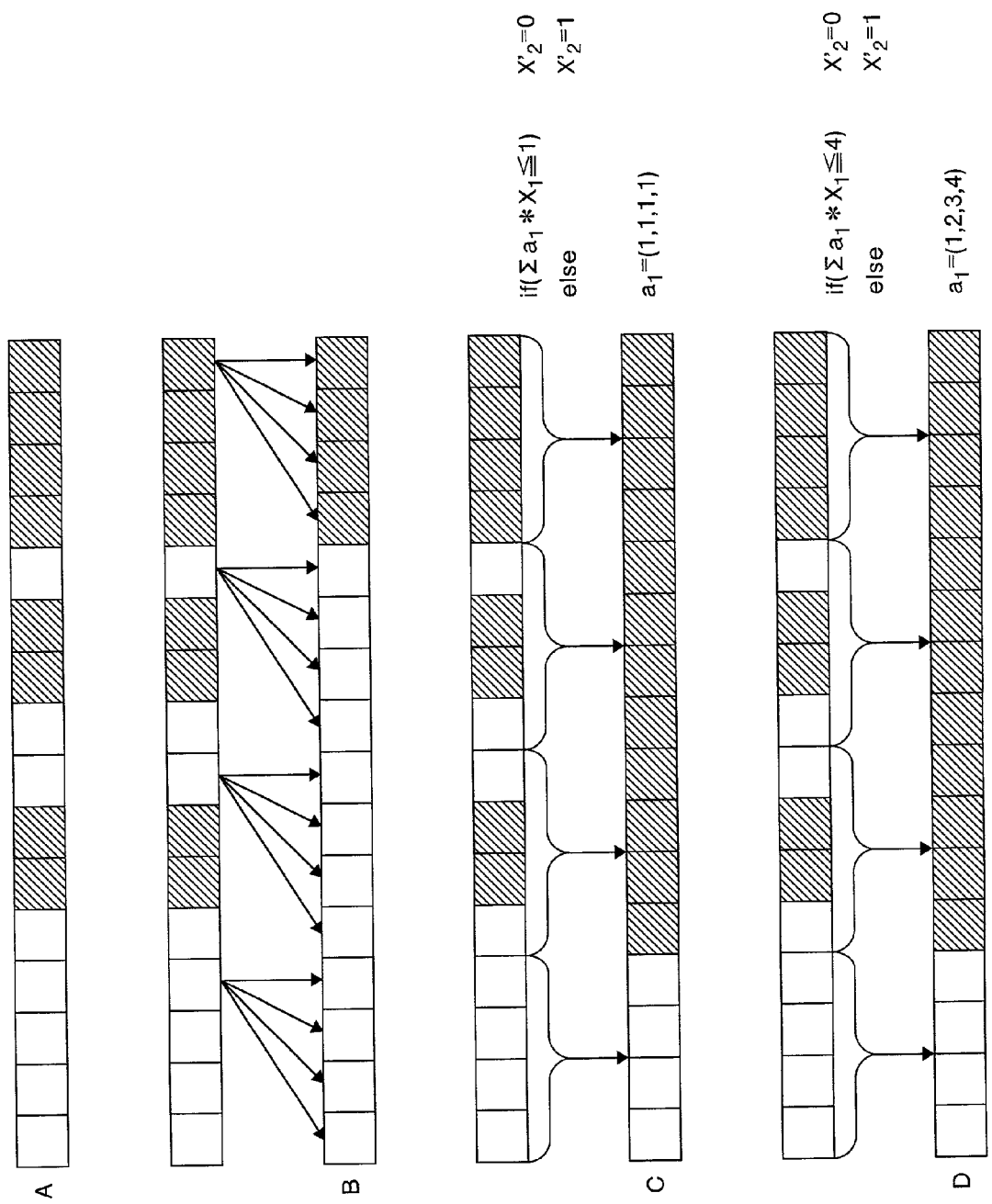
FIG. 53 shows a fourth configuration example of the image creation unit.

In the first and second configuration examples, statistical information is obtained through the operation expression ($\Sigma a_i * x_i$), but instead of using this operation expression, statistical information may be created by using a table for creation of statistical information. FIG. 48 shows a third configuration example of the statistics unit 2001. In this third configuration example, statistical information is created by using the table for creation of statistical information as shown in FIG. 48. In FIG. 48, 6-bit address of the table corresponds to the number of blocks "6" used for statistics. For example, the respective upper left positions of the six blocks are 0, 0, 1, 1, 0, 1. Therefore, the statistical value "13" is obtained by referring to the data in address 001101. If such a table is used, a higher degree of flexibility can be obtained and high speed processing can be performed as compared to the case of using the operation expression.

FIG. 49 shows a fourth configuration example of the statistics unit 2001. In this fourth configuration example, the statistics unit 2001 determines statistical information by determining each value from a transition state of each pixel value at respective corresponding positions in blocks adjacent to each other, and obtaining the value discretely at each of the positions.

That is, in the fourth configuration example, a statistical information state is shifted each time statistical information is input. In FIG. 49, each of the circled numbers indicates a state, and the state to which each position of the dither matrix currently belongs becomes statistical information at the position. For example, when the statistical information at a position is now "14" and each pixel value at the positions of the two continuous blocks is "1", the statistical information value becomes "15". If each pixel value at the positions of the two continuous blocks is "0", the statistical information value becomes "13".

This fourth configuration example requires only a smaller amount of information for the past to be held as compared to the first, second, and third configuration examples. That is, in the first, second, and third examples, information for the last six blocks has to be held, while in the fourth configuration example, information only for the last two blocks may be held.

Although the block with its size known (in the example, dither matrix=4×4 pixels) is shown in the example, it is possible to automatically detect the size of a block (dither size) from a dithered image by using the fact that the same periodic feature as that of the dither matrix appears in the dithered image even if the block size (dither size) is unknown. Image data to be targeted is not limited to the binary dithered image, but this invention can be applied to multi-value dithered image (the dither with 0 or 1, i.e., one bit as the result of dithering is called a binary dither, and the dither with Nbit (2<=N) is called a multi-value dither), and also to an error-diffused image if these images have some periodicity. That is, the statistical processing the same as that by the statistics unit 2001 can be performed.

The image creation unit 2002 for creating a simplified image by using the statistical information obtained in such a manner will be explained below.

FIG. 50A to FIG. 50J show how to order all the pixel positions within a block in the image creation unit 2002. In FIG. 50A to FIG. 50J, the image creation unit 2002 converts data, which is cut out from a target image (original image) by a size (e.g., 4×4) of a dither matrix as a unit, to one-dimensional as shown from FIG. 50A to FIG. 50B. Likewise, the image creation unit 2002 converts the statistical information to one-dimensional as shown from FIG. 50G to FIG. 50H, and rearranges the statistical information as shown from FIG. 50H to FIG. 50I in ascending order. The previously cut-out target data shown in FIG. 50B is subjected to conversion based on one-to-one correspondence due to this rearrangement (corresponding conversion from FIG. 50H to FIG. 50I) to obtain FIG. 50J. Based on this one-to-one conversion, the whole pixel positions in the block are ordered.

FIGS. 50C, 50D, 50E, and 50F show an example of one-to-one conversion in the case of using not statistical information but dither matrix threshold values for comparison. The conversion method in FIGS. 50C, 50D, 50E, and 50F is not the same as that of FIGS. 50G, 50H, 50I, and 50J, but the results of conversion (FIG. 50F and FIG. 50J) are similar to each other. This is because the dither matrix threshold values and the statistical information have a correlation. According to the results of conversion, both of FIG. 50F and FIG. 50J have a tendency such that black pixels gather. This is caused by the fact that multi-gradation data before being dithered has generally a small amount of high spatial frequency component.

As explained above, the statistical information is rearranged in ascending order, and the previously cut-out target data shown in FIG. 50B is subjected to one-to-one conversion due to this rearrangement (corresponding conversion from FIG. 50H to FIG. 50I) to obtain FIG. 50J, and a simplified image is created based on this data after being converted (data shown in FIG. 50J).

The data after being subjected to one-to-one conversion has a tendency such that black pixels gather. In the example of FIG. 50J (FIG. 51A), the pixels closer to the right side tend to become black.

As the first configuration example, the image creation unit 2002 is configured to create a simplified image by ordering all the pixel positions within a block for a target image based on the statistical information, tracing the pixels in descending order or ascending order from the pixel with the highest order or the lowest order, and replacing values of all the pixels, at the point in time and on when a pixel with a predetermined value appears, with the predetermined value.

In this first configuration example, more specifically, as shown in FIG. 51B, the image creation unit 2002 traces the data, after being subjected to one-to-one conversion shown in FIG. 51A, from the rightmost side to the left side, and replaces all the pixels, at the point in time and on when a white pixel first appears, with the white pixels (expansion of white-pixel space). Conversely to this case, as shown in FIG. 51C, the image creation unit 2002 traces the data, after being subjected to one-to-one conversion shown in FIG. 51A, from the leftmost side to the right side, and replaces all the pixels, at the point in time and on when a black pixel first appears, with the black pixels (expansion of black-pixel space).

In this first configuration example, the image creation unit 2002 performs reverse conversion to the one-to-one conversion (conversion from FIG. 50H to FIG. 50I) on the data subjected to expansion processing as shown in FIG. 51B or FIG. 51C, and further converts the data from one-dimensional to two-dimensional to create a simplified image. FIG. 51D shows the result of subjecting the expanded data shown in FIG. 51C to the reverse conversion to one-to-one conversion, and FIG. 51E shows the result of converting the one-dimensional data (data on which reverse conversion is performed) of FIG. 51D to two-dimensional data, that is, a simplified image.

The simplified image created in such a manner is obtained by removing only fine information from the original image (target image). Further, it is possible to accurately express broad information, that is, image quality is improved, as compared to a simplified image created by simply sampling the original image.

As the second configuration example, the image creation unit 2002 may create a simplified image by ordering all the pixel positions in a block based on the statistical information, setting a predetermined number of pixels close to the order of a remarked pixel as reference pixels, and determining a value of a new remarked pixel from the value of the remarked pixel and the values of the reference pixels.

FIG. 52A to FIG. 52C show the processing of the image creation unit 2002 in this second configuration example. Assume here that a filter has five taps as shown in FIG. 52B. this is for the purpose of simply summing adjacent five pixels in total including a remarked pixel $X_2$ to obtain values as follows. If the result of summing the pixels is 0 to 2, $X_2'=0$, and if it is 3 to 5, $X_1'=1$. In this second configuration example, the image creation unit 2002 successively performs the filtering on the data after being subjected to the one-to-one conversion (FIG. 52A (FIG. 50J)) one pixel by one pixel, and generates one-dimensional data shown in FIG. 52C. The image creation unit 2002 further performs reverse conversion to the one-to-one conversion on this one-dimensional data and performs one-dimensional to two-dimensional conversion on the data to create a simplified image. In this second configuration example of the image creation unit 2002, the simplified image having the substantially same characteristic as that of the first configuration example can be created.

In the second configuration example, the image creation unit 2002 creates a simplified image by ordering all the pixel positions in a block based on the statistical information, setting a predetermined number of pixels close to the order of a remarked pixel as reference pixels, and determining a value of a new remarked pixel from the value of the remarked pixel and the values of the reference pixels. While in the third configuration example, when all the pixel positions in a block are ordered based on the statistical information and a predetermined number of pixels closer to the order of a remarked pixel are set as reference pixels, the image creation unit 2002 may change the predetermined number of pixels according to the order of the remarked pixel and set them as the reference pixels, and determine a value of a new remarked pixel from the value of the remarked pixel and the values of the reference pixels to create a simplified image.

That is, in the third configuration example, when a simplified image is to be created, a relative position between a remarked pixel and each pixel of the original image to be referred to is allowed to change. In other words, in the second configuration example, two pixels on both sides with respect to the remarked pixel are always referred to. While in the third configuration example, a method of increasing the number of pixels to be referred to can be applied to, for example, a pixel placed closer to the center of a data array after one-to-one conversion. In the third configuration example, the method is such that positions and a number of reference pixels and their conversion method are different at each position of a remarked pixel. Therefore, the third configuration example has a higher degree of flexibility as compared to the second configuration example, thus creating a further significant simplified image.

In the second and third configuration examples, although the filter is an integration type, a differentiation type may be used instead of the integration type. Further, table conversion, for example, may be used instead of uniform operation like the filter.

As a fourth configuration example, the image creation unit 2002 may create a simplified image by ordering all the pixel positions in a block based on the statistical information, dividing the orders into a plurality of groups, allocating one group representative value to each of the groups, replacing a value of a pixel belonging to each group with a corresponding group representative value.

That is, in this fourth configuration example, a simplified image is created by dividing the data after one-to-one conversion (data in FIG. 50J) into a plurality (4) of groups (divisions) as indicated by the heavy lines of FIG. 53A, allocating one value to each of the groups, and performing reverse conversion to one-to-one conversion and one-dimensional to two-dimensional conversion on a data array to which one value has been allocated within a division.

There are three methods as follows for determining one value per division.

As a first method, the image creation unit 2002 can trace pixels belonging to each group according to the orders and determine a value of a pixel positioned at a predetermined order as a group representative value. For example, as shown in FIG. 53B, a value of a given pixel (the rightmost pixel here) in a division can be selected as a group representative value.

As a second method, the image creation unit 2002 can determine a group representative value based on majority rule applied to pixel values belonging to each group. For example, as shown in FIG. 53C, a black pixel or a white pixel can be selected as a group representative value according to which is a larger number between a black pixel value and a white pixel value in the division.

As a third method, the image creation unit 2002 can determine a group representative value by means of operation of pixel values belonging to each group or conversion with a table. For example, as shown in FIG. 53D, a group representative value can be determined through operation of pixel values in the division or through table conversion.

In this fourth configuration example, although an image cannot be created as significant as that in the first, second, third configuration examples, the processing is simple, thus speedup and cost reduction become possible. Although the example of dividing the data after one-to-one conversion into a plurality of divisions is shown here, the whole data may be set as one division. In this case, one block takes one value, therefore, a number of pixels can be changed, thus a low-resolution image can be created as a simplified image.

The simplified image created in such a manner has generally a smaller amount of codes when data is compressed as compared to that of the original image. By handling only a simplified image, this fourth configuration example can obtain merits such that the capacity of storage medium at the time of storing data can be reduced or the time for data transfer can be reduced. A further simplified image is created from the simplified image in the above manner, and this operation is further repeated, so that a plurality of simplified image groups can be created. By using such simplified image groups, a step-by-step transfer (a detailed image is gradually expressed from a broad image) becomes possible.

As explained above, the image creation apparatus shown in FIG. 45 has a sequence such that statistical information obtained from an area of the image to which image creation processing has been finished is used as a parameter for creating a currently possible simplified image. The parameter in the initial state is assumed to be a defined value of some kind. By following this sequence, the statistical information is updated as necessary even if one image includes an area processed by a different dither matrix. Therefore, it is possible to create a simplified image with high image quality adaptable to changes in the image. This invention, however, is not limited to this adaptable processing, but statistical information may be created with the first pass (by searching one page), and a simplified image may be created by using the statistical information with the second pass (by searching one page again). The statistical information for the current area can be also used as parameters for creation of a currently possible simplified image.

Figure 54:
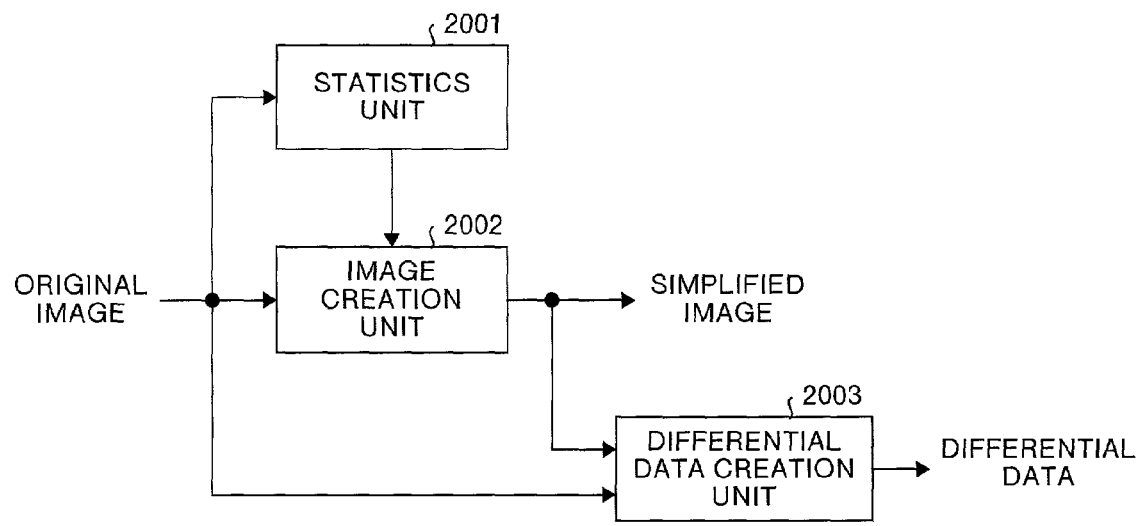
FIG. 54 shows another configuration example of the image creation apparatus according to the third embodiment.

In the third embodiment, differential data between a simplified image and its original image may further be created in addition to the simplified image. FIG. 54 shows another configuration example of the image creation apparatus. The image creation apparatus shown in FIG. 54 comprises the statistics unit 2001, whose statistical target is an area with plural blocks each consisting of plural pixels as a unit, and which obtains statistical information discretely by collecting each pixel value at each corresponding position in the respective blocks over the area. This image creation apparatus also comprises the image creation unit 2002 that creates a simplified image of a target image through its simplification using the statistical information obtained by the statistics unit 2001, and the differential data creation unit 2003 that creates differential data between the simplified image created by the image creation unit 2002 and the target image.

Figure 55:
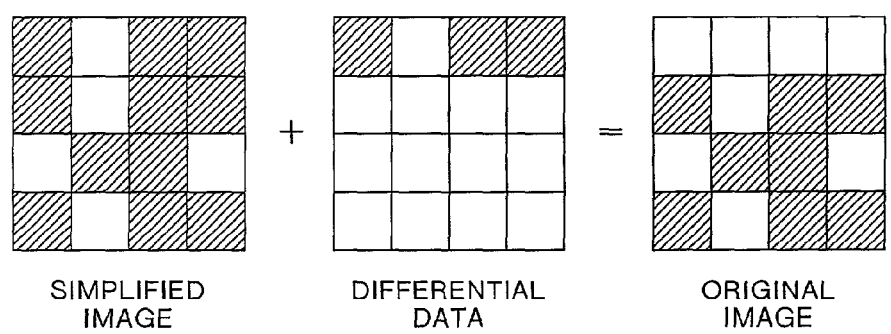
FIG. 55 shows the processing for totally reconstructing the original image from its simplified image and differential data.

By using the differential data created in such a manner, the original image can completely be reconstructed from the simplified image and the differential data as shown in FIG. 55.

Figure 56:
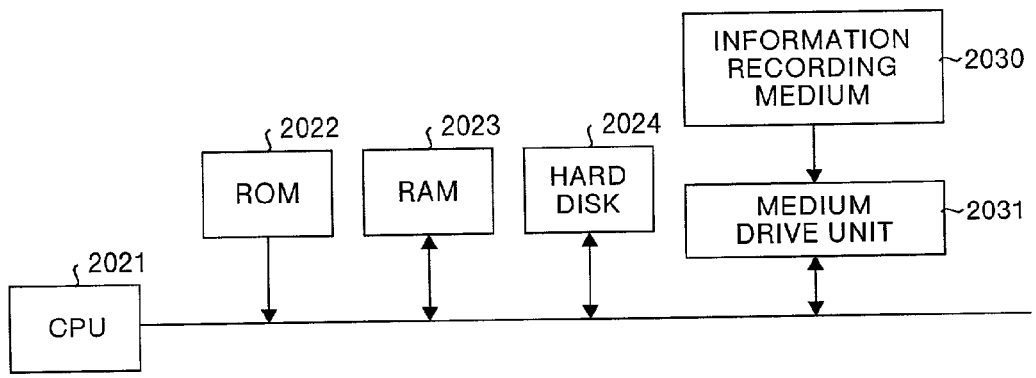
FIG. 56 shows an example of the hardware configuration of the image creation apparatus in either FIG. 45 or FIG. 54.

FIG. 56 shows an example of the hardware configuration of the image creation apparatus in FIG. 45 or FIG. 54. The image creation apparatus shown in FIG. 56 comprises the CPU 2021 that is operated by a personal computer and controls the whole, ROM 2022 that stores a control program for the CPU 2021 or the like, RAM 2023 used as a work area for the CPU 2021, and the hard disk 2024.

The CPU 2021 has functions of the statistics unit 2001 of FIG. 45 or FIG. 54, the image creation unit 2002, and the differential data creation unit 2003.

Such functions as the statistics unit 2001, the image creation unit 2002, and the differential data creation unit 2003 in the CPU 2021 can be provided by a software package, more specifically, in a form of information recording medium 2030 such as CD-ROW. Therefore, in the example of FIG. 56, a medium drive unit 2031 is provided so as to drive the information recording medium 2030 when it is set.

The image creation apparatus according to the third embodiment can operate also in such a configuration that the program recorded on the information recording medium such as CD-ROW is loaded into a general-purpose computer system and the microprocessor of this general-purpose computer system is ordered to execute the image creation processing. In this case, the program for executing the image creation processing according to this invention (that is, the program used in the hardware system) is provided in a state of being recorded on the medium. As information recording media with the program recorded, ROM, RAM, a flexible disk, or a memory card may be used in addition to CD-ROW. The program recorded on the medium is installed in a storage device incorporated in the hardware system such as a hard disk drive to execute this program, thus performing the function of image creation processing according to this invention.

In the examples, one block is set as a size of a dither matrix, but any other size may be set as a size of a dither matrix. For example, even if the dither matrix has a size of 4×4 pixels, horizontal four pixels and vertical one pixel of the matrix may be set as one block. In this case, the processing is executed by one line, so that the cost of performance of the function can be reduced by a cost amount required for line memory.

Figure 57:
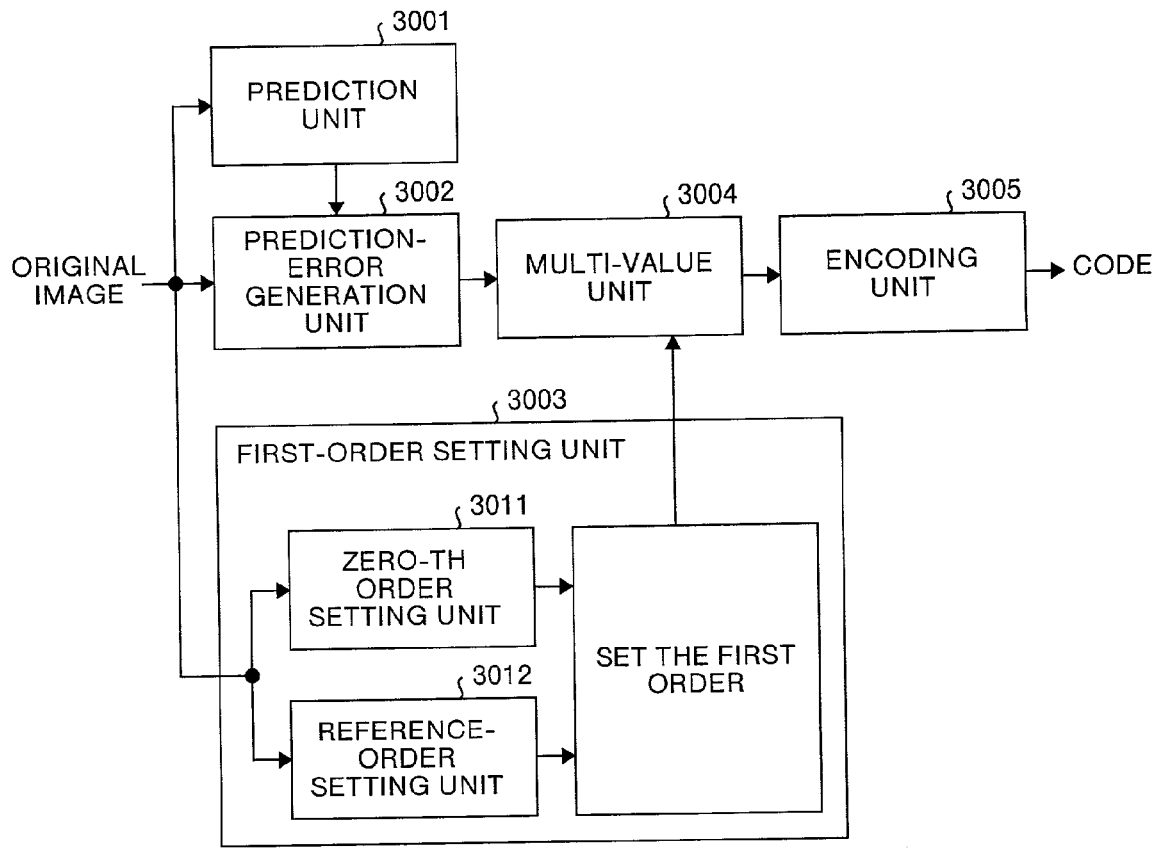
FIG. 57 shows a configuration example of an image encoding apparatus according to a fourth embodiment of this invention.
Figure 58:
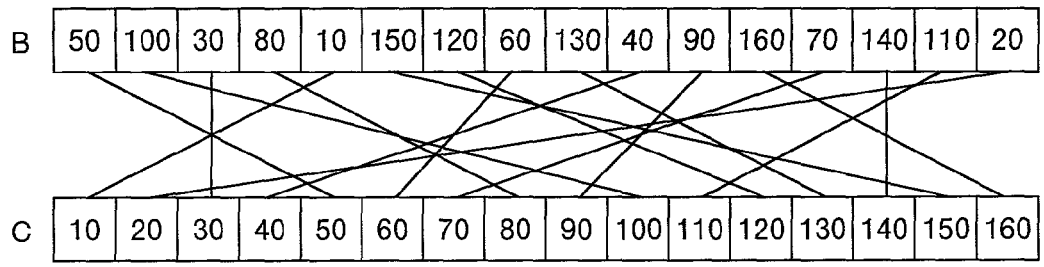
FIG. 58 shows a first example of setting the zero-th order.
Figure 59:
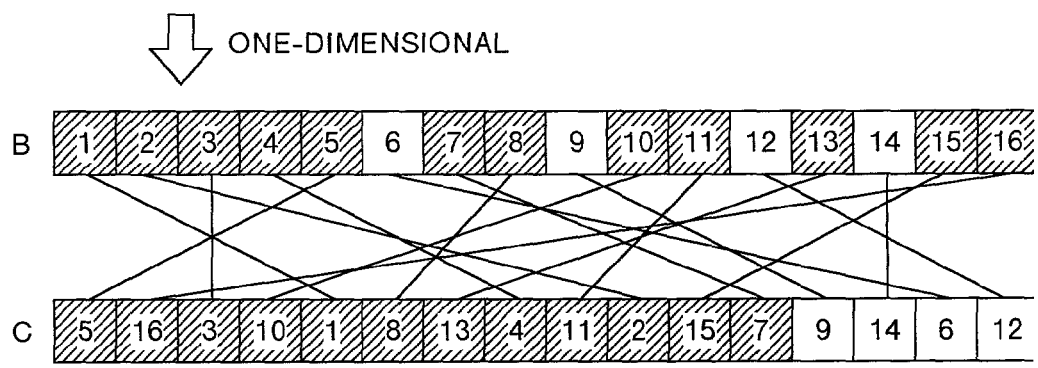
FIG. 59 shows an example of sorting data according to the zero-th order set in FIG. 58.

A fourth embodiment will be explained below with reference to FIG. 57 to FIG. 68. The fourth embodiment mainly relates to the fifth object of this invention and claim 39 and claim 40. FIG. 57 shows a configuration example of an image encoding apparatus according to the fourth embodiment. The image encoding apparatus shown in FIG. 57 comprises the prediction unit 3001 that obtains a predictive value of a remarked pixel from encoded adjacent pixels, prediction-error generation unit 3002 that compares the predictive value of the remarked pixel obtained by the prediction unit 3001 with a real value of the remarked pixel, and generates a prediction error between these two values, and the first-order setting unit 3003 that sets an order of a predictive probability as a first order in each pixel within a block consisting of plural pixels. This image encoding apparatus also comprises the multi-value unit 3004 that orders all the values of prediction errors of all the pixels in a block generated by the prediction-error generation unit 3002 based on the first order set by the first-order setting unit 3003 and obtains one multi-value data. That is, this multi-value unit 3004 performs multi-value coding on output (prediction errors) of the prediction-error generation unit 3002 in the order of output (first order) of the first-order setting unit 3003. The image encoding apparatus further comprises an encoding unit 3005 that encodes the multi-value data from the multi-value unit 3004.

The block mentioned here is a rectangle including a plurality of pixels, and whose size in its lateral direction (direction of encoding) is an integral multiple of the lateral-direction size of a dither matrix and whose size in its longitudinal direction is a given one. Explanation will be given below assuming that a block with the same length and width as these of the dither matrix is set as one block for convenience in explanation.

In the image encoding apparatus of FIG. 57, the first-order setting unit 3003 has a zero-th order setting unit 3011 that sets the zero-th order to each pixel in a block, and a reference-order setting unit 3012 that sets one reference order in the zero-th orders. The first-order setting unit 3003 sets the first order to each of the pixels in a block from the reference order and the zero-th order.

The zero-th order is the order indicating the degree of probability which of black pixels and white pixels becomes black more easily.

More specifically, as a first example, the zero-th order setting unit 3011 can set the order in size of a threshold value (dither threshold value) of a dither matrix as the zero-th order to each pixel within a block. In this case, the zero-th order setting unit 3011 first sorts the dither threshold values of a block (dither matrix) by the values. FIGS. 58A, 58B, 58C show how to execute this processing. That is, in this first example, the two-dimensional dither threshold values of FIG. 58A are converted to one-dimensional as shown in FIG. 58B and the one-dimensional dither threshold values of FIG. 58B are sorted in ascending order as shown in FIG. 58C. The order obtained through the sorting is set as the zero-th order (that is, the order of FIG. 58C).

FIGS. 59D, 59E, 59F show how to sort the original image on a block unit basis according to the order of FIG. 58C (that is, the zero-th order). That is, the two-dimensional original image data of FIG. 59D is converted to one-dimensional as shown in FIG. 59E, and the one-dimensional original image data of FIG. 59E is sorted according to the sorting order shown from FIG. 58B to FIG. 58C to obtain the data of FIG. 59F. As understood from FIG. 59F, when the original image is rearranged on a block unit basis according to the zero-th order, generally, the black pixels and the white pixels gather, respectively. This is caused by the fact that multi-gradation data before being dithered generally includes a large quantity of low frequency component. When the original image is arranged in an ordinary manner (See FIG. 59E), a large number of runs exist (here five black runs and four white runs). However, when the original image is sorted according to the dither threshold value (See FIG. 59F), the number of runs decreases (here one black run and one white run). Thus, when, for example, the run-length encoding is executed to the data, high-efficiency encoding can be expected.

In the first example, the zero-th order (information for the dither threshold values) is assumed to be known, but the zero-th order may be generated through learning from an encoded area even if the zero-th order is not known unlike this case. That is, as a second example, the zero-th order setting unit 3011 can set the order in size of statistical information to each pixel in the block as the zero-th order, when the statistical information as a sum of each pixel value at each corresponding position in respective blocks is obtained discretely at each of the positions over an area with a plurality of blocks.

FIG. 60 shows a state in which an area consisting of six blocks has been binarized by the dither matrix of FIG. 87B with respect to the multi-gradation data before being dithered of FIG. 87A. FIG. 61A shows the statistical information obtained from the encoded six-block area indicated by the heavy lines of FIG. 60. That is, in FIG. 61A, the statistical information (16 numbers: 3, 1, 5, 3, . . . , 3, 0, 1, 6) represents the number of black pixels discretely obtained by summing the black pixels at each of 16 positions within the encoded six blocks indicated by the heavy lines of FIG. 60. The position with a larger number indicates that the tendency to become a black pixel was strong, that is, the original dither threshold value was low. The statistical information as shown in FIG. 61A obtained in such a manner has a close correlation to the dither threshold values. Accordingly, the zero-th order can be obtained by using this statistical information in place of the dither threshold values.

In the second example, the statistical information obtained as shown in FIG. 61A is converted to one-dimensional shown in FIG. 61B, and the one-dimensional statistical information of FIG. 61B is sorted in descending order as shown in FIG. 61C, and this order (the order of FIG. 61C) can be set as the zero-th order.

Based on the order of FIG. 61C (i.e., the zero-th order), when the original image data is rearranged on a block unit basis as shown in FIGS. 62D, 62E, and 62F, like in the case of FIG. 59F, the black pixels and the white pixels gather, respectively (FIG. 62F).

The zero-th order (FIG. 62F) using the statistical information is not the same as the zero-th order using the dither threshold values (FIG. 59F), but both numbers of runs as a result of sorting are the same. This indicates a close correlation between the dither threshold values and the values of statistical information. As explained above, by using this statistical information in place of the known dither threshold values, the correct zero-th order can be always created because the statistical information is updated as necessary even if the dither threshold values are unknown or a plurality types of dither threshold values are used in one image.

As the way to calculate the statistical information, a method of assigning heavier weights (al) to a block closer to an encoding target pixel and summing ($\Sigma a_i \times X_i$) assuming that the black pixel is 1 can be used in addition to the example (the method of simple summing). Although this method is slightly complicated as compared to the method of simple summing, this method more easily reflects the change in image contents.

The statistical information can be identified using the table as shown in FIG. 63 (table for creation of statistical information) without using the operation expression. In FIG. 63, the 6-bit address of the table corresponds to the number of blocks "6" used for statistics. For example, in FIG. 60, since the respective upper left positions of the six blocks are 0, 0, 1, 1, 0, 1, the statistical information value "8" is obtained by referring to the data in address 001101 of the table in FIG. 63. As explained above, as compared to the case of using the operation expression, the method using the table as shown in FIG. 63 has advantages such that a higher degree of flexibility can be obtained and high speed processing can be performed.

Figure 64:
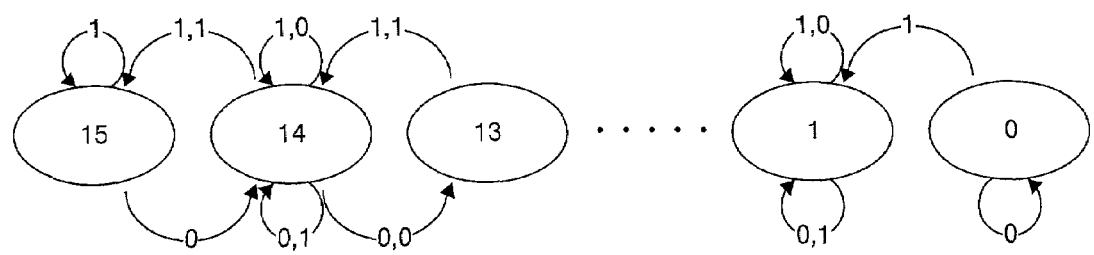
FIG. 64 is a diagram of state transition used to create statistical information.
Figure 65:
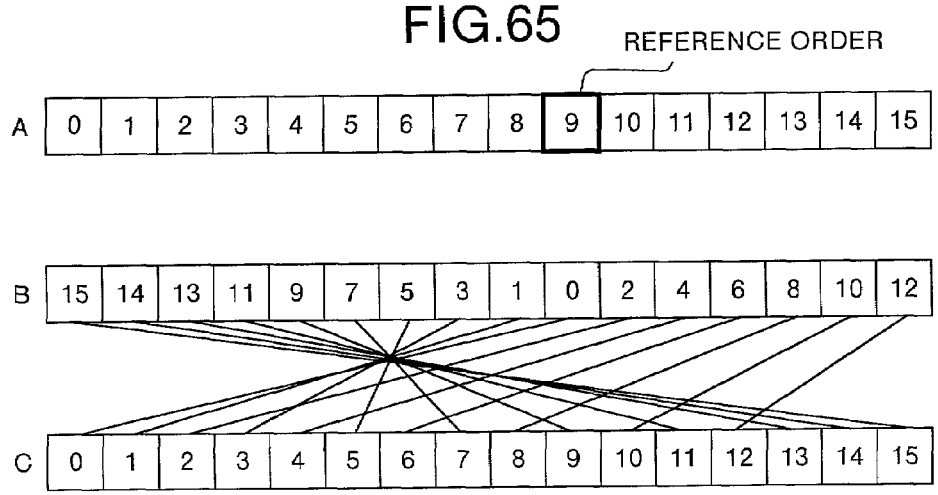
FIG. 65 shows an example of sorting data according to the first order.
Figure 66:
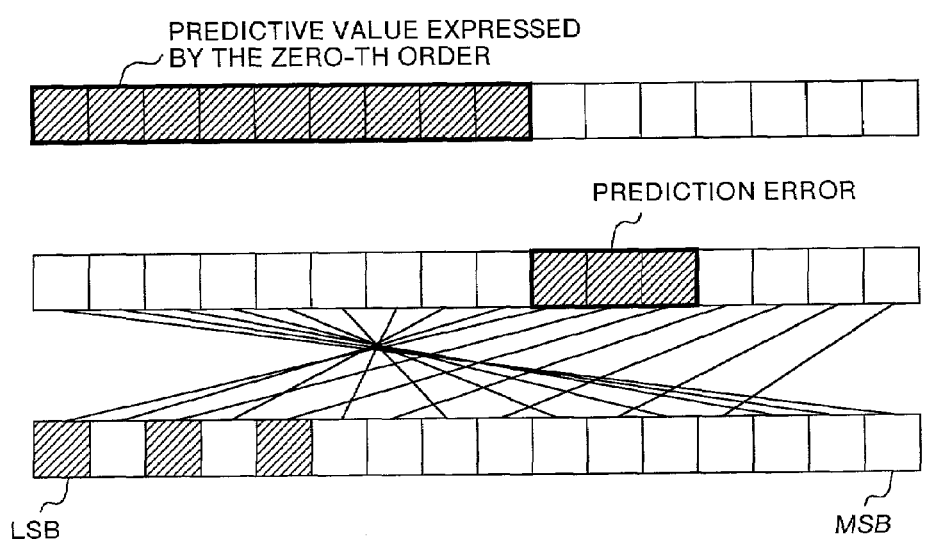
FIG. 66 shows the processing for image encoding according to the fourth embodiment.

The statistical information can be also created in the method of shifting a state. FIG. 64 shows an example of a state transition diagram. In FIG. 64, circled numbers 0, 1, . . . , 15 indicate states, and the state to which each position of blocks currently belongs becomes statistical information at the position. For example, in FIG. 64, when the statistical information at a position is now "14" and each position is "1" in two continuous blocks, the statistical information becomes "15". If each position is "0" in two continuous blocks, the statistical information becomes "13". Such a method of shifting the state requires only a small amount of information for the past to be held as compared to the statistical method. That is, in the example, information for the last six blocks has to be held, but this method requires information only for the last two blocks.

The reference-order setting unit 3012 sets one reference order in the zero-th orders of a remarked block (encoding target block) from pixel values within the encoded adjacent block.

The reference-order setting unit 3012 will be explained in more detail below. As explained above, regarding the original image (FIG. 59F or FIG. 62F) rearranged by the zero-th order, there is a higher probability of becoming a black pixel than a white pixel at the left end of the line, while its reversed state occurs at the right end. The probability is gradually changing along left to right, and the reverse of the probability is supposed to occur somewhere in the line. The order in which the reverse of the probability may occur is set as a reference order.

As a method of setting a reference order, a method of determining the midst order as a reference order at any time can be considered. This method is simple, but, in place of this method, another method of adaptively setting a reference order from information for an encoded block is also conceivable. A more correct reference order can be set by the latter method.

By using a characteristic such that the multi-gradation data before being dithered generally includes a large quantity of low frequency component, it can be assumed that all the data in the remarked block (encoding target block) and the adjacent blocks is the same multi-gradation data. If the remarked block has all the same multi-gradation data, a white-to-black change point in the original image data (FIG. 59F or FIG. 62F) rearranged by the zero-th order is one place. It can be said that this point is the order in which the probability may be reversed. This change point can be obtained from an average value of the adjacent block. That is, the number of black pixels within the remarked block (encoding target block) is predicted from the adjacent block (the block on the left side from the encoding target block in FIG. 60), and the black pixels within the remarked block is predicted as nine in the example of FIG. 60. This number is set to a reference order as it is. FIG. 65A shows this reference order. In FIG. 65A, the predicted reference order is represented in the original image data rearranged by the zero-th order. In the processing, the adjacent block to be referred to is not limited to one, but respective weights may be assigned to the number of black pixels in a plurality of blocks according to the distance from the remarked block, and the weighted values may be averaged.

The reference order is an order in which the probability is reversed, that is, an order in which the probability of occurrence of a white pixel or a black pixel is half-and-half. Therefore, it is general that the probability of each pixel becoming the white pixel or the black pixel increases as the pixel is getting far from this order. Accordingly, as shown in FIG. 65B, by allocating the higher order to a pixel farther from the reference order, ordering of predictive probability can be executed more accurately. As shown in FIG. 65B, the order of predictive probability predicted from the dither threshold values or the statistical information and the average density of the adjacent block is the first order. FIG. 65C shows the result of sorting the data (FIG. 65A), rearranged by the zero-th order, according to the first order of FIG. 65C. The conventional examples (Japanese Patent No. 1807524, Japanese Patent No. 2113692, and Japanese Patent No. 2113693) use only information for dither threshold values, while this invention utilizes a correlation between adjacent blocks, thus obtaining a further higher compression rate.

In the image encoding apparatus shown in FIG. 57, the prediction unit 3001 predicts pixel values in a remarked block (encoding target block) from pixel values of an encoded block. More specifically, like the reference-order setting unit 3012, for example, the prediction unit 3001 can predict pixel values of the remarked block from the number of black pixels in the adjacent block (See FIG. 66D) The prediction unit 3001 can also predict the pixel value by a pixel pattern itself in the adjacent block (that is, the remarked block is assumed to have the same pixel pattern as that of the adjacent block). The prediction-error generation unit 3002 generates an error between the predicted value (FIG. 66D) and a real pixel value (FIG. 59F or FIG. 62F) as shown in FIG. 66E. The prediction-error generation unit 3002 is configured to generate 0 when the prediction comes true and 1 when it does not come true. More specifically, the prediction-error generation unit 3002 can generate a value through the operation of EX-OR (exclusive OR) between the predicted value and its real value.

The multi-value unit 3004 orders the prediction errors generated in the prediction-error generation unit 3002 by the first order set in the first-order setting unit 3003 and generates one multi-value data. The multi-value unit 3004 rearranges the prediction errors as shown in FIG. 66E generated by the prediction-error generation unit 3002 by the first order set in the first-order setting unit 3003 as shown in FIG. 66F. The multi-value unit 3004 converts the values of prediction errors in one block to one multi-value data based on the value at the left end as the LSB (Least Significant Bit). In the example of FIG. 66F, the converted multi-value data becomes 0x0015 (which is in hexadecimal notation, 21 in decimal notation).

The encoding unit 3005 allocates respective codes to one multi-value data per block obtained by the multi-value unit 3004. FIG. 67 shows Wyle code and 16-order Golomb-Rice code as an example of code. By using the example of FIG. 67, the multi-value data (21 in decimal notation) in the example of FIG. 66F is converted to the Wyle code as "11100101" and the 16-order Golomb-Rice code as "010101", respectively. As understood from the codes, the 16-bit data per block is compressed to 8/16 and 6/16. The code is not limited to this, but Huffman code matching image characteristics may be used. Further, based on the general characteristics such that multi-value data=0 is continued, by setting the number of repetition of 0 as code, a compression rate can further be improved.

As explained above, the image encoding method according to the fourth embodiment has a sequence such that information obtained from the image area where encoding is finished is used as current parameters (predictive value, the first order). The parameters in the initial state are set as defined values of some kind. By following this sequence, the need to transfer the parameters (predictive value, the first order) to the decoding section is eliminated. That is, on the decoding side, perfect decoding can be performed by preparing current parameters (predictive value, the first order) from the image area where decoding has been finished.

It is obvious that this invention is not limited to this adaptable processing, but parameters (predictive value, the first order) may be created with the first pass (by searching one page), and encoding using this parameter may be performed with the second pass (by searching one page again). There is also a method of setting information obtained from the current area as parameters for current encoding. Although both of the methods need to transfer the parameters (predictive value, the first order) to the decoding side, a compression rate can further be improved.

In the example, the block has a size of 4×4 pixels, but it is not limited to 4×4 pixels. For example, the block may have a size of horizontal four pixels and vertical one pixel.

By such setting, the processing is executed by one line, thus the cost of realization of the method can be reduced by a cost amount required for line memory.

In the example, the block size (in this example, a dither matrix=4×4 pixels) is known, but a method of automatically detecting a block size from an image by means of the technique disclosed in Japanese Patent No. 1962532, may be used.

In the example, image data to be targeted is a binary dithered image, but the data is not limited to it. This invention can be applied even to a case where target image data is a multi-value dithered image (the result of dithering is "0" or "1", that is, 1-bit dither is called a binary dither, and N-bit (2<=N) dither is called a multi-value dither).

Figure 68:
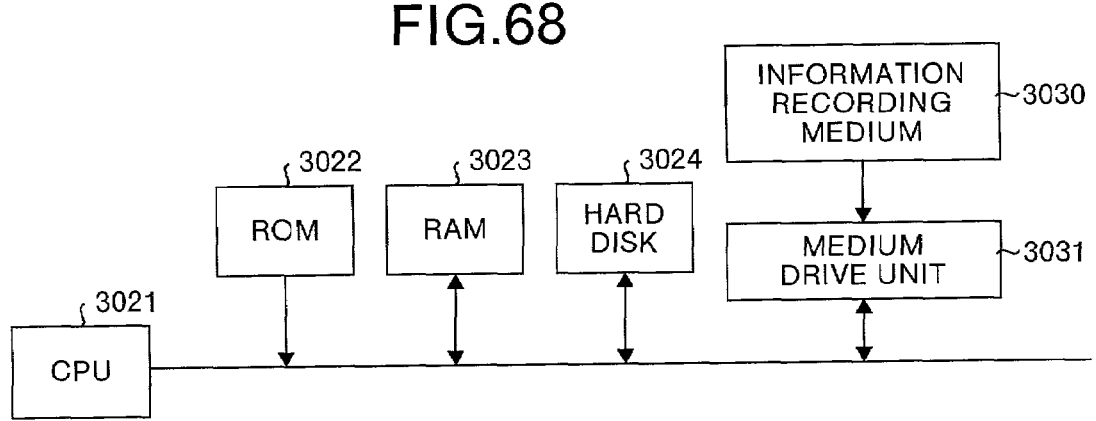
FIG. 68 shows an example of the hardware configuration of the image encoding apparatus according to the fourth embodiment.

FIG. 68 shows an example of the hardware configuration of the image encoding apparatus in FIG. 57. The image encoding apparatus shown in FIG. 68 comprises the CPU 3021 that is operated by a personal computer and controls the whole, ROM 3022 that stores a control program for the CPU 3021 or the like, RAM 3023 used as a work area for the CPU 3021, and the hard disk 3024.

The CPU 3021 has functions of the prediction unit 3001, prediction-error generation unit 3002, first-order setting unit 3003, multi-value unit 3004, and the encoding unit 3005 of FIG. 57.

Such functions as the prediction unit 3001, prediction-error generation unit 3002, first-order setting unit 3003, multi-value unit 3004, and the encoding unit 3005 in the CPU 3021 can be provided by a software package, more specifically, in a form of information recording medium 3030 such as CD-ROW. Therefore, in the example of FIG. 68, a medium drive unit 3031 is provided so as to drive the information recording medium 3030 when it is set.

In other words, the image encoding apparatus according to the fourth embodiment can operate also in such a configuration that the program recorded on the information recording medium such as CD-ROW is loaded into a general-purpose computer system and the microprocessor of this general-purpose computer system is ordered to execute the image encoding processing. In this case, the program for executing the image encoding processing according to this invention (that is, the program used in the hardware system) is provided in a state of being recorded on the medium. As information recording media with the program recorded, ROM, RAM, a flexible disk, or a memory card may be used in addition to CD-ROW. The program recorded on the medium is installed in a storage device incorporated in the hardware system such as a hard disk drive to execute this program, thus performing the function of image encoding processing of this invention.

A fifth embodiment will be explained with reference to FIG. 69 to FIG. 85 in the order of [First example], [Second example], and [Third example]. The fifth embodiment mainly relates to the sixth object of this invention and claim 41 to claim 45.

In general, when a document or a material for presentation created by software of a PC is to be printed, a target printer for output is selected and printing is executed. At this time, printing quality such as dithering can be generally selected. In most cases, output is executed in a state of setting the quality by a default. As dithering based on default setting, "automatic setting" is selected so that sufficient image quality can be obtained in most images. In this setting mode, as an example, an object as text is subjected to dithering based on the dispersion type dither, and another object is subjected to dithering by based on the concentration type dither. That is, a dither to be used is different depending on the object, and its size (the size of a dither matrix, i.e., dither size) is different in many cases. In a case of color printing, the dither size may be different in each color print.

FIRST EXAMPLE

Figure 69:
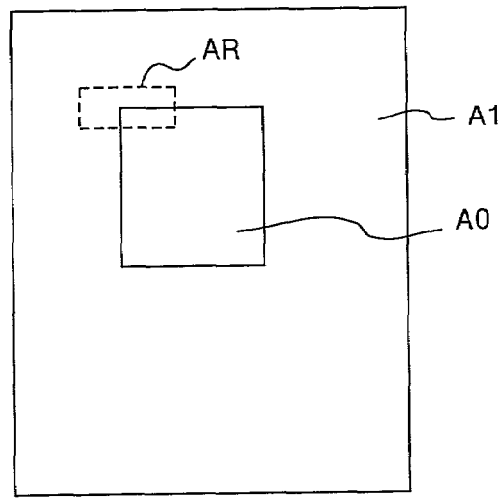
FIG. 69 shows an example when an image area A0 of photograph and an image area A1 of text exist on one page.

In the first example, as shown in FIG. 69, when the image area A0 of a photograph and the image area A1 of text exist on one page, attention is focused on the point that the size (dither size) of a dither matrix applied to an image in the photograph-image area A0 is different from that of a dither matrix applied to the text-image area A1. For example, the size of the dither matrix applied to the image in the photograph-image area A0 is "4 (dither size of 4×4)", while the size of the dither matrix applied to the image in the text-image area A1 is "6 (dither size of 6×6)". The size of the dither matrix (dither size) is then detected from the image after being dithered (dithered image) to separate the photograph-image area A0 from the text-image area A1 in the dithered image.

Figure 70:
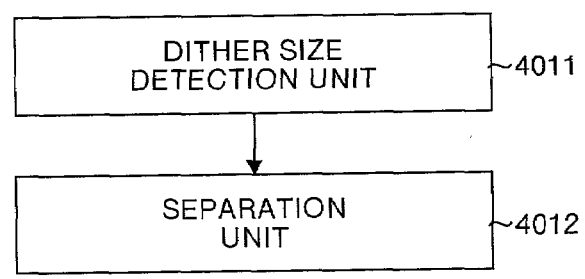
FIG. 70 shows a configuration example of an image processing apparatus according to a first example of a fifth embodiment of this invention.

FIG. 70 shows the configuration example of an image processing apparatus according to the first example. The image processing apparatus of this first example comprises the dither size detection unit 4011 that detects pixel periodicity in a dithered image and detects a dither size, and the separation unit 4012 that performs image area separation on the dithered image based on the dither size detected by the dither size detection unit 4011.

FIG. 71 shows an example of the dither size detection unit 4011. The dither size detection unit 4011 is configured to detect either one of the two types of dither sizes for a dithered image: "4" (dither size of 4×4) and "6" (dither size of 6×6)".

In the example of FIG. 71, the dither size detection unit 4011 comprises the first EXNOR circuit 4014 that takes an EXNOR between the remarked pixel B and the pixel apart from the remarked pixel to the left side by 4 pixels, counter 4015 that counts "1" output from the first EXNOR circuit 4014, second EXNOR circuit 4016 that takes an EXNOR between the remarked pixel B and the pixel apart from the remarked pixel to the left side by 6 pixels, counter 4017 that counts "1" output from the second EXNOR circuit 4016, and the comparator 4018 that compares the count value of the counter 4015 to the count value of the counter 4017.

In the configuration shown in FIG. 71, the dithered image is shifted to the right side one clock by one clock (FIG. 71 shows the dithered image Pt-1 at next previous timing t-1 and the dithered image Pt at the current timing t at which one pixel has been shifted to the right side). At this time, the counter 4015 counts output from the first EXNOR circuit 4014 each time the dithered image is shifted to the right side by one clock, and the counter 4017 counts output from the second EXNOR circuit 4016 each time the dithered image is shifted to the right side by one clock.

When the dithered image is successively shifted in such a manner, the comparator 4018 compares the count value of the counter 4015 to the count value of the counter 4017. As a result of comparison, when the count value of the counter 4015 is larger than the other (when the output of the comparator 4018 is "0", for example), it is detected that the dither size is "4". When the count value of the counter 4017 is larger (when the output of the comparator 4018 is "1", for example), it is detected that the dither size is "6".

FIG. 72 shows the result of detecting the area AR as a part of the dithered image (dithered image with the area A0 whose dither size is "4" and the area A1 whose dither size is "6") shown in FIG. 69 by the dither size detection unit

4011. In FIG. 72, the area where the result of detection is "0" indicates that the dither size is "4", while the area where the result of detection is "1" indicates that the dither size is "6". Accordingly, the image area A0 of the dithered image whose dither size is "4" and the image area A1 of the dithered image whose dither size is "6" can be separated from each other based on the result of this detection.

In the example, it is assumed that the two types of dither sizes "4" and "6" are detected. However, basically, an EXNOR is taken for each N pixels on the right side with respect to the remarked pixel B, the number of times of coincidence is counted, and a pixel at a position with the highest count value of N pixels can be determined as a dither size. These N pixels are a maximum detectable dither size. Setting a large value for the maximum detectable dither size causes increase in the scale of hardware or increase in software processing time. Therefore, it is preferable to set an appropriated upper limit. By providing an EXNOR circuit and a counter for each pixel, a different dither size for each pixel can be detected. However, the load on the hardware and software is heavy for the same reason as explained above. Therefore, as shown in the example, it is more realistic to be limited to the function of detecting a discrete size as a multiple of "4" or "6". This detection of a dither size is applied to the whole dithered image (e.g., the whole one page). As an example, assuming that the two dither sizes "4" and "6" can be detected, and that output is 0 when the detected dither size is "4" and output is 1 when it is "6", the result is obtained as shown in FIG. 72.

The dither size detection unit 4011 detects dither sizes for the whole one page, and holds information for the sizes, that is, the result of detecting the dither sizes. The separation unit 4012 separates the image area A0 of the dithered image whose dither size is "4" from the image area A1 of the dithered image whose dither size is "6".

FIG. 73 is a flow chart showing the image processing method of the image processing apparatus in FIG. 70. The dither size detection unit 4011 detects a dither size for an area as a part of a dithered image in the above manner, and holds the result of the detection (detection data) (step S201). The dither size detection unit 4011 then determines whether detection of dither sizes for the whole dithered image (e.g., for one-page dithered image) has been finished (step S202). When the detection of dither sizes has not been finished for the whole dithered image, the processing returns to step S201, at which the dither size detection unit 4011 detects a dither size for the following area of the dithered image and holds the result of detection (detection data).

On the other hand, at step S202, when the detection of dither sizes for the whole dithered image has been finished, the separation unit 4012 generates information for image area separation based on the result of detecting the dither sizes for the whole dithered image (step S203), and performs image area separation on the dithered image based on the information for image area separation.

In the first example, as explained above, image areas can be separated from one another even if information about which dither size has been used for processing to an object of the dithered image is unknown.

Particularly, in the first example, it is possible to perform image area separation on any image with areas having been dithered with a different dither size for each object.

Further, in the first example, by limiting the number of candidates at the time of calculating a dither size, more specifically, by limiting the number of candidates for a dither size to the two types of "4" and "6" as shown in the example, the image processing apparatus (particularly, the dither size detection unit 4011) can be operated by high-speed and small-scaled hardware as shown in FIG. 71.

SECOND EXAMPLE

The second example realizes image area separation on a dithered image by detecting a dither type in the dithered image when the dithered image has different dither types according to each object (e.g., text object and another object).

Figure 74:
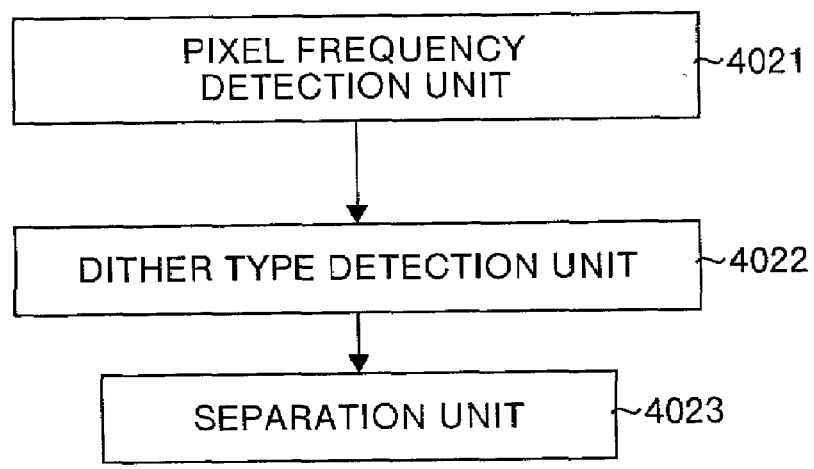
FIG. 74 shows a configuration example of an image processing apparatus according to a second example of the fifth embodiment.

FIG. 74 shows the configuration example of an image processing apparatus according to the second example. The image processing apparatus shown in FIG. 74 comprises the pixel frequency detection unit 4021 that determines a predetermined dither size as one block in a dithered image where dither processing is executed with the predetermined dither size, and detects frequencies of pixel data in a plurality of blocks from the dithered image as pixel frequencies. This image processing apparatus also comprises the dither type detection unit 4022 that detects a dither type based on the pixel frequencies detected by the pixel frequency detection unit 4021, and the separation unit 4023 that performs image area separation on the dithered image based on the dither type detected by the dither type detection unit 4022.

Figure 75:
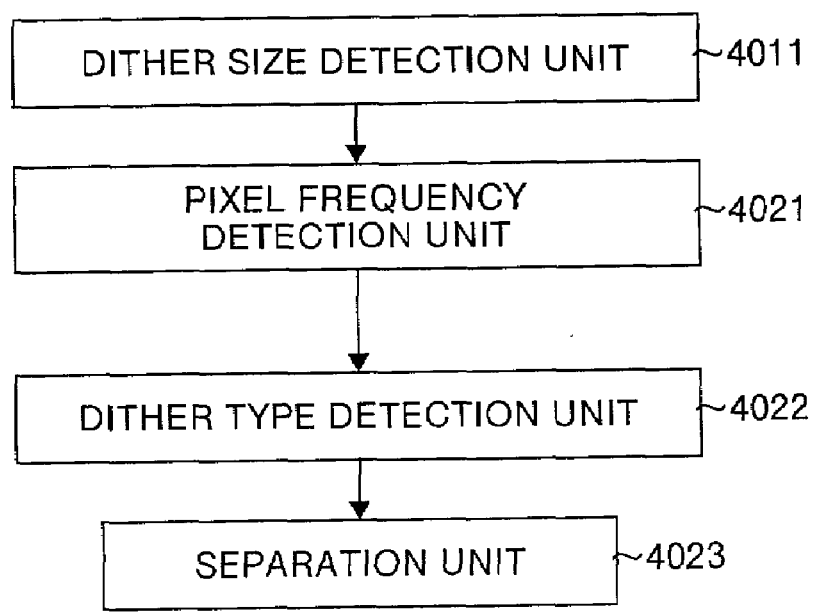
FIG. 75 shows another configuration example of the image processing apparatus according to the second example of the fifth embodiment.

FIG. 75 shows another configuration example of the image processing apparatus of the second example. In FIG. 75, the same legends are assigned to the sections corresponding to these in FIG. 70 and FIG. 74. The image processing apparatus of FIG. 75 comprises the dither size detection unit 4011 that detects pixel periodicity in a dithered image and detects a dither size, and the pixel frequency detection unit 4021 that determines the dither size, as one block, detected by the dither size detection unit 4011 and detects frequencies of pixel data in a plurality of blocks from the dithered image as pixel frequencies. This image processing apparatus also comprises the dither type detection unit 4022 that detects a dither type based on the pixel frequencies detected by the pixel frequency detection unit 4021, and the separation unit 4023 that performs image area separation on the dithered image based on the dither type detected by the dither type detection unit 4022.

The image processing apparatus of FIG. 74 is applicable to the case where the size of a dither matrix having been used for a dithered image is known. The image processing apparatus of FIG. 75 is applicable to the case where the size of a dither matrix having been used for a dithered image is unknown.

The pixel frequency detection unit 4021 utilizes a plurality of blocks in the input dithered image and counts dots at the corresponding positions in the respective blocks to detect the frequencies of the dots.

As explained above, a dither type may be changed for each object. For example, a dispersion type dither is used for text and a concentration type dither is used for the others. Assuming that the size of a dither matrix is M×M as an example, in the concentration type, dots grow from the center of M×M and eventually the dither matrix is filled with the dots. On the other hand, in the dispersion type, dots grow over M×M in such a manner that the dots gather as minimum as possible. Therefore, the difference between the concentration type and the dispersion type can be checked by detecting the frequencies of dots using a plurality of M×M blocks in the dithered image.

FIG. 76A to FIG. 76E show how to detect pixel frequencies by a pixel frequency detection unit 4021. The dithered image to be processed is data (binary data of 0 and 1) after being dithered shown in FIG. 76C, which is obtained by subjecting multi-gradation data before being dithered shown in FIG. 76A to dithering based on a 4×4-concentration type dither matrix shown in FIG. 76B, and binarizing the data.

When the dithered image of FIG. 76C is input, the pixel frequency detection unit 4021 counts dots at respective positions, corresponding to each predetermined pixel position in one block, over a plurality of blocks. The determined pixel positions in one block are shown in FIG. 76D. Dots at the respective corresponding positions of the blocks (two blocks) are counted in the dithered image shown in FIG. 76C. As a result (as count values), three types of frequencies as 0, 1, and 2 can be obtained as shown in FIG. 76E. That is, the values in FIG. 76E show pixel frequencies within one block with respect to the dithered image in FIG. 76C.

In the example of FIG. 76E, the central part of the block has high pixel frequencies and its periphery has low pixel frequencies. According to the example of the pixel frequencies in FIG. 76E, it is determined that the dither type is a concentration type. In the dispersion type, unlike FIG. 76E, the pixel frequencies do not gather at the central part of the block and disperse over the whole block. Accordingly, the dither types can be discriminated from each other.

That is, in the configuration examples of FIG. 74 and FIG. 75, the dither type detection unit 4022 can detect a dither type based on the pixel frequencies detected by the pixel frequency detection unit 4021.

The separation unit 4023 can separate areas of the dithered image based on the dither type detected by the dither type detection unit 4022. That is, when a dither type in an image area of the dithered image is detected as the dispersion type, it can be determined that this image area is a text object. Alternatively, when a dither type in an image area of the dithered image is detected as the concentration type, it can be determined that this image area is an object except text. Accordingly, the image areas can be separated from one another.

Figure 77:
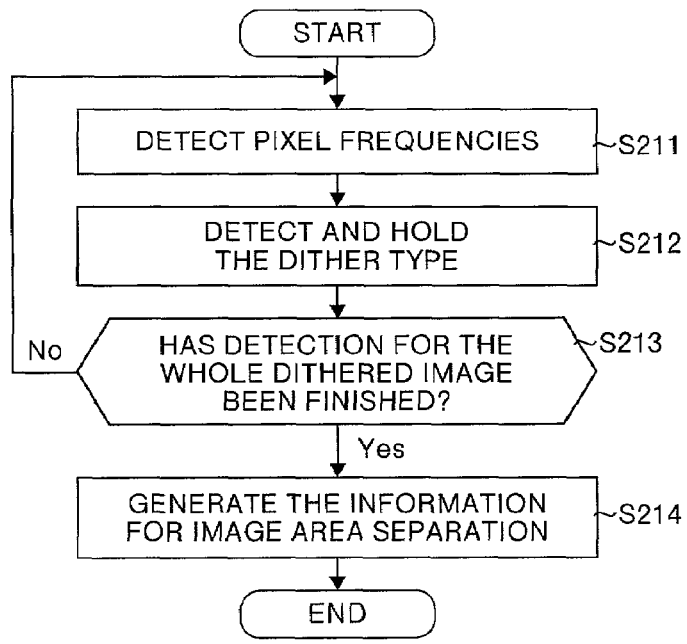
FIG. 77 is a flow chart showing an image processing method of the image processing apparatus in FIG. 74.

FIG. 77 is a flow chart showing the image processing method of the image processing apparatus in FIG. 74. In FIG. 77, the pixel frequency detection unit 4021 determines a predetermined dither size as one block in a dithered image to which dithering has been executed based on the predetermined dither size, and detects frequencies of pixel data in a plurality of blocks from the dithered image as pixel frequencies (step S211). The dither type detection unit 4022 detects a dither type based on the pixel frequencies detected by the pixel frequency detection unit 4021 and holds the result of detection (step S212). Subsequently, it is determined whether detection of pixel frequencies and detection of dither types for the whole dither (e.g., for a one-page dithered image) have been finished (step S213). When the respective detections have not been finished for the whole dithered image, the processing returns to step S211, where detection of pixel frequencies and detection of dither types are performed on the following area of the dithered image, and the results of detection are held.

On the other hand, at step S213, when it is determined that detection of pixel frequencies and detection of dither types for the whole dithered image have been finished, the separation unit 4023 generates information for image area separation based on the result of detecting the dither types over the whole dithered image (step S214), and can perform image area separation on the dithered image based on the information for image area separation.

Figure 78:
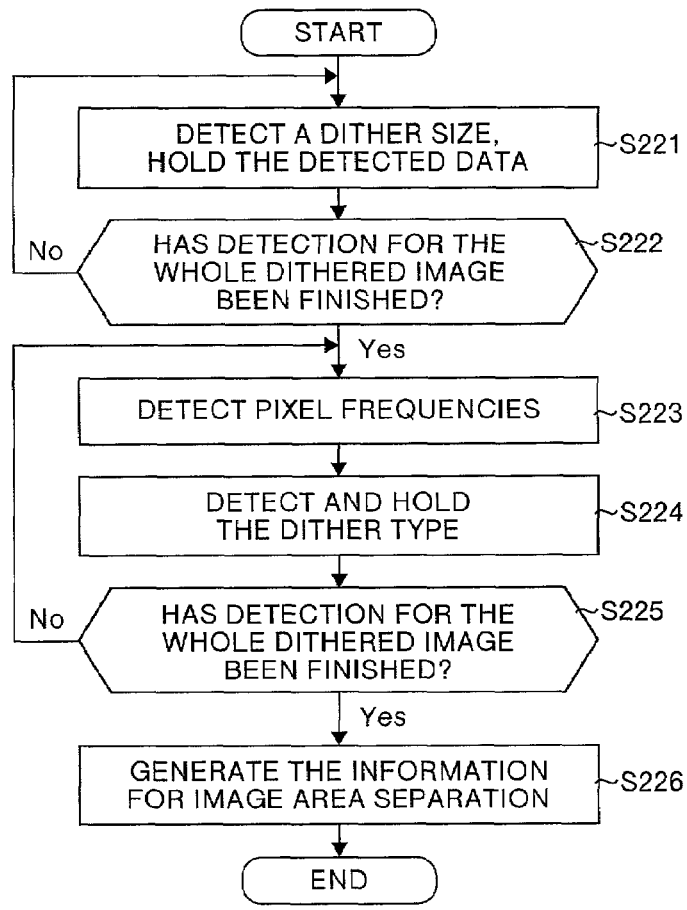
FIG. 78 is a flow chart showing an image processing method of the image processing apparatus in FIG. 75.

FIG. 78 is a flow chart showing the image processing method of the image processing apparatus in FIG. 75. In FIG. 78, the dither size detection unit 4011 detects a dither size for an area as a part of a dithered image in the above manner, and holds the result of detection (detection data) (step S221). The dither size detection unit 4011 then determines whether detection of dither sizes for the whole dithered image (e.g., for a one-page dithered image) has been finished (step S222). When the detection has not been finished for the whole dithered image, the processing returns to step S221, at which the dither size detection unit 4011 detects a dither size for the following area of the dithered image, and holds the result of detection (detection data).

On the other hand, at step S222, when it is determined that detection of dither sizes for the whole dithered image has been finished, the pixel frequency detection unit 4021 determines the dither size, as one block, detected by the dither size detection unit 4011, and detects frequencies of pixel data in a plurality of blocks from the dithered image as pixel frequencies (step S223). The dither type detection unit 4022 detects a dither type based on the pixel frequencies detected by the pixel frequency detection unit 4021 and holds the result of detection (dither type) (step S224). Subsequently, it is determined whether detection of pixel frequencies and detection of dither types for the whole dither (e.g., for a one-page dithered image) have been finished (step S225). When the respective detections have not been finished for the whole dithered image, the processing returns to step S223, at which detection of pixel frequencies and detection of dither types are performed on the following area of the dithered image, and the results of detection are held.

On the other hand, at step S225, when it is determined that detection of pixel frequencies and detection of dither types for the whole dithered image have been finished, the separation unit 4023 generates information for image area separation based on the result of detecting the dither types for the whole dithered image (step S226), and performs image area separation on the dithered image based on this image area separation information.

As explained above, in the second example, it is possible to separate image areas from one another even if information about which dither size has been used for processing to an object of the dithered image, in which a different dither type (concentration type, dispersion type) has been used for processing for each object, is unknown.

THIRD EXAMPLE

Figure 79:
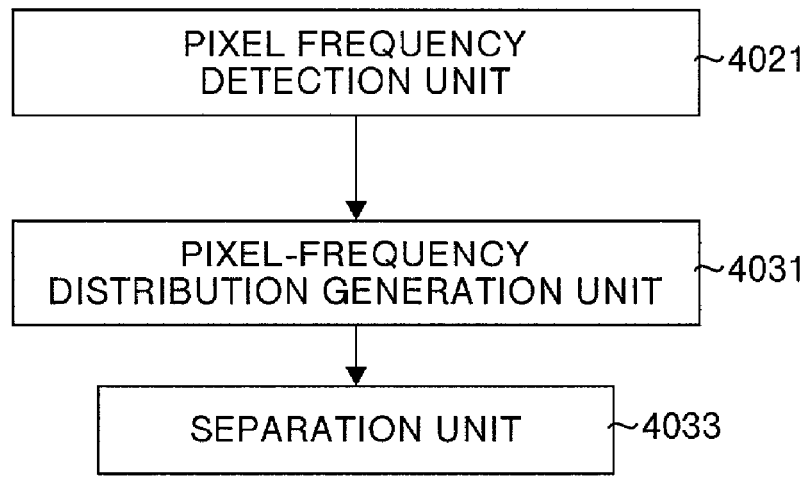
FIG. 79 shows a configuration example of an image processing apparatus according to a third example of the fifth embodiment.

FIG. 79 shows a configuration example of an image processing apparatus according to the third example. In FIG. 79, the same legends are assigned to the sections corresponding to these in FIG. 74. The image processing apparatus shown in FIG. 79 comprises the pixel frequency detection unit 4021 that determines a predetermined dither size as one block in a dithered image where dithering is executed based on the predetermined dither size, and detects frequencies of pixel data in a plurality of blocks from the dithered image as pixel frequencies. This image processing apparatus also comprises the pixel-frequency distribution generation unit 4031 that generates a pixel frequency distribution from the pixel frequencies detected by the pixel frequency detection unit 4021, and the separation unit 4033 that performs image area separation on the dithered image based on the pixel frequency distribution generated by the pixel-frequency distribution generation unit 4031.

Figure 80:
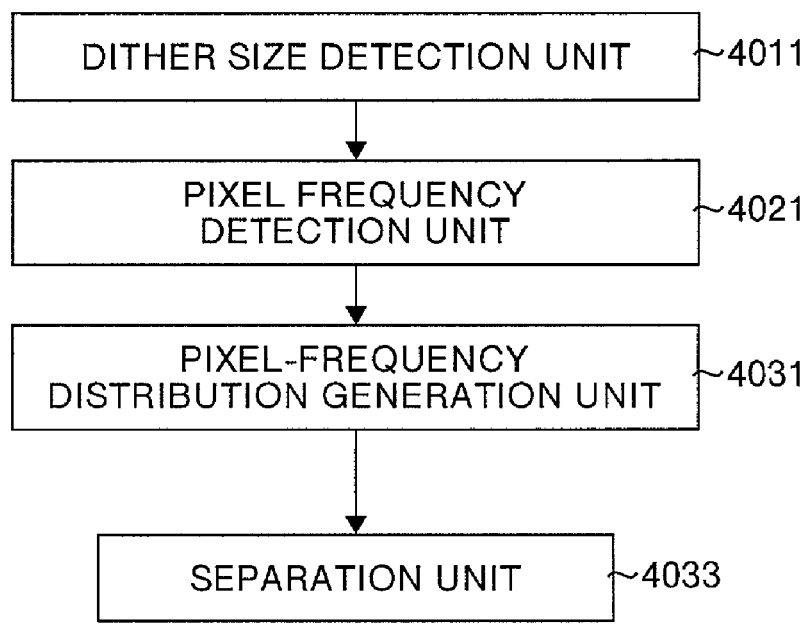
FIG. 80 shows another configuration example of the image processing apparatus according to the third example of the fifth embodiment.

FIG. 80 shows another configuration example of the image processing apparatus according to the third example. In FIG. 80, the same legends are assigned to the sections corresponding to these in FIG. 70 and FIG. 79. The image processing apparatus shown in FIG. 80 comprises the dither size detection unit 4011 that detects pixel periodicity in a dithered image and detects a dither size, and the pixel frequency detection unit 4021 that determines the dither size, as one block, detected by the dither size detection unit 4011 and detects frequencies of pixel data in a plurality of blocks from the dithered image as pixel frequencies. This image processing apparatus also comprises the pixel-frequency distribution generation unit 4031 that generates a pixel frequency distribution from the pixel frequencies detected by the pixel frequency detection unit 4021, and the separation unit 4033 that performs image area separation on the dithered image based on the pixel frequency distribution generated by the pixel-frequency distribution generation unit 4031.

The image processing apparatus of FIG. 79 is applicable to the case where the size of a dither matrix having been used for dithering of a dithered image is known. The image processing apparatus of FIG. 80 is applicable to the case where the size of a dither matrix having been used for dithering of a dithered image is unknown.

A dither (a combination in which high image quality is obtained) adequate for each object such as photograph, graphics (a solid filled image with a uniform density), or text is used. A pixel frequency distribution for each M×M pixels has some characteristic for each object property.

Figure 81A:
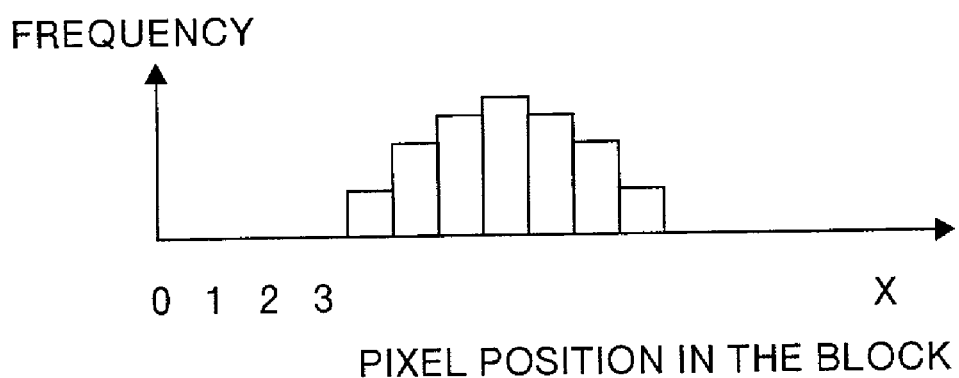
FIG. 81A to FIG. 81C show examples of pixel frequency distribution generated from the pixel frequencies detected by the pixel frequency detection unit.
Figure 81B:
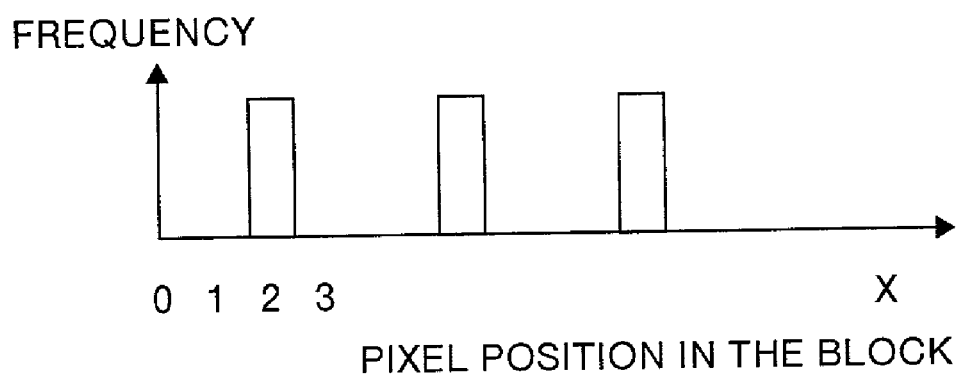
Figure 81C:
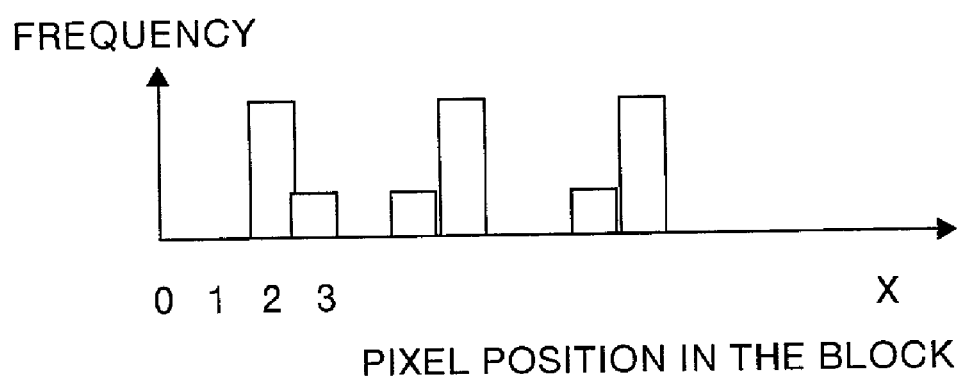

FIGS. 81A, 81B, and 81C show examples of the pixel frequency distribution generated from the pixel frequencies detected by the pixel frequency detection unit. FIG. 81A shows an example of a pixel frequency distribution when the object is photograph. In the example of FIG. 81A, when an image of the photograph is subjected to dithering, a distribution shape of pixel frequencies becomes smooth because densities are gradually changed in many cases. FIG. 81B shows an example of a pixel frequency distribution when the object is graphics, particularly, when the object is a solid filled image with a uniform density. In the example of FIG. 81B, when an image of the graphics is subjected to dithering, a distribution shape of pixel frequencies has a pulse-like characteristic because the same dot pattern is repeated. FIG. 81C shows an example of a pixel frequency distribution when the object is text, which has full density tone, for example, in which black characters are heavily used. In the example of FIG. 81C, when an image of the text is subjected to dithering, the pixel frequency distribution has a characteristic such that there are pulse-like peaks and dots around the peaks.

In the third example, objects are discriminated from one another based on the pixel frequency distribution, and separation between the objects, that is, image area separation is performed on the dithered image.

Figure 82:
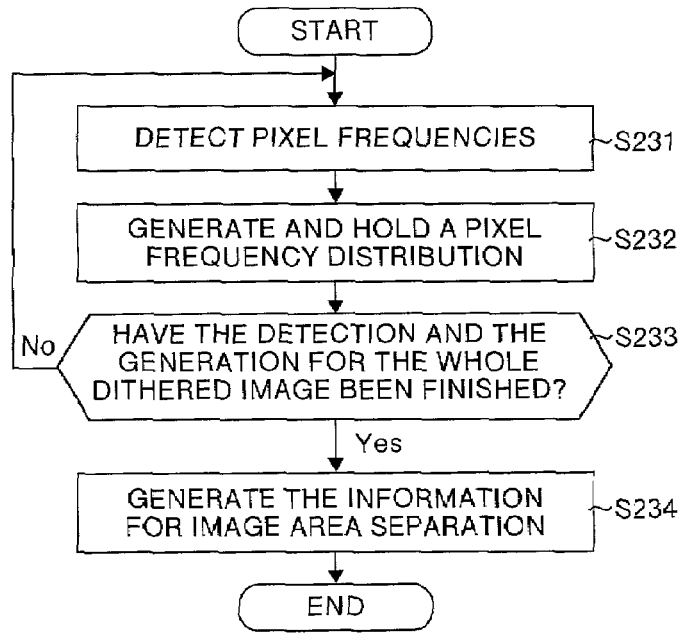
FIG. 82 is a flow chart showing an image processing method of the image processing apparatus in FIG. 79.

FIG. 82 is a flow chart showing the image processing method of the image processing apparatus in FIG. 79. In FIG. 82, the pixel frequency detection unit 4021 determines a predetermined dither size as one block in a dithered image to which dithering has been executed based on the predetermined dither size, and detects frequencies of pixel data in a plurality of blocks from the dithered image as pixel frequencies (step S231). The pixel-frequency distribution generation unit 4031 generates a pixel frequency distribution from the pixel frequencies detected by the pixel frequency detection unit 4021, and holds the data (step S232). Subsequently, it is determined whether detection of pixel frequencies and generation of pixel frequency distributions for the whole dither (e.g., for a one-page dithered image) have been finished (step S233). When detection of pixel frequencies and generation of pixel frequency distributions have not been finished for the whole dithered image, the processing returns to step S231, at which detection of pixel frequencies and generation of pixel frequency distributions are performed on the following area of the dithered image, and results of such detection and generation are held.

On the other hand, at step S233, when it is determined that detection of pixel frequencies and generation of pixel frequency distributions for the whole dithered image have been finished, the separation unit 4033 generates information for image area separation based on the generated pixel frequency distributions (step S234), and performs image area separation on the dithered image based on this image area separation information.

Figure 83:
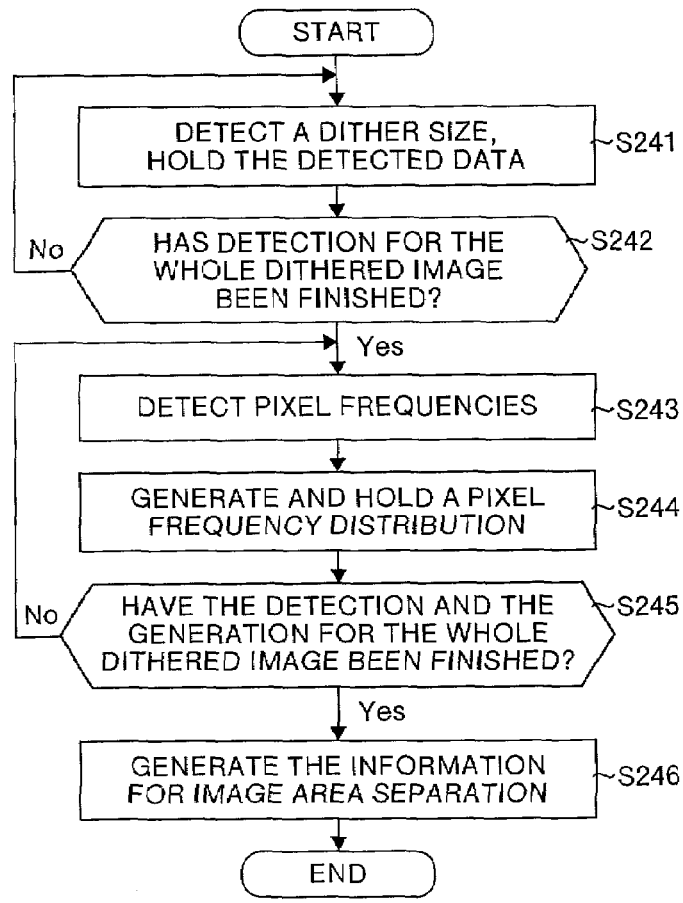
FIG. 83 is a flow chart showing an image processing method of the image processing apparatus in FIG. 80.

FIG. 83 is a flow chart showing the image processing method of the image processing apparatus in FIG. 80. In FIG. 83, the dither size detection unit 4011 detects a dither size for an area as a part of a dithered image in the above manner, and holds the result of the detection (detection data) (step S241). The dither size detection unit 4011 then determines whether detection of dither sizes for the whole dithered image (e.g., for one-page dithered image) has been finished (step S242). When the detection of dither sizes has not been finished for the whole dithered image, the processing returns to step S241, at which the dither size detection unit 4011 detects a dither size for the following area of the dithered image and holds the result of detection (detection data).

On the other hand, at step S242, when the detection of dither sizes for the whole dithered image has been finished, the pixel frequency detection unit 4021 determines the dither size, as one block, detected by the dither size detection unit 4011 and detects frequencies of pixel data in a plurality of blocks from the dithered image as pixel frequencies (step S243). The pixel-frequency distribution generation unit 4031 generates a pixel frequency distribution from the pixel frequencies detected by the pixel frequency detection unit 4021 (step S244). Subsequently, it is determined whether detection of pixel frequencies and generation of pixel frequency distributions for the whole dither (e.g., for a one-page dithered image) have been finished (step S245). When detection of pixel frequencies and generation of pixel frequency distributions have not been finished for the whole dithered image, the processing returns to step S243, at which detection of pixel frequencies and generation of pixel frequency distributions are performed on the following area of the dithered image, and results of such detection and generation are held.

On the other hand, at step S245, when it is determined that detection of pixel frequencies and generation of pixel frequency distributions for the whole dithered image have been finished, the separation unit 4033 generates information for image area separation based on the generated pixel frequency distributions (step S246), and performs image area separation on the dithered image based on this image area separation information.

Figure 84:
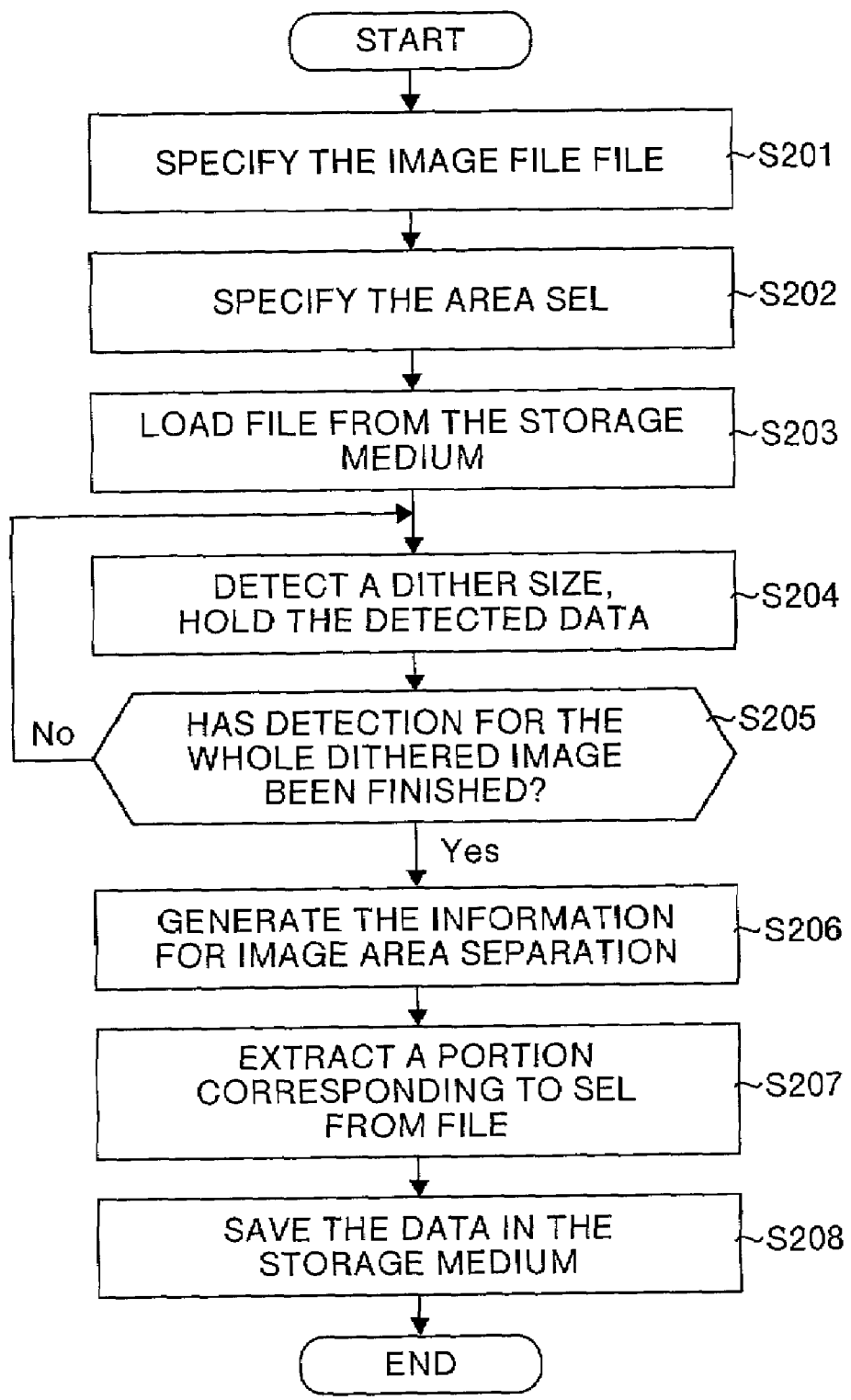
FIG. 84 is a flow chart showing an example of extracting information using an image processing method according to the fifth embodiment.

FIG. 84 is a flow chart showing an example of extracting information using the image processing method of this invention. In the processing example of FIG. 84, it is assumed that the document of FIG. 69 is created through PC application and the image after being dithered is stored in a storage medium (HDD or other recording device). In the general PC application, a document file is opened to be capable of reusing photograph and text through cut & paste. However, the separation is not easily performed on the image after being dithered. The dithered image has not only text but also photograph or the like pasted. The user desires to cut out only the photograph for reuse, or cut out a text area to be reused.

In the processing of FIG. 84, the user specifies which image file (FILE) corresponds to information to be extracted, or which area (Sel) of the file the user wants to extract, from the storage medium with a large quantity of document data recorded (steps S201, S202). When such specification has been made, the specified image file FILE is loaded from the storage medium (step S203), and the image processing method of this invention is executed. That is, in the first example, a dither size is detected, the detection data is held, and image area separation is performed based on the information for holding (steps S204 to S206). By performing such image area separation, an area specified as Sel is extracted from the image file FILE (step S207). After extraction, the data for this area is saved separately from others in the storage medium (step S208).

Figure 85:
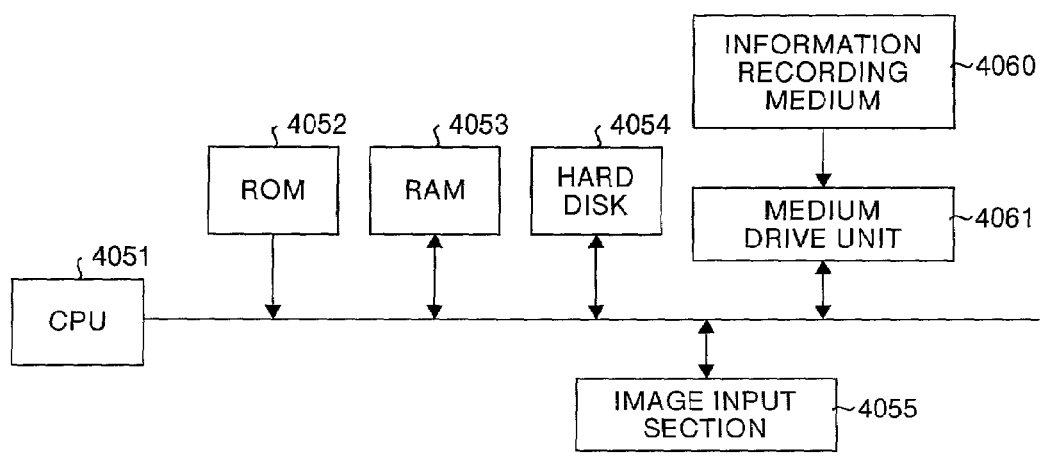
FIG. 85 shows an example of the hardware configuration of the image processing apparatus according to the fifth embodiment.

FIG. 85 shows an example of the hardware configuration of the image processing apparatus of FIG. 70, FIG. 74, FIG. 75, FIG. 79, or FIG. 80. The image processing apparatus shown in FIG. 85 comprises the CPU 4051 that is operated by a personal computer and controls the whole, ROM 4052 that stores a control program for the CPU 3021 or the like, RAM 4053 used as a work area for the CPU 3021, hard disk 4054, and the image input section 4055 that inputs a dithered image.

The CPU 4051 has functions of the dither size detection unit 4011 of FIG. 70, FIG. 74, FIG. 75, FIG. 79, or FIG. 80, separation units 4012, 4023, 4033, pixel frequency detection unit 4021, dither type detection unit 4022, and the pixel-frequency distribution generation unit 4031, or the like.

Such functions as the dither size detection unit 4011, separation units 4012, 4023, 4033, pixel frequency detection unit 4021, dither type detection unit 4022, and the pixel-frequency distribution generation unit 4031, or the like in the CPU 4051 can be provided by a software package, more specifically, in a form of information recording medium such as CD-ROW. Therefore, in the example of FIG. 85, a medium drive unit 4061 is provided so as to drive the information recording medium 4060 when it is set.

In other words, the image processing apparatus according to the fifth embodiment can operate also in such a configuration that the program recorded on the information recording medium such as CD-ROW is loaded into a general-purpose computer system and the microprocessor of this general-purpose computer system is ordered to execute the image processing. In this case, the program for executing the image processing according to this invention (that is, the program used in the hardware system) is provided in a state of being recorded on the medium. As information recording media with the program recorded, ROM, RAM, a flexible disk, or a memory card may be used in addition to CD-ROW. The program recorded on the medium is installed in a storage device incorporated in the hardware system such as a hard disk 4054 to execute this program, thus performing the function of image processing of this invention.

According to one aspect of this invention, many effects as follows are obtained. (1) High-efficiency encoding and its decoding are possible for dithered image data whose dither threshold values are not known. (2) Adaptable high-efficiency encoding and its decoding are possible for dithered image data whose dither threshold values are changed. (3) High-efficiency encoding and its decoding are possible for error-diffused image data whose error diffusion factor is not known. (4) Adaptable high-efficiency encoding and its decoding are possible for an error-diffused image whose error diffusion factors are changed. (5) Memory capacity for accumulation of image data in the image formation apparatus can be reduced.

According to another aspect of this invention, high-efficiency encoding is possible for dithered image data such that the size and threshold values of its dither matrix are unknown or changed.

According to still another aspect of this invention, in an area with a plurality of blocks each consisting of pixels as a unit, statistical information for each pixel value at the corresponding positions in the respective blocks is discretely obtained for each of the positions, and a simplified image is created through simplification of a target image using the statistical information. The statistical information is utilized as information corresponding to the threshold values of the dither matrix. Thus, it is possible to easily obtain a significant simplified image for a dithered image such that the threshold values of the dither matrix are unknown.

According to still another aspect of this invention, a predictive value of a remarked pixel is obtained from an encoded adjacent pixel, a prediction error between the predicted value and the real pixel value is generated, the order of a predictive probability is set as a first order in each pixel within a block consisting of plural pixels. Values of all the prediction errors for all the pixels within the block are ordered according to the first order to obtain one multi-value data, and the multi-value data is encoded. A plurality of prediction errors are then converted to one multi-value data obtained by being ordered in the order by its predictive probability. Thus, a high compression rate can be obtained and high-speed and image-reversible encoding processing becomes possible for any dithered image.

According to still another aspect of this invention, periodicity of pixels in a dithered image is detected to detect a dither size, and image areas of the dithered image are separated from one another based on the detected dither size. Therefore, the image areas can be separated from one another even if the information on which dither has been used for processing for an object in the dithered image is unknown. It is possible to perform image area separation particularly on any image which has been dithered based on a different dither size for each object.

According to still another aspect of this invention, a predetermined dither size is determined as one block in a dithered image that has been dithered by the predetermined dither size, and frequencies of pixel data in a plurality of blocks are detected from the dithered image as pixel frequencies. A dither type is detected based on the detected pixel frequencies, and image areas of the dithered image are separated from one another based on the detected dither type. Therefore, it is possible to perform image area separation on any dithered image which has been dithered based on a different dither type (concentration type, dispersion type) for each object even if the information on which dither has been used for processing for each object is unknown.

According to still another aspect of this invention, a predetermined dither size is determined as one block in a dithered image that has been dithered by the predetermined dither size, and frequencies of pixel data in a plurality of blocks are detected from the dithered image as pixel frequencies. A pixel frequency distribution is generated from the detected pixel frequencies, and image areas of the dithered image are separated from one another based on the generated pixel frequency distribution. Therefore, it is possible to perform image area separation on any dithered image which has been dithered based on a different dither type (concentration type, dispersion type) for each object even if the information on which dither has been used for processing for each object is unknown.

The present document incorporates by reference the entire contents of Japanese priority documents, 2000-268618 filed in Japan on Sep. 5, 2000, 2000-268619 filed in Japan on Sep. 5, 2000, 2001-007392 filed in Japan on Jan. 16, 2001, 2001-006475 filed in Japan on Jan. 15, 2001 and 2001-007148 filed in Japan on Jan. 16, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image encoding method for encoding image data using a block consisting of plural pixels as a unit of processing, said image encoding method comprising the steps of:
    extracting statistical information for each pixel value, from a plurality of encoded blocks adjacent to an encoding target block, at each corresponding position in said respective blocks; and
    performing encoding processing on said encoding target block using the extracted statistical information, wherein the encoding step comprises the steps of:
        selecting a reference pixel for each pixel within said encoding target block from said encoding target block and a plurality of adjacent blocks whose encoding order is earlier than said target block, based on the extracted statistical information,
        predicting a value of each pixel within said encoding target block from the selected reference pixels, and
        performing entropy encoding on an error between the value of each pixel within said encoding target block and its predicted value; and
    wherein the selecting step comprises the step of: selecting a pixel as a reference pixel from said encoding target block and a plurality of adjacent blocks whose encoding order is earlier than said target block, said pixel placed at a position within a block having a value of statistical information such that a difference between this value and a value of statistical information for the position of an encoding target pixel within said encoding target block is within a specified range, and said pixel whose encoding order is earlier than said encoding target pixel.

2. An image encoding method for encoding image data using a block consisting of plural pixels as a unit of processing, said image encoding method comprising the steps of:
    extracting statistical information for each pixel value, from a plurality of encoded blocks adjacent to an encoding target block, at each corresponding position in said respective blocks; and
    performing encoding processing on said encoding target block using the extracted statistical information, wherein the encoding step comprises the step of ordering pixels within said encoding target block based on the statistical information to perform entropy encoding on said ordered pixels.

3. An image encoding method for encoding image data using a block consisting of plural pixels as a unit of processing, said image encoding method comprising the steps of:
    extracting statistical information for each pixel value, from a plurality of encoded blocks adjacent to an encoding target block, at each corresponding position in said respective blocks; and
    performing encoding processing on said encoding target block using the extracted statistical information, wherein the encoding step comprises the steps of:
        estimating a symbol appearance probability of an encoding target pixel from a total value of pixel values within a block to be encoded immediately before said encoding target block and the value of statistical information for the position of said encoding target pixel within said encoding target block; and
        performing arithmetic encoding on said encoding target pixel based on the estimated probability as a parameter.

4. An image encoding apparatus which encodes image data using a block consisting of plural pixels as a unit of processing, said image encoding apparatus comprising:
    a statistics unit that extracts statistical information for each pixel value, from a plurality of encoded blocks adjacent to an encoding target block, at each corresponding position in said respective blocks; and
    an encoding processing unit that performs encoding on said encoding target block by using the statistical information extracted by said statistics unit, wherein said encoding processing unit comprises:
        a prediction unit that selects a reference pixel used for an encoding target pixel within an encoding target block from said encoding target block and a plurality of encoded blocks adjacent to said target block based on the statistical information, and predicts a value of said encoding target pixel from said reference pixel,
        an error detection unit that detects an error between the predicted value by said prediction unit and the value of said encoding target pixel, and
        an encoding unit that performs entropy encoding on the error detected by said error detection unit; and
    wherein said prediction unit selects an encoded pixel as a reference pixel from an encoding target block and a plurality of encoded blocks adjacent to said target block, said encoded pixel placed at a position within a block having a value of statistical information such that a difference between this value and a value of statistical information for the position of an encoding target pixel in said encoding target block is within a predetermined range.

5. An image encoding apparatus which encodes image data using a block consisting of plural pixels as a unit of processing, said image encoding apparatus comprising:
    a statistics unit that extracts statistical information for each pixel value, from a plurality of encoded blocks adjacent to an encoding target block, at each corresponding position in said respective blocks; and
    an encoding processing unit that performs encoding on said encoding target block by using the statistical information extracted by said statistics unit, wherein said encoding processing unit comprises:
        an image conversion unit that orders pixels within an encoding target block based on the statistical information; and
        an encoding unit that performs entropy encoding on the pixels within said encoding target block from the pixel first ordered by said image conversion unit.

6. An image encoding apparatus which encodes image data using a block consisting of plural pixels as a unit of processing, said image encoding apparatus comprising:
    a statistics unit that extracts statistical information for each pixel value, from a plurality of encoded blocks adjacent to an encoding target block, at each corresponding position in said respective blocks; and an encoding processing unit that performs encoding on said encoding target block by using the statistical information extracted by said statistics unit, wherein said encoding processing unit comprises:

a probability estimation unit that estimates a symbol appearance probability of an encoding target pixel from a total value of pixel values within an encoded block immediately before an encoding target block and a value of statistical information for the position of an encoding target pixel within said encoding target block; and an arithmetic encoding unit that performs arithmetic encoding on said encoding target pixel using the probability estimated by said probability estimation unit as a parameter.

7. An image encoding apparatus which encodes image data using a block consisting of plural pixels as a unit of processing, said image encoding apparatus comprising:

a statistics unit that extracts statistical information for each pixel value, from a plurality of encoded blocks adjacent to an encoding target block, at each corresponding position in said respective blocks; and an encoding processing unit that performs encoding on said encoding target block by using the statistical information extracted by said statistics unit, wherein said statistics unit obtains statistical information by assigning heavier weights to a block closer to an encoding target block and summing the weighted pixel values.

8. An image encoding apparatus which encodes image data using a block consisting of plural pixels as a unit of processing, said image encoding apparatus comprising:

a statistics unit that extracts statistical information for each pixel value, from a plurality of encoded blocks adjacent to an encoding target block, at each corresponding position in said respective blocks; and an encoding processing unit that performs encoding on said encoding target block by using the statistical information extracted by said statistics unit, wherein said statistics unit obtains statistical information based on a transition state of a pixel value.

9. An image decoding method for decoding encoded data for image data encoded using a block consisting of plural pixels as a unit of processing, said image decoding method comprising the steps of:

extracting statistical information for each pixel value, from reconstructed image data for a plurality of blocks adjacent to a decoding target block, at each corresponding position of said respective blocks; and performing decoding processing on said decoding target block using the extracted statistical information, wherein the decoding step comprises the steps of:

performing entropy decoding on encoded data;

selecting a reference pixel used for a decoding target pixel within a decoding target block from reconstructed image data for said decoding target block and a plurality of blocks adjacent to said target block based on the statistical information, and predicting a value of said decoding target pixel from said reference pixel; and outputting a sum of the predictive value and the value of said decoding target pixel obtained through entropy decoding or an exclusive OR between these two values as a pixel value of the reconstructed image data.

10. The image decoding method according to claim 9, wherein the predicting step comprises the step of: selecting a pixel as a reference pixel from reconstructed image data for a decoding target block and a plurality of blocks adjacent to said target block, said pixel placed at a position within a block having a value of statistical information such that a difference between this value and a value of statistical information for the position of a decoding target pixel in said decoding target block is within a predetermined range.

11. An image decoding method for decoding encoded data for image data encoded using a block consisting of plural pixels as a unit of processing, said image decoding method comprising the steps of:

extracting statistical information for each pixel value, from reconstructed image data for a plurality of blocks adjacent to a decoding target block, at each corresponding position of said respective blocks; and performing decoding processing on said decoding target block using the extracted statistical information, wherein the decoding step comprises the steps of:

performing entropy decoding on encoded data;

predicting a value of a decoding target pixel from a value of statistical information for the position of said decoding target pixel within a decoding target block; and outputting a sum of the predictive value and the value of said decoding target pixel obtained through entropy decoding or an exclusive OR between these two values as a pixel value of the reconstructed image data.

12. An image decoding method for decoding encoded data for image data encoded using a block consisting of plural pixels as a unit of processing, said image decoding method comprising the steps of:

extracting statistical information for each pixel value, from reconstructed image data for a plurality of blocks adjacent to a decoding target block, at each corresponding position of said respective blocks; and performing decoding processing on said decoding target block using the extracted statistical information, wherein the decoding step comprises the steps of:

performing entropy decoding on encoded data; and ordering pixel values within said decoding target block obtained through entropy decoding based on the statistical information, and outputting the ordered pixel values as pixel values of reconstructed image data.

13. An image decoding method for decoding encoded data for image data encoded using a block consisting of plural pixels as a unit of processing, said image decoding method comprising the steps of:

extracting statistical information for each pixel value, from reconstructed image data for a plurality of blocks adjacent to a decoding target block, at each corresponding position of said respective blocks; and performing decoding processing on said decoding target block using the extracted statistical information, wherein the decoding step comprises the steps of:

estimating a symbol appearance probability of a decoding target pixel from a total value of pixel values in a block decoded immediately before a decoding target block and a value of statistical information for the position of a decoding target pixel within said decoding target block; and performing arithmetic decoding on encoded data based on the estimated probability as a parameter for said decoding target pixel.

14. An image decoding apparatus which decodes encoded data for image data encoded using a block consisting of plural pixels as a unit of processing, said image decoding apparatus comprising:

a decoding processing unit that performs decoding processing to reconstruct image data from the encoded data; and a statistics unit that extracts statistical information for each pixel value, from the image data reconstructed by said decoding processing unit for a plurality of blocks adjacent to a decoding target block, at each corresponding position in said respective blocks, wherein said decoding processing unit utilizes the statistical information executed by said statistics unit for decoding processing for said decoding target block, and wherein said decoding processing unit comprises:

a decoding unit that performs entropy decoding on encoded data;

a prediction unit that selects a reference pixel for a decoding target pixel within a decoding target block from the reconstructed image data for said decoding target block and a plurality of blocks adjacent to said target block based on the statistical information extracted by said statistics unit, and predicts a value of said decoding target pixel from said reference pixel; and an output unit that outputs a sum of the predictive value obtained by said prediction unit and the value of said decoding target pixel obtained through entropy decoding by said decoding unit or an exclusive OR between these two values as a pixel value of the reconstructed image data.

15. The image decoding apparatus according to claim 14, wherein said prediction unit selects a pixel as a reference pixel from the reconstructed image data for a decoding target block and a plurality of blocks adjacent to said target block, said pixel placed at a position within a block having a value of statistical information such that a difference between this value and a value of statistical information for the position of a decoding target pixel in said decoding target block is within a predetermined range.

16. An image decoding apparatus which decodes encoded data for image data encoded using a block consisting of plural pixels as a unit of processing, said image decoding apparatus comprising:

a decoding processing unit that performs decoding processing to reconstruct image data from the encoded data; and a statistics unit that extracts statistical information for each pixel value, from the image data reconstructed by said decoding processing unit for a plurality of blocks adjacent to a decoding target block, at each corresponding position in said respective blocks, wherein said decoding processing unit utilizes the statistical information executed by said statistics unit for decoding processing for said decoding target block, and wherein said decoding processing unit comprises:

a decoding unit that performs entropy decoding on encoded data;

a prediction unit that predicts a value of a decoding target pixel from a value of statistical information for the position of said decoding target pixel; and an output unit that outputs a sum of the predictive value obtained by said prediction unit and the value of said decoding target pixel obtained through entropy decoding by said decoding unit or an exclusive OR between these two values as a pixel value of the reconstructed image data.

17. An image decoding apparatus which decodes encoded data for image data encoded using a block consisting of plural pixels as a unit of processing, said image decoding apparatus comprising:

a decoding processing unit that performs decoding processing to reconstruct image data from the encoded data; and a statistics unit that extracts statistical information for each pixel value, from the image data reconstructed by said decoding processing unit for a plurality of blocks adjacent to a decoding target block, at each corresponding position in said respective blocks, wherein said decoding processing unit utilizes the statistical information executed by said statistics unit for decoding processing for said decoding target block, and wherein said decoding processing unit comprises:

a decoding unit that performs entropy decoding on encoded data; and an image conversion unit that orders pixel values within a decoding target block obtained through entropy decoding by said decoding unit based on the statistical information, and outputs the ordered values as pixel values of the reconstructed image data.

18. An image decoding apparatus which decodes encoded data for image data encoded using a block consisting of plural pixels as a unit of processing, said image decoding apparatus comprising:

a decoding processing unit that performs decoding processing to reconstruct image data from the encoded data; and a statistics unit that extracts statistical information for each pixel value, from the image data reconstructed by said decoding processing unit for a plurality of blocks adjacent to a decoding target block, at each corresponding position in said respective blocks, wherein said decoding processing unit utilizes the statistical information executed by said statistics unit for decoding processing for said decoding target block, and wherein said decoding processing unit comprises:

a probability estimation unit that estimates a symbol appearance probability of a decoding target pixel from a total value of pixel values within a decoded block immediately before a decoding target block and a value of statistical information for a position of a decoding target pixel within said decoding target block; and an arithmetic decoding unit that performs arithmetic decoding on encoded data using the probability estimated by said probability estimation unit as a parameter for said decoding target pixel.

19. An image decoding apparatus which decodes encoded data for image data encoded using a block consisting of plural pixels as a unit of processing, said image decoding apparatus comprising:

a decoding processing unit that performs decoding processing to reconstruct image data from the encoded data; and a statistics unit that extracts statistical information for each pixel value, from the image data reconstructed by said decoding processing unit for a plurality of blocks adjacent to a decoding target block, at each corresponding position in said respective blocks, wherein said decoding processing unit utilizes the statistical information executed by said statistics unit for decoding processing for said decoding target block, and wherein said statistics unit obtains statistical information by assigning heavier weights to a block closer to a decoding target block and summing the weighted pixel values.

20. An image decoding apparatus which decodes encoded data for image data encoded using a block consisting of plural pixels as a unit of processing, said image decoding apparatus comprising:
 a decoding processing unit that performs decoding processing to reconstruct image data from the encoded data; and
 a statistics unit that extracts statistical information for each pixel value, from the image data reconstructed by said decoding processing unit for a plurality of blocks adjacent to a decoding target block, at each corresponding position in said respective blocks,
 wherein said decoding processing unit utilizes the statistical information executed by said statistics unit for decoding processing for said decoding target block, and wherein said statistics unit obtains statistical information based on a transition state of a pixel value.

21. An image encoding method comprising the steps of:
 measuring a dither size for each unit of processing that consists of a predetermined number of blocks where dithered image data is continuous;
 deciding a size of blocks as each processing unit corresponding to the measured dither size of the last processing unit;
 determining whether the measured dither size of each processing unit has been changed from the measured dither size of the last processing unit;
 performing encoding processing on the data in the processing unit immediately after the processing unit, which is determined that its dither size has not been changed, using a statistical quantity having a correlation to dither threshold values extracted from the next previous processing unit, and extracting a statistical quantity; and
 performing encoding processing on the data in the processing unit immediately after the processing unit, which is determined that its dither size has been changed, without using the statistical quantity extracted from the next previous processing unit, and extracting a statistical quantity.

22. An image creation apparatus comprising:
 a statistics unit that targets an area with plural blocks each consisting of plural pixels as a unit, and obtains discretely statistical information for each pixel value at each corresponding position with said respective blocks;
 an image creation unit that creates a simplified image through simplification of a target image by using the statistical information obtained by said statistics unit; and
 a differential data creation unit that creates differential data between the simplified image created by said image creation unit and its target image.

* * * * *